(12) United States Patent
Jang et al.

(10) Patent No.: US 12,149,827 B2
(45) Date of Patent: Nov. 19, 2024

(54) CAMERA ACTUATOR INCLUDING BALLS DISPOSED IN A MOVER AND CAMERA MODULE INCLUDING SAME

(71) Applicant: LG INNOTEK CO., LTD., Seoul (KR)

(72) Inventors: Young Bae Jang, Seoul (KR); Sung Guk Lee, Seoul (KR); Dae Sik Jang, Seoul (KR); Jin Kwan Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/754,702

(22) PCT Filed: Oct. 8, 2020

(86) PCT No.: PCT/KR2020/013727
§ 371 (c)(1),
(2) Date: Apr. 8, 2022

(87) PCT Pub. No.: WO2021/071277
PCT Pub. Date: Apr. 15, 2021

(65) Prior Publication Data
US 2024/0080560 A1 Mar. 7, 2024

(30) Foreign Application Priority Data

Oct. 8, 2019 (KR) .......................... 10-2019-0124801
Oct. 15, 2019 (KR) .......................... 10-2019-0128082
Dec. 23, 2019 (KR) .......................... 10-2019-0173177

(51) Int. Cl.
*H04N 5/335* (2011.01)
*H04N 23/55* (2023.01)
*H04N 23/68* (2023.01)

(52) U.S. Cl.
CPC ........... *H04N 23/687* (2023.01); *H04N 23/55* (2023.01)

(58) Field of Classification Search
CPC ..................................................... H04N 23/55
See application file for complete search history.

(56) References Cited

U.S. PATENT DOCUMENTS 10,048,507 B2 * 8/2018 Nomura ................. G02B 7/102
2013/0321919 A1 * 12/2013 Nakayama ........... G02B 27/646
359/557

(Continued)

FOREIGN PATENT DOCUMENTS

JP 2013-246414 A 12/2013
JP 2014-89325 A 5/2014

(Continued)

OTHER PUBLICATIONS

JPO; Notice of Reasons for Refusal (Translated); Japanese Patent Application No. 2022-521515, Oct. 1, 2024 (Year: 2024).*

(Continued)

*Primary Examiner* — Gary C Vieaux
(74) *Attorney, Agent, or Firm* — Saliwanchik, Lloyd & Eisenschenk

(57) ABSTRACT

An embodiment of the present invention discloses a camera actuator comprising: a housing; a mover on which an optical member sits and which is disposed inside the housing; a ball part including a first ball and a second ball and disposed between the housing and the mover; and a driving unit that is disposed inside the housing to drive the mover, wherein the mover includes a first protrusion extending toward the housing and including a recess. The recess includes: a side surface on which the ball part sits and on which at least a portion of the recess is spaced apart from the ball part; and a bottom surface in contact with the side surface.

18 Claims, 45 Drawing Sheets

(56) References Cited

U.S. PATENT DOCUMENTS

| | | | |
|---|---|---|---|
| 2014/0119717 A1* | 5/2014 | Yasuda | G02B 27/646 396/55 |
| 2018/0109660 A1 | 4/2018 | Yoon et al. | |
| 2018/0364450 A1 | 12/2018 | Lee et al. | |
| 2018/0367714 A1* | 12/2018 | Im | H04N 23/687 |
| 2019/0004328 A1 | 1/2019 | Lee et al. | |
| 2019/0121103 A1* | 4/2019 | Bachar | H04N 23/69 |
| 2019/0129197 A1* | 5/2019 | Kim | G02B 27/646 |
| 2022/0030168 A1* | 1/2022 | Chang | H04N 23/57 |

FOREIGN PATENT DOCUMENTS

| | | |
|---|---|---|
| JP | 2016-131265 A | 7/2016 |
| KR | 10-1682178 B1 | 12/2016 |
| KR | 10-2018-0041040 A | 4/2018 |
| KR | 10-2018-0135392 A | 12/2018 |
| KR | 10-2018-0137277 A | 12/2018 |

OTHER PUBLICATIONS

International Search Report dated Jan. 27, 2021 in International Application No. PCT/KR2020/013727.
Supplementary European Search Report dated Nov. 4, 2022 in European Application No. 20874865.7.
Office Action dated Oct. 1, 2024 in Japanese Application No. 2022-521515.

\* cited by examiner

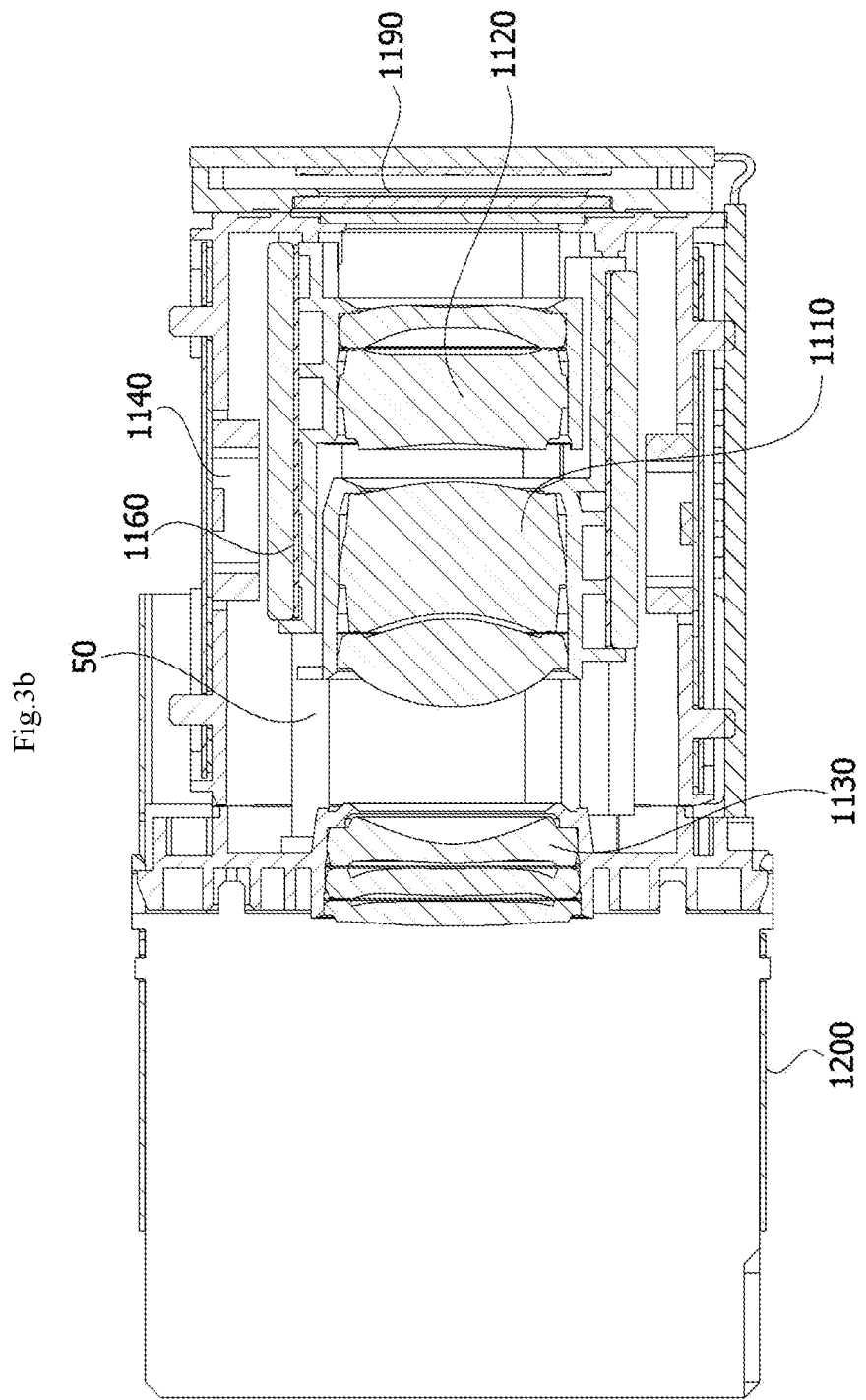

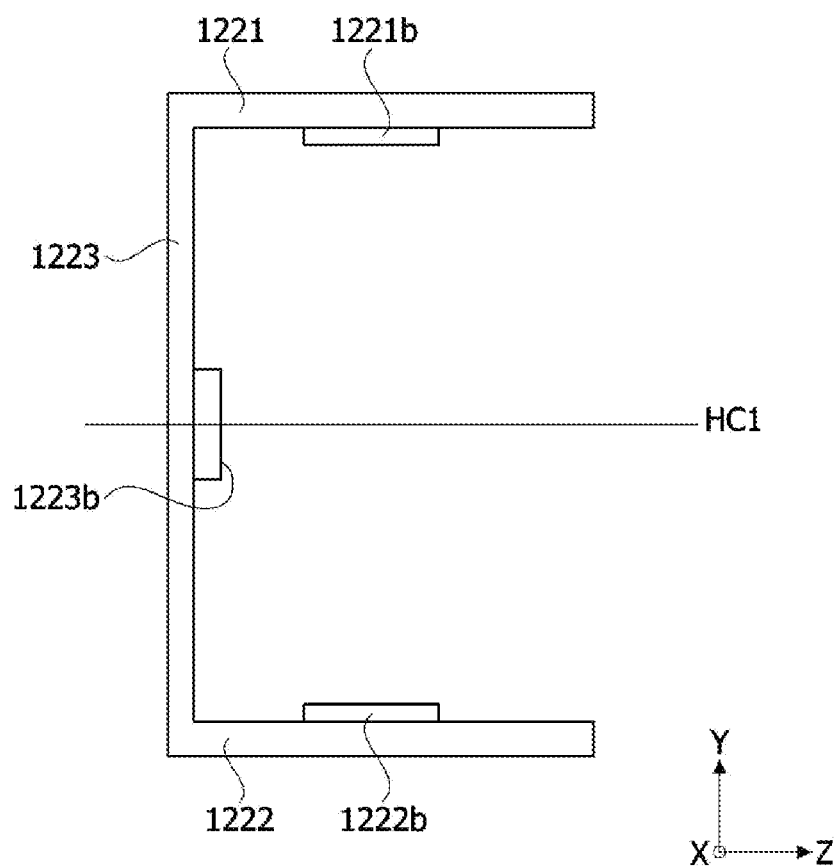

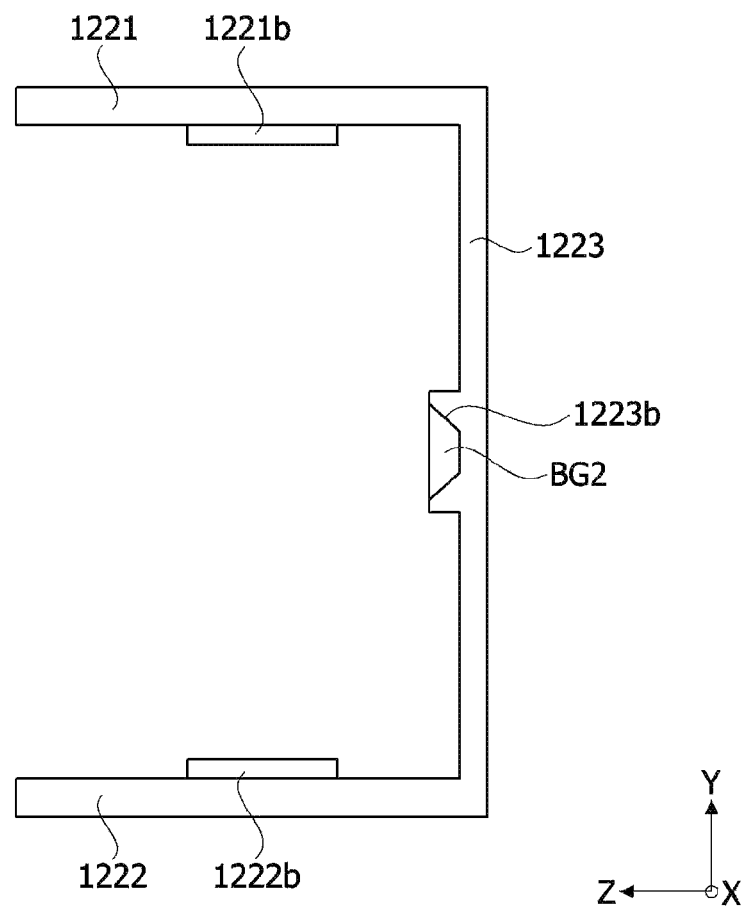

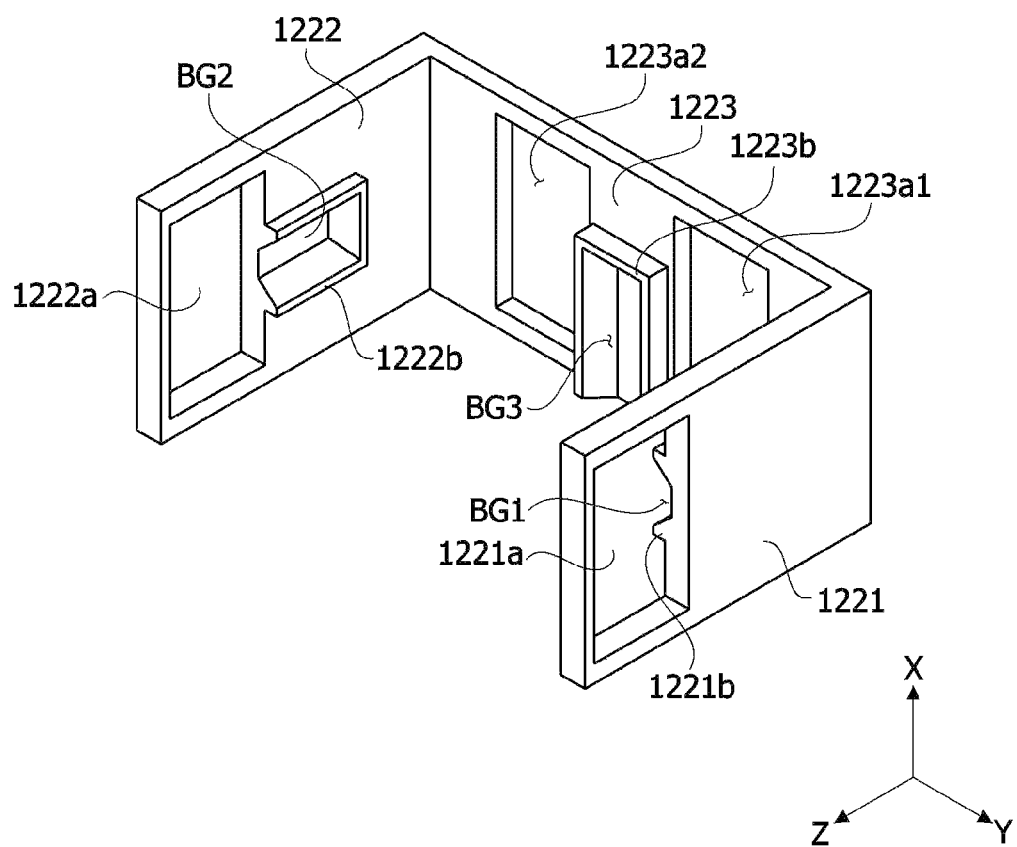

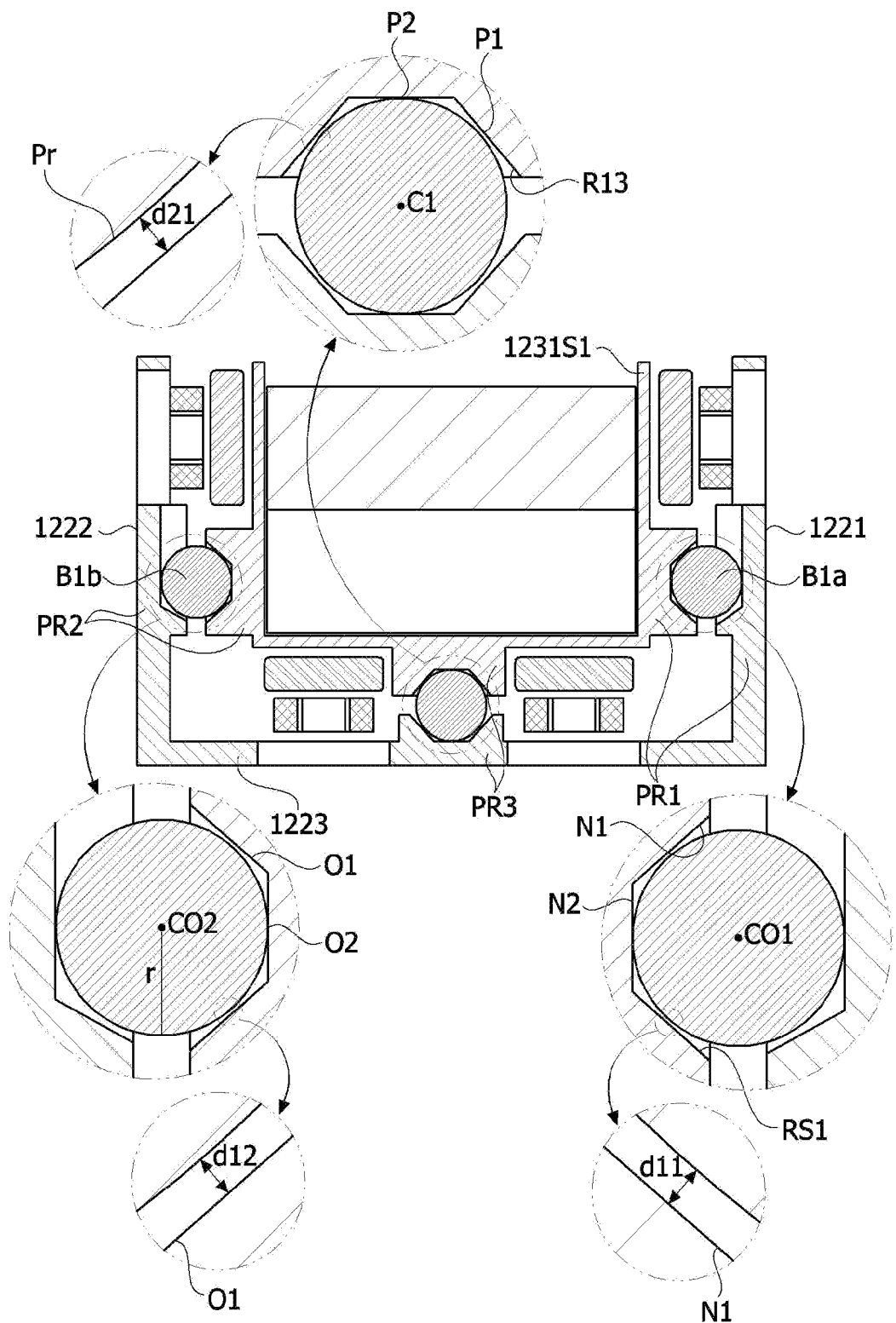

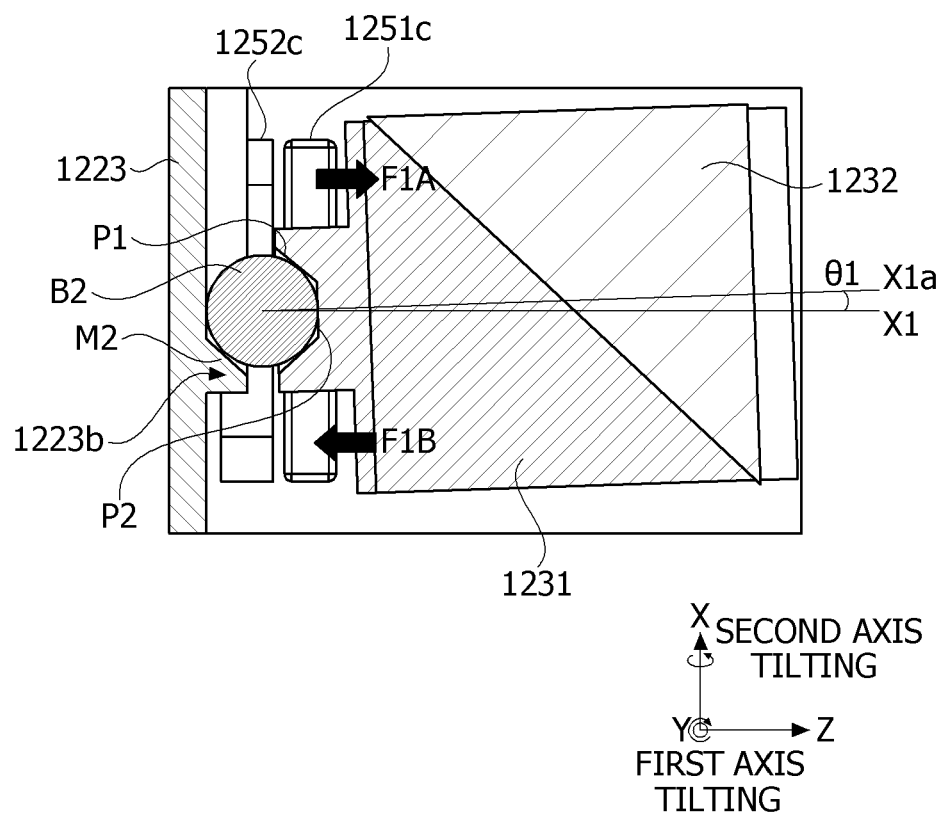

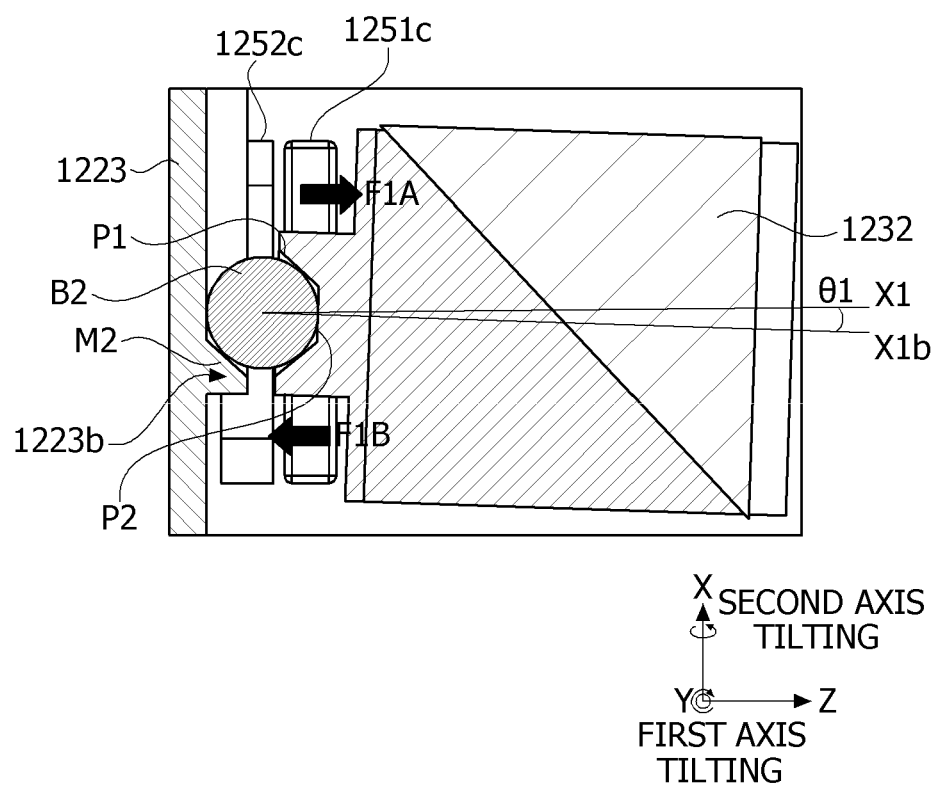

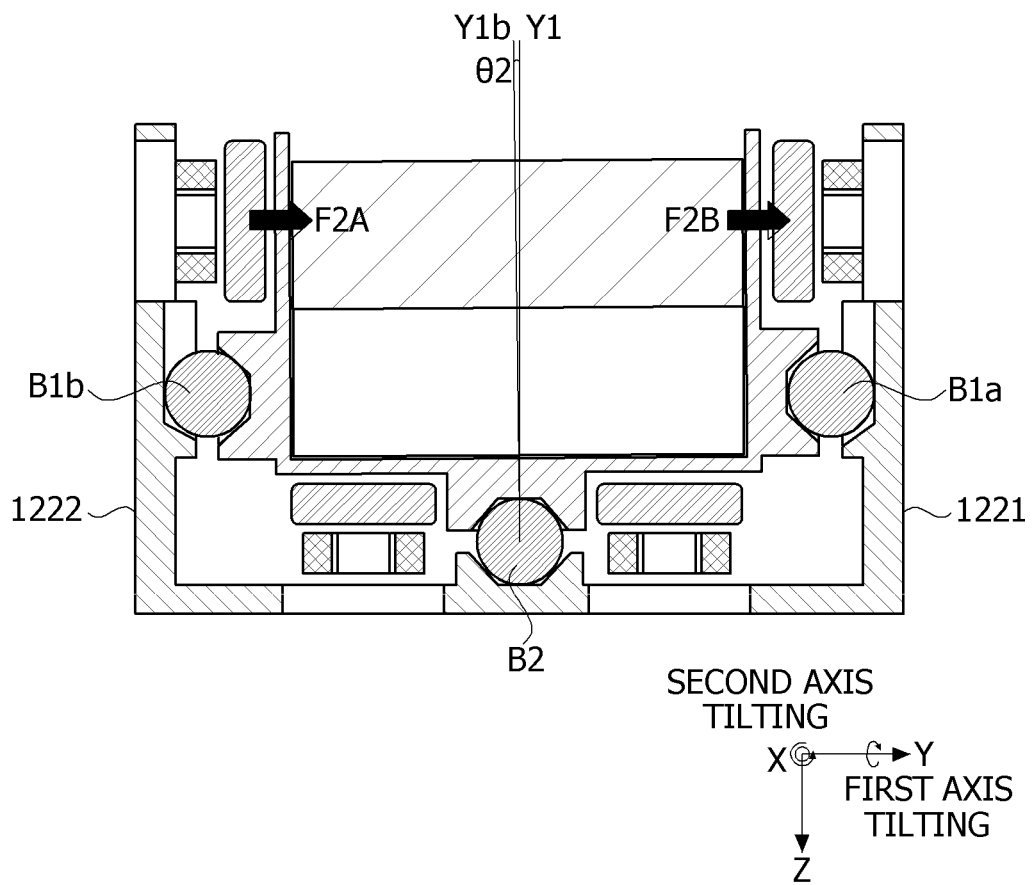

5000

CAMERA ACTUATOR INCLUDING BALLS DISPOSED IN A MOVER AND CAMERA MODULE INCLUDING SAME

CROSS-REFERENCE TO RELATED APPLICATIONS

This application is the U.S. national stage application of International Patent Application No. PCT/KR2020/013727, filed Oct. 8, 2020, which claims the benefit under 35 U.S.C. § 119 of Korean Application Nos. 10-2019-0124801, filed Oct. 8, 2019; 10-2019-0128082, filed Oct. 15, 2019; and 10-2019-0173177, filed Dec. 23, 2019; the disclosures of each of which are incorporated herein by reference in their entirety.

TECHNICAL FIELD

The present invention relates to a camera actuator and a camera module including the same.

BACKGROUND ART

Cameras are devices that capture an image or a video of a subject and are mounted on portable devices, drones, vehicles, or the like. A camera module may have an image stabilization (IS) function of correcting or inhibiting image shake caused by user movement to improve image quality, an auto focusing (AF) function of automatically adjusting an interval between an image sensor and a lens to adjust a focal length of a lens, and a zooming function of increasing or decreasing a magnification of a subject at a long distance through a zoom lens to photograph the subject.

Meanwhile, as the density of pixels increases, a resolution of an image sensor increases, and a size of the pixel decreases. As the pixel becomes smaller, an amount of light received for the same time decreases. Therefore, as the density of pixels increases in cameras, an image shake phenomenon, which is caused by a hand shake that occurs when a shutter speed is decreased in a dark environment, may become severe. As a representative image stabilization (IS) technology, there is an optical image stabilizer (OIS) technology that a technology for correcting motion by changing a path of light.

According to a general OIS technology, movement of a camera may be detected through a gyro sensor or the like, and a lens may be tilted or moved based on the detected movement, or a camera module including a lens and an image sensor may be tilted or moved. When a lens or a camera module including a lens and an image sensor is tilted or moved for an OIS, an additional space for tilting or moving needs to be secured around the lens or camera module.

Meanwhile, an actuator for an OIS may be disposed around a lens. In this case, the actuator for an OIS may include actuators for tilting with respect to two axes perpendicular to an optical axis Z, that is, one actuator for tilting with respect to an X-axis and the other actuator for tilting with respect to a Y-axis.

However, according to the needs for ultra-slim and ultra-miniature camera modules, there may be a large space constraint for arranging an actuator for an OIS, and it may be difficult to secure a sufficient space in which a lens or a camera module including a lens and an image sensor may be tilted or moved for an OIS. In addition, as the density of pixels increases in cameras, it is desirable that a size of a lens increases in order to increase an amount of received light. Due to a space occupied by the actuator for an OIS, there is a limitation in increasing the size of the lens.

In addition, when a zooming function, an AF function, and an OIS function are all included in a camera module, there is a problem in that a magnet for an OIS and a magnet for an AF or zooming are disposed close to each other to cause magnetic field interference.

DISCLOSURE

Technical Problem

The present invention is directed to providing a camera actuator applicable to an ultra-slim, ultra-miniature, and high-resolution camera.

The present invention is also directed to providing a prism driving device or camera actuator allowing a size of a product to be reduced.

In addition, according to the present invention, a shake correction unit is disposed to solve a restriction on a size of a lens in a lens assembly of an optical system when an optical image stabilizer (OIS) is implemented, thereby securing a sufficient amount of light.

Technical Solution

According to an embodiment of the present invention, a camera actuator includes a housing, a mover on which an optical member is seated and which is disposed in the housing, a ball part including first balls and a second ball disposed between the housing and the mover, and a driving unit disposed in the housing and configured to drive the mover, wherein the mover includes first protrusions extending toward the housing and including recesses, and the recess includes a side surface, on which the ball part is seated and by which at least a portion of the recess is spaced apart from the ball part, and a bottom surface in contact with the side surface.

The driving unit may rotate the mover in a first direction or a second direction perpendicular to the first direction.

The mover may include a first mover outer surface, a second mover outer surface facing the first mover outer surface, and a third mover outer surface disposed between the first mover outer surface and the second mover outer surface, and the first protrusions may include a first-first protrusion disposed on the first mover outer surface, a first-second protrusion disposed on the second mover outer surface, and a first-third protrusion disposed on the third mover outer surface.

The recesses may include a first recess formed in the first-first protrusion, a second recess formed in the first-second protrusion, and a third recess formed in the first-third protrusion.

The first balls may include a first-first ball disposed in the first recess and a first-second ball disposed in the second recess, and the second ball may be disposed in the third recess.

The first-first ball may be in contact with a bottom surface of the first recess at a first point, and the first-second ball may be in contact with a bottom surface of the second recess at a second point.

The first point and the second point may overlap each other in the second direction.

The first-first protrusion and the first-second protrusion may overlap each other in the second direction.

The first-third protrusion may be disposed between the first-first protrusion and the first-second protrusion.

The driving unit may include a driving magnet and a driving coil, the driving magnet may include a first magnet, a second magnet, and a third magnet, the driving coil may include a first coil, a second coil, and a third coil, the first magnet and the second magnet may be disposed symmetrically with each other on the basis of the first direction on the mover, the first coil and the second coil may be disposed symmetrically with each other on the basis of the first direction between the housing and the mover, the third magnet may be disposed between the first magnet and the second magnet, and the third coil may be disposed between the first coil and the second coil.

According to another embodiment of the present invention, a camera actuator includes a lens member, a shaper member disposed on the lens member to reversibly deform a shape of the lens member, a prism unit disposed on the shaper member, a housing rotatably connected to the prism unit, and a driving unit configured to tilt the shaper member about a first axis and tilt the prism unit about a second axis perpendicular to the first axis, wherein the driving unit includes a magnet driving unit and a coil driving unit, the magnet driving unit includes a first magnet driving unit, a second magnet driving unit, and a third magnet driving unit, the coil driving unit includes a first coil driving unit, a second coil driving unit, and a third coil driving unit, the first magnet driving unit and the second magnet driving unit are disposed symmetrically with each other on the basis of the first axis on the shaper member, the third magnet driving unit is disposed on the prism unit, and the first coil driving unit, the second coil driving unit, and the third coil driving unit are disposed to face the first magnet driving unit, the second magnet driving unit, and the third magnet driving unit, respectively.

The shaper member may include a shaper body having a hole, through which light may pass, formed therein, and a first protrusion and a second protrusion which extend from both sides of the shaper body, the lens member may be disposed under the shaper body, and the first magnet driving unit and the second magnet driving unit may be disposed on the first protrusion and the second protrusion, respectively.

The camera actuator may further include a circuit board, wherein the circuit board includes a first surface, a second surface disposed to face the first surface, a third surface disposed between the first surface and the second surface to connect the first surface and the second surface, and a fourth surface extending from the third surface to be inclined, the first coil driving unit is disposed on the first surface, the second coil driving unit is disposed on the second surface, and the third coil driving unit is disposed on the fourth surface.

The fourth surface and the third coil driving unit may be disposed between the prism unit and the housing.

The housing may include a cover and a base fixed to the cover, and the base may be disposed between the cover and the fourth surface of the circuit board to support the fourth surface.

A rotation guide may protrude from the prism unit in a second axis direction, and the rotation guide may be rotatably connected in a groove formed in the base.

A rotation guide may protrude from the base in the second axis direction, and the rotation guide may be rotatably connected in a groove formed in the prism unit.

A sensing magnet may be further disposed on the prism unit to be adjacent to the third magnet driving unit, and a Hall sensor may be further disposed on the fourth surface of the circuit board to face the sensing magnet.

At least one Hall sensor may be further disposed on at least one of the first and second surfaces of the circuit board to be surrounded by at least one of the first coil driving unit and the second coil driving unit.

The prism unit may be tilted about the second axis within a range of 4°.

According to still another embodiment of the present invention, a camera module includes a first actuator configured to perform at least one of zooming and auto focusing, and a second actuator configured to perform shake correction, wherein the second actuator includes a lens member, a shaper member disposed on the lens member to reversibly deform a shape of the lens member, a prism unit disposed on the shaper member, a housing rotatably connected to the prism unit, and a driving unit configured to tilt the shaper member about a first axis and tilt the prism unit about a second axis perpendicular to the first axis, the driving unit includes a magnet driving unit and a coil driving unit, the magnet driving unit includes a first magnet driving unit, a second magnet driving unit, and a third magnet driving unit, the coil driving unit includes a first coil driving unit, a second coil driving unit, and a third coil driving unit, the first magnet driving unit and the second magnet driving unit are disposed symmetrically with each other on the basis of the first axis on the shaper member, the third magnet driving unit is disposed on the prism unit, and the first coil driving unit, the second coil driving unit, and the third coil driving unit are disposed to face the first magnet driving unit, the second magnet driving unit, and the third magnet driving unit, respectively.

According to yet another embodiment of the present invention, a camera actuator includes a housing, a prism mover disposed in the housing, a prism disposed on the prism mover, a first driving unit disposed in the prism mover, a second driving unit disposed in the housing and facing the first driving unit, and a guide part disposed between the housing and the prism mover to guide tilting of the prism mover, wherein the guide part includes a coupling portion coupled to the prism mover and a spherical portion extending from the coupling portion, and the housing includes a first groove in which the spherical portion is disposed.

A size of a cross section of the spherical portion may be formed to be greater than a size of a cross section of the coupling portion.

The first groove of the housing may be formed to be greater than the spherical portion.

The guide part may include a protrusion protruding outward from the spherical portion.

The protrusion may be formed in a partially spherical shape.

The protrusion may include a plurality of protrusions spaced apart from each other.

The first groove of the housing may include a curved surface.

The first groove may include a first area having a first diameter and a second area having a diameter that becomes smaller than the first diameter as the first area is closer to the prism mover.

The first groove may include a third area having a diameter that becomes smaller than the first diameter as the first area is further away from the prism mover.

The cross section of the coupling portion may be formed in a quadrangular shape.

The coupling portion may be formed integrally with the prism mover.

The prism mover may include a second groove in which the coupling portion is disposed.

The prism mover may include a first side surface, a second side surface facing the first side surface, an inclined portion configured to connect the first side surface and the second side surface and having a certain inclination, and a support portion extending downward from the inclined surface, and the second groove may be formed in a surface of the support portion facing the housing.

The first driving unit may include a first magnet unit and a second magnet unit disposed on a first side surface of the prism mover and a third magnet unit and a fourth magnet unit disposed on a second side surface facing the first side surface of the prism mover, and the second driving unit may include a first coil unit and a second coil unit disposed on a first sidewall of the housing, and a third coil unit and a fourth coil unit disposed on a second sidewall facing the first sidewall of the housing.

A length of each of the first and third magnet units in a first direction may be formed to be greater than a length of each of the second and fourth magnet units in the first direction, and a length of each of the first and third magnet units in a second direction perpendicular to the first direction may be formed to be smaller than a length of each of the second and fourth magnet units in the second direction.

A length of each of the first and third coil units in the first direction may be formed to be smaller than a length of each of the second and fourth coil units in the first direction, and a length of each of the first and third coil units in the second direction may be formed to be greater than a length of each of the second and fourth coil units in the second direction.

The camera actuator may include a yoke disposed between the first driving unit and the prism mover.

The camera actuator may include a board disposed in the housing, and the second driving unit may be electrically connected to the board.

Advantageous Effects

According to embodiments of the present invention, there can be provided a camera actuator applicable to an ultra-slim, ultra-miniature, and high-resolution camera. In particular, an actuator for an optical image stabilizer (OIS) can be efficiently disposed without increasing an overall size of a camera module.

According to embodiments of the present invention, X-axis direction tilting and Y-axis direction tilting may not cause magnetic field interference in each other, may be implemented with a stable structure, and may not cause magnetic field interference in an actuator for auto focusing (AF) or zooming, thereby implementing an accurate OIS function.

According to embodiments of the present invention, a restriction on a size of a lens can be solved, thereby securing a sufficient amount of light and implementing an OIS having low power consumption.

DESCRIPTION OF DRAWINGS

FIG. 3B is a side cross-sectional view of the first camera module shown in FIG. 3A.

FIG. 5B is a top view of the housing according to the embodiment.

FIG. 5C is a bottom view of the housing according to the embodiment.

FIG. 5G is a perspective view of the housing in still another direction.

FIG. 11 is a view along line B-B' in FIG. 8.

FIGS. 12A and 12B are views for describing first axis tilting of the second camera actuator according to an embodiment.

FIGS. 13A and 13B are views for describing second axis tilting of the second camera actuator according to an embodiment.

MODES OF THE INVENTION

While the present invention is open to various modifications and alternative embodiments, specific embodiments thereof will be described and shown by way of example in the accompanying drawings. However, it should be understood that there is no intention to limit the present invention to the particular embodiments disclosed, and on the contrary, the present invention is to cover all modifications, equivalents, and alternatives falling within the spirit and scope of the present invention.

It should be understood that, although the terms including ordinal numbers such as first, second, and the like may be used herein to describe various elements, the elements are not limited by the term. These terms are only used for the purpose of distinguishing one element from another. For example, without departing from the scope of the present invention, a second element could be termed a first element, and similarly a first element could be also termed a second element. The term "and/or" includes any one or all combinations of a plurality of associated listed items.

In the case that one component is described as being "connected" or "linked" to another component, it may be connected or linked to the corresponding component directly or other components may be present therebetween. On the other hand, in the case that one component is described as being "directly connected" or "directly linked" to another component, it should be understood that other components are not present therebetween.

It is to be understood that terms used herein are for the purpose of the description of particular embodiments and not for limitation. A singular expression includes a plural expression unless the context clearly indicates otherwise. It will be further understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless defined otherwise, all the terms (including technical and scientific terms) used herein have the same meaning as commonly understood by one of ordinary skill in the art to which the present invention belongs. It will be further understood that the terms, such as those defined in commonly used dictionaries, should be interpreted as having meanings that are consistent with their meanings in the context of the relevant art and should not be interpreted in an idealized or overly formal sense unless expressly defined otherwise herein.

Hereinafter, embodiments will be described in detail with reference to the accompanying drawings, and the same or corresponding elements will be given the same reference numbers regardless of drawing symbols, and redundant descriptions will be omitted.

Figure 1:
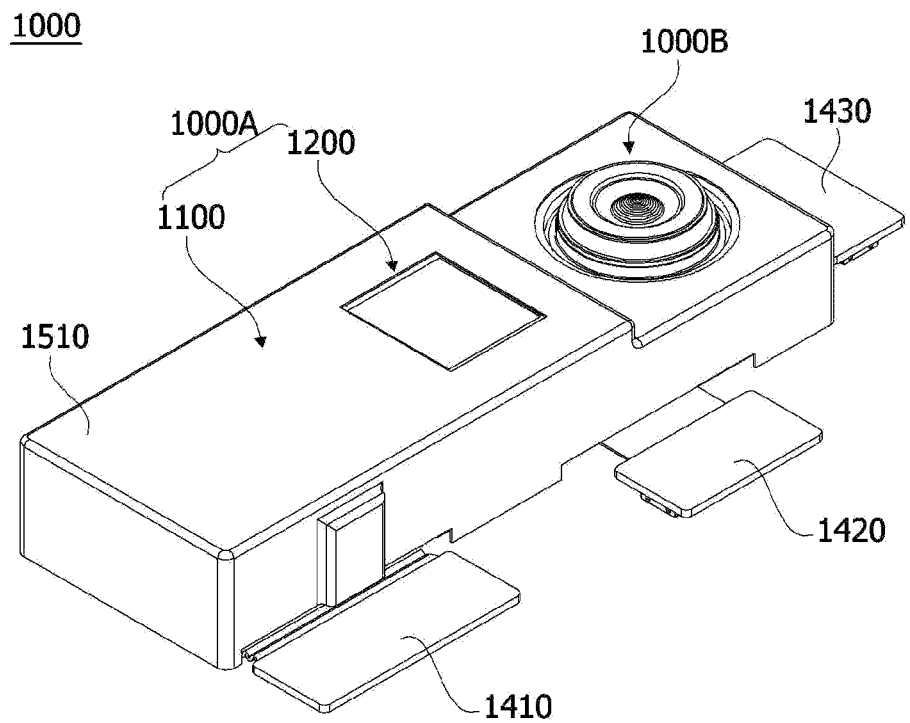
FIG. 1 is a perspective view illustrating a camera module according to an embodiment.
Figure 2A:
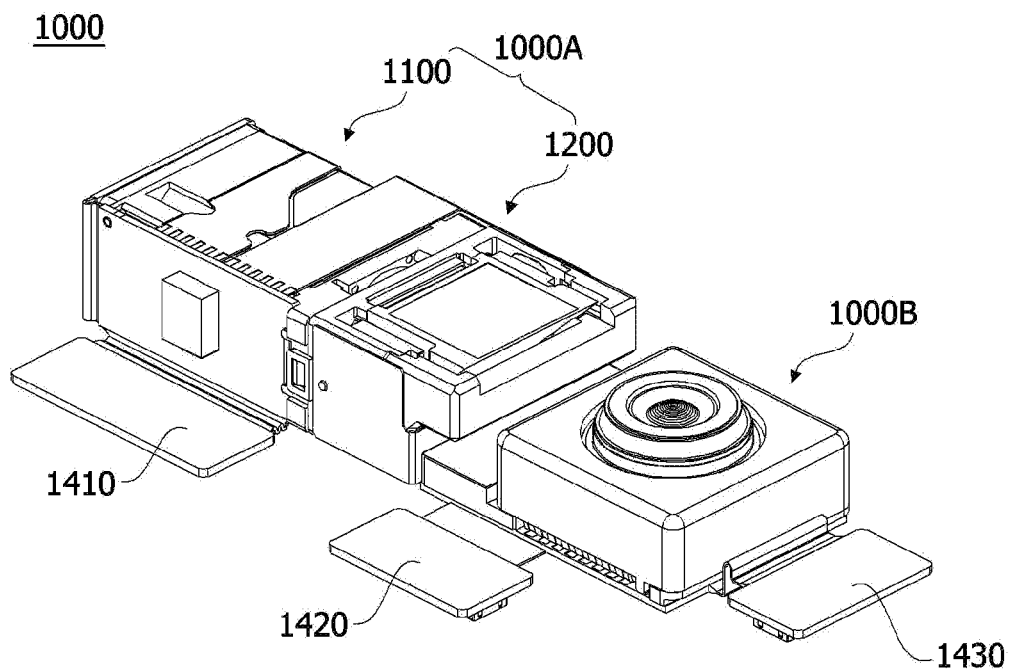
FIG. 2A is a perspective view illustrating the camera module shown in FIG. 1 from which a shield can is removed.
Figure 2B:
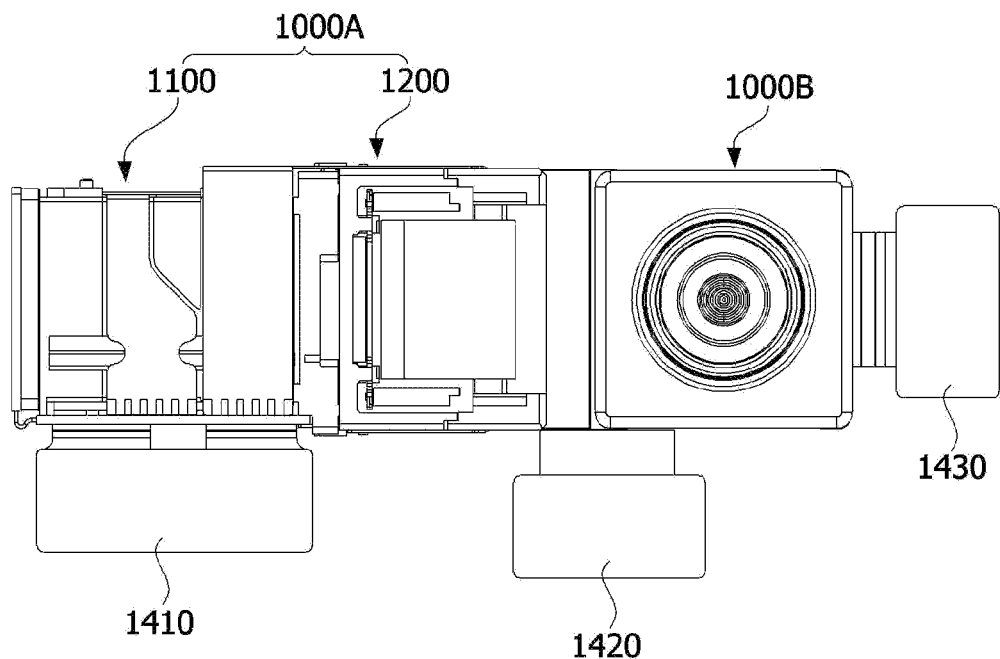
FIG. 2B is a plan view of the camera module shown in FIG. 2A.

FIG. 1 is a perspective view illustrating a camera module according to an embodiment, FIG. 2A is a perspective view illustrating the camera module shown in FIG. 1 from which a shield can is removed, and FIG. 2B is a plan view of the camera module shown in FIG. 2A.

Referring to FIG. 1, a camera module 1000 may include one or more camera modules. For example, the camera module 1000 may include a first camera module 1000A and a second camera module 1000B. The first camera module 1000A and the second camera module 1000B may be covered by a certain shield can 1210.

Referring to FIGS. 1, 2A, and 2B together, the first camera module 1000A may include one or more actuators. For example, the first camera module 1000A may include a first camera actuator 1100 and a second camera actuator 1200. Hereinafter, the camera actuator will be used interchangeably with "actuator" or the like.

The first camera actuator 1100 may be electrically connected to a circuit board 1410 in a first group, the second camera actuator 1200 may be electrically connected to a circuit board 1420 in a second group, and although not shown, the circuit board 1420 of the second group may be electrically connected to the circuit board 1410 of the first group. The second camera module 1000B may be electrically connected to a circuit board 1430 in a third group.

The first camera actuator 1100 may be a zoom actuator or an auto focusing (AF) actuator. For example, the first camera actuator 1100 may support one or more lenses and may move the lenses according to a control signal of a certain control unit to perform an AF function or a zooming function.

The second camera actuator 1200 may be an optical image stabilizer (OIS) actuator.

The second camera module 1000B may include a fixed focal length lens disposed in a certain barrel (not shown). The fixed focal length lens may be referred to as a "single focal length lens" or a "single lens."

The second camera module 1000B may be disposed in a certain housing (not shown) and may include an actuator (not shown) capable of driving a lens unit. The actuator may be a voice coil motor, a micro actuator, a silicone actuator, or the like and may be applied as various types such as a capacitive type, a thermal type, a bimorph type, and an electrostatic force type, but the present invention is not limited thereto.

Figure 3A:
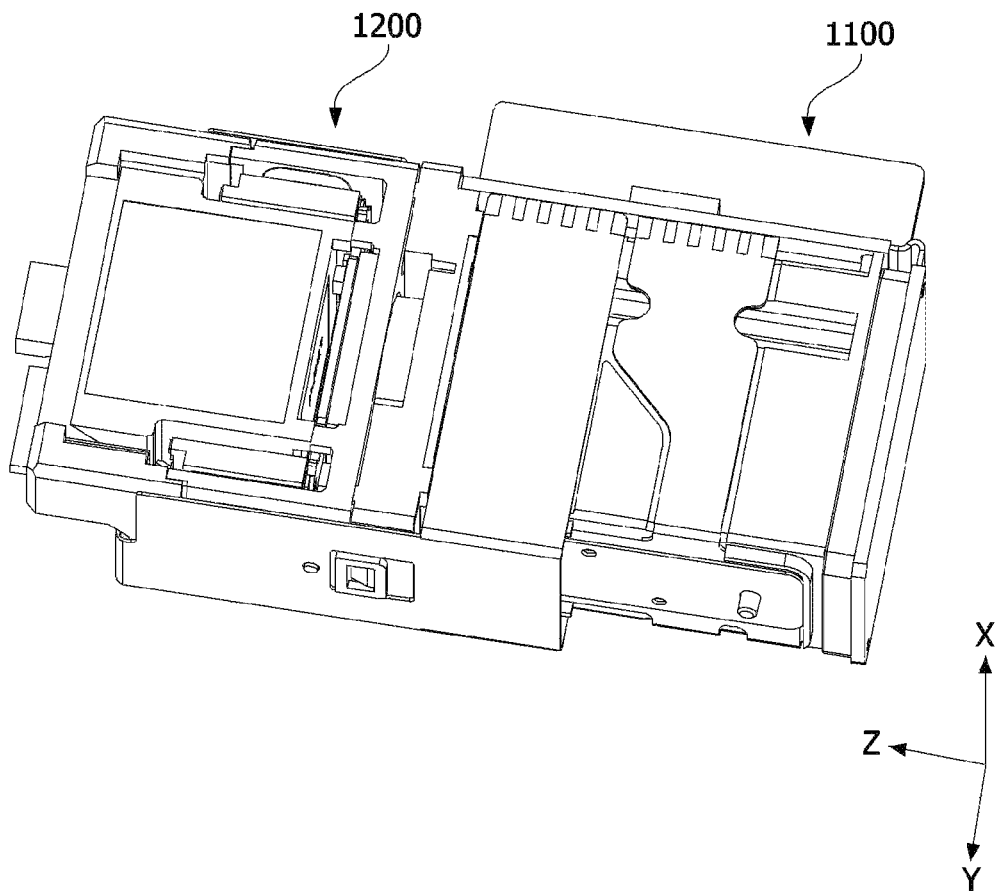
FIG. 3A is a perspective view of a first camera module shown in FIG. 2A.

Next, FIG. 3A is a perspective view of the first camera module shown in FIG. 2A, and FIG. 3B is a side cross-sectional view of the first camera module shown in FIG. 3A.

Referring to FIG. 3A, the first camera module 1000A may include the first camera actuator 1100 configured to perform a zooming function and an AF function and the second camera actuator 1200 disposed at one side of the first camera actuator 1100 and configured to perform an OIS function.

Referring to FIG. 3B, the first camera actuator 1100 may include an optical system and a lens driving unit. For example, at least one of a first lens assembly 1110, a second lens assembly 1120, a third lens assembly 1130, and a guide pin 50 may be disposed in the first camera actuator 1100.

In addition, the first camera actuator 1100 may include a driving coil 1140 and a driving magnet 1160 to perform a high-magnification zooming function.

For example, the first lens assembly 1110 and the second lens assembly 1120 may be moving lenses which are moved through the driving coil 1140, the driving magnet 1160, and the guide pin 50, and the third lens assembly 1130 may be a fixed lens, but the present invention is not limited thereto. For example, the third lens assembly 1130 may perform a function of a focator for forming an image of light at a specific position, and the first lens assembly 1110 may perform a function of a variator for re-forming the image formed by the third lens assembly 1130, which is the focator, at a different position. Meanwhile, in the first lens assembly 1110, due to many changes in a distance to a subject or an image distance, a change in magnification may be large, and the first lens assembly 1110 that is the variator may play an important role in a change in focal length or magnification of an optical system. Meanwhile, an image point, at which an image is formed by the first lens assembly 1110 that is the variator, may be slightly different according to positions. Accordingly, the second lens assembly 1120 may perform a function of compensating a position of an image formed by the variator. For example, the second lens assembly 1120 may perform a function of a compensator for accurately forming an image point, at which an image is formed by the first lens assembly 1110 that is the variator, at an actual position of an image sensor 1190.

For example, the first lens assembly 1110 and the second lens assembly 1120 may be driven by an electromagnetic force due to an interaction between the driving coil 1140 and the driving magnet 1160.

The certain image sensor 1190 may be disposed perpendicular to an optical axis direction of parallel light.

Next, the second camera actuator 1200 will be described in detail below through various embodiments.

In addition, in the camera module according to the camera module, an OIS can be implemented by controlling an optical path through the camera actuator, thereby minimizing the occurrence of a decentering or tilting phenomenon and providing the superior optical characteristics.

Since FIGS. 1 to 3 and descriptions with reference thereto are provided for the purpose of describing the overall structure and operation principle of the camera module according to the embodiment of the present invention, embodiments of the present invention are not limited to the detailed configuration shown in FIGS. 1 to 3.

Meanwhile, when an actuator for an OIS and an actuator for AF or zooming are disposed according to embodiments of the present invention, magnetic field interference with a magnet for AF or zooming can be inhibited when an OIS is driven. Since a driving magnet of the second camera actuator 1200 is disposed separately from the first camera actuator 1100, magnetic field interference between the first camera actuator 1100 and the second camera actuator 1200 can be inhibited. In the present specification, an OIS may be used interchangeably with a term such as hand shake correction, optical image stabilization, optical image correction, or shake correction.

Hereinafter, a control method of the second camera actuator and the detailed structure thereof according to one embodiment of the present invention will be described in more detail through various embodiments.

Figure 4A:
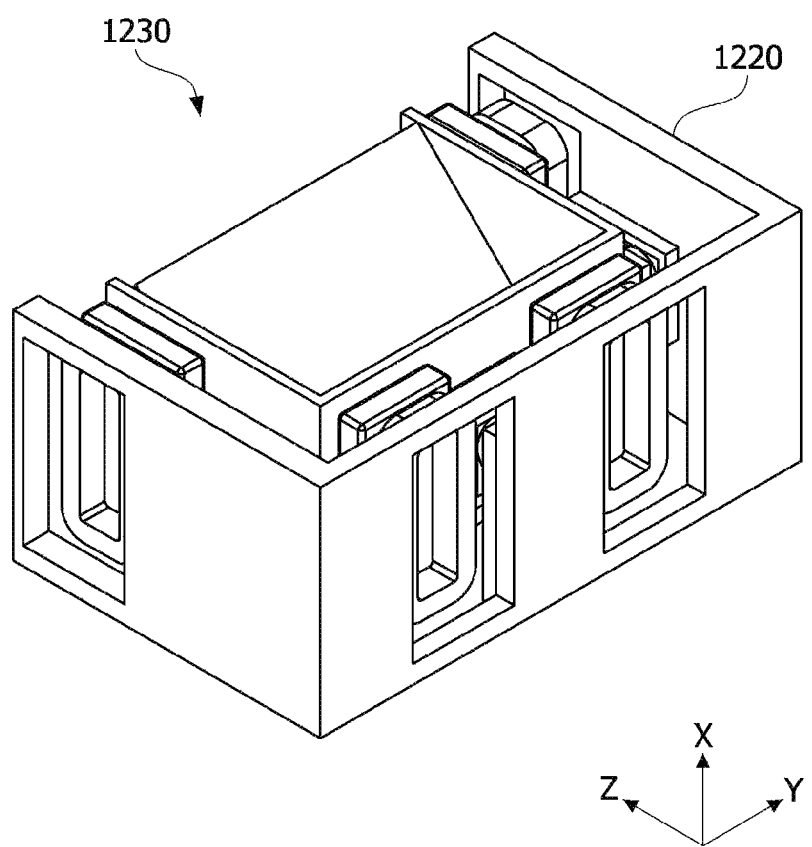
FIG. 4A is a view illustrating a second camera actuator from which a shield can and a board unit are removed according to an embodiment.

FIG. 4A is a view illustrating the second camera actuator from which a shield can and a board unit are removed according to an embodiment.

Figure 4B:
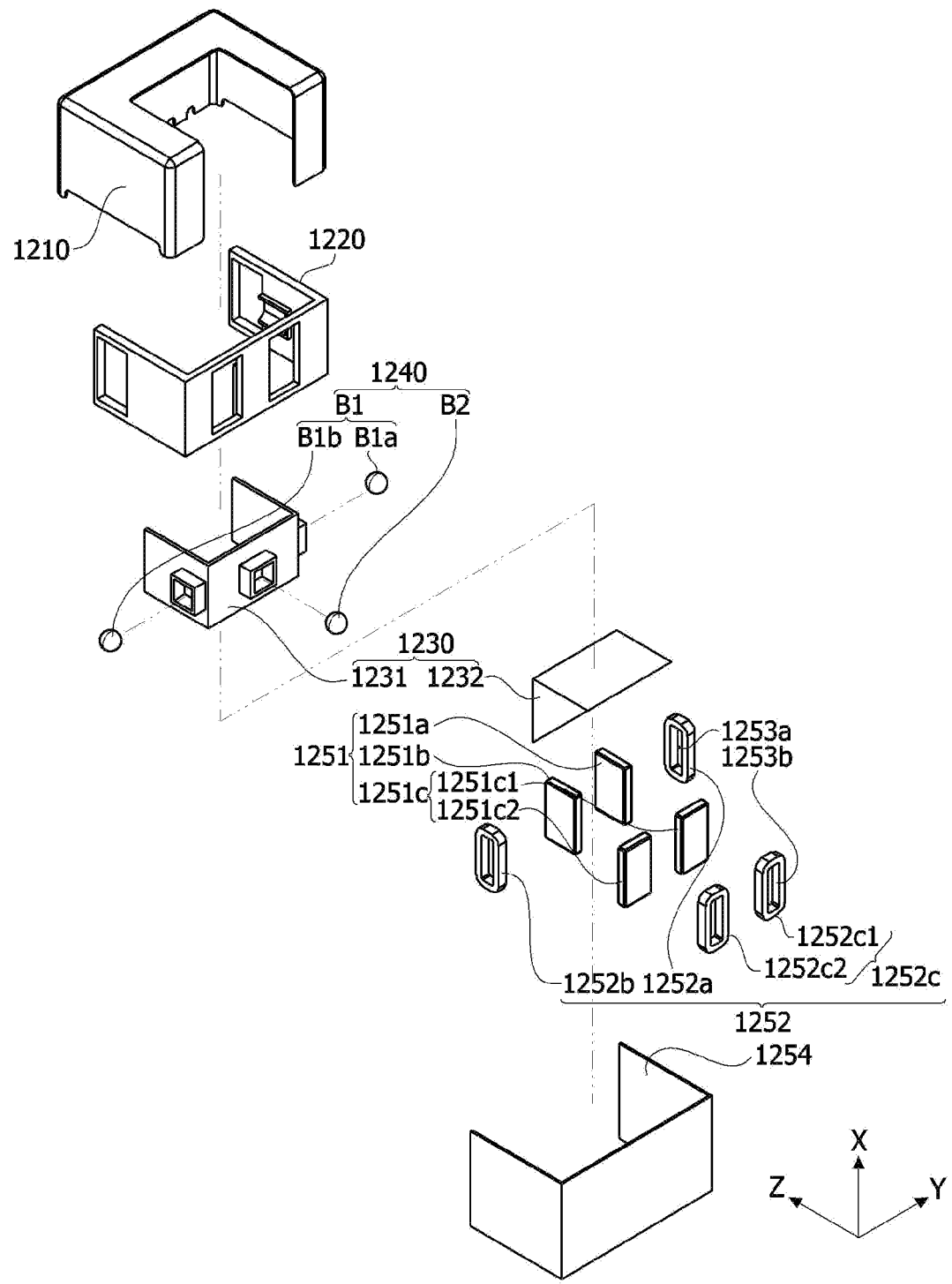
FIG. 4B is an exploded perspective view of the second camera actuator according to the embodiment.

Referring to FIGS. 4A and 4B, the second camera actuator 1200 according to the embodiment includes a shield can 1210, a housing 1220, a mover 1230, a ball part 1240, and a driving unit 1250.

The shield can 1210 may be positioned at an outermost side of the second camera actuator 1200 to surround the driving unit 1250.

In addition, the shield can 1210 may block or reduce electromagnetic waves generated from the outside. Accordingly, it is possible to inhibit the occurrence of a malfunction in the driving unit 1250 or the like.

The housing 1220 may be positioned inside the shield can 1210. In addition, the housing 1220 may be positioned inside a board unit 1254 to be described below. The housing 1220 and the shield can 1210 may be coupled by being fitted into or assembled with each other.

The housing 1220 may include a first housing side portion, a second housing side portion, and a third housing side portion. The first housing side portion and the second housing side portion may be disposed to face each other. The third housing side portion may be disposed between the first housing side portion and the second housing side portion. The first to third housing side portions may be positioned to surround the mover. Accordingly, it is possible to minimize an impact applied to the mover. Detailed descriptions thereof will be provided below.

Here, a first direction may be an X-axis direction in the drawings and may be used interchangeably with a second axis direction or the like. A second direction may be a Y-axis direction in the drawings. In addition, it will be described below that a Y-axis is a first axis, and an X-axis is a second axis. The second direction is a direction perpendicular to the first direction. In addition, a third direction may be a Z-axis direction in the drawings and may be used interchangeably with a third axis. The third direction is a direction perpendicular to both the first direction and the second direction. In addition, the third direction (Z-axis direction) may correspond to an optical axis direction, and the first direction (X-axis direction) and the second direction (Y-axis direction) may be directions perpendicular to an optical axis and may be tilted by the second camera actuator.

The mover 1230 includes a holder 1231 and an optical member 1232 seated on the holder 1231.

The holder 1231, along with the optical member 1232, may be seated in an accommodating portion of the housing 1220. The holder 1231 may include first to third holder outer surfaces corresponding to the first to third housing side portions, respectively.

The holder 1231 may include first protrusions protruding toward the housing 1220 from the first to third holder outer surfaces. The first protrusion may include a recess, and the ball part 1240 may be disposed in the recess. Detailed descriptions thereof will be provided below.

In addition, the optical member 1232 may be seated on the holder 1231. To this end, the holder 1231 may have a seating surface, and the seating surface may be formed by an accommodating groove.

In addition, the optical member 1232 may include a reflective portion (for example, a mirror or a prism) disposed therein. However, the present invention is not limited thereto. The optical member 1232 may reflect light, which is reflected from the outside (for example, an object), into the camera module. In other words, the optical member 1232 may change a path of reflected light to overcome a space constraint of the first camera actuator and the second camera actuator. Thus, it should be understood that a thickness of the camera module may be minimized and an optical path may extend to provide a high range of magnification.

Furthermore, the optical member 1232 may be an optical element or an optical module. Accordingly, it should be understood that the optical member 1232 may be formed as a mirror, a lens, a prism, or the like.

The ball part 1240 may include first balls B1 and a second ball B2. The mover 1230 (or the holder 1231) may perform second axis tilting or X-axis tilting with respect to the first ball B1. The mover 1230 (or the holder 1231) may perform first axis tilting or Y axis tilting with respect to the second ball B2.

The first balls B1 and the second ball B2 may be disposed between the first to third housing side portions and the first to third holder outer surfaces. For example, a first-first ball B1a may be disposed between the first holder outer surface and the first housing side portion and pressed by the first holder outer surface or the first housing side portion. In addition, a first-second ball B1b may be disposed between the second holder outer surface and the second housing side portion and pressed by the second holder outer surface or the second housing side portion. In addition, the second ball B2 may be disposed between the third housing side portion and the third holder outer surface and pressed by the third housing side portion and the third holder outer surface. Due to such a configuration, the housing 1220 and the holder 1231 may be coupled to each other through the first balls B1 and the second ball B2.

In addition, in the present specification, a lubricant may be applied in the recesses or grooves in which the first ball B1 and the second ball B2 are seated. That is, it should be understood that the lubricant is positioned between the first and second balls B1 and B2 and the recesses or grooves so that the first axis tilting and the second axis tilting may be easily performed.

The driving unit 1250 includes a driving magnet 1251, a driving coil 1252, a Hall sensor unit 1253, and a board unit 1254.

The driving magnet 1251 may include a plurality of magnets. In an embodiment, the driving magnet 1251 may include a first magnet 1251a, a second magnet 1251b, and third magnets 1251c.

The first magnet 1251a, the second magnet 1251b, and the third magnets 1251c may be positioned on the outer surfaces of the holder 1231. The first magnet 1251a and the second magnet 1251 b may be positioned to face each other.

In addition, the third magnet 1251c may be positioned on the third holder outer surface among the outer surfaces of the holder 1231. One or more third magnets 1251c may be provided. Detailed descriptions thereof will be provided below.

The driving coil 1252 may include a plurality of coils. In an embodiment, the driving coil 1252 may include a first coil 1252a, a second coil 1252b, and third coils 1252c.

The first coil 1252a may face the first magnet 1251a. Accordingly, as described above, the first coil 1252a may be positioned on the first housing side portion 1221.

In addition, the second coil 1252b may face the second magnet 1251b. Accordingly, as described above, the second coil 1252b may be positioned on the second housing side portion 1222.

The first coil 1252a may be positioned to face the second coil 1252b. That is, the first coil 1252a may be positioned symmetrically with the second coil 1252b on the basis of the first direction (X-axis direction). This may be equally applied to the first magnet 1251a and the second magnet 1251 b. That is, the first magnet 1251a may be positioned symmetrically with the second magnet 1251 b on the basis of the first direction (X-axis direction).

In addition, the first coil 1252a, the second coil 1252b, the first magnet 1251a, and the second magnet 1251 b may be disposed to at least partially overlap each other in the second direction (Y-axis direction). Due to such a configuration, by an electromagnetic force between the first coil 1252a and the first magnet 1251a and an electromagnetic force between the second coil 1252b and the second magnet 1251b, the X-axis tilting may be accurately performed without a bias toward one side.

The first coil 1252a and the second coil 1252b may be coupled to the board unit 1254. In an embodiment, the first coil 1252a and the second coil 1252b may be electrically connected to the board unit 1254 to allow a current to flow. The current is a component of an electromagnetic force that allows the second camera actuator to be tilted with respect to the X-axis. The board unit 1254 may surround a side surface of the housing 1220 and may be coupled to the housing 1220 through a hole or the like.

The third coil 1252c may face the third magnet 1251c. Accordingly, as described above, the third coil 1252c may be positioned on the third housing side portion 1223.

In an embodiment, the third coil 1252c may be coupled to the board unit 1254. The third coil 1252c may be electrically connected to the board unit 1254 to allow a current to flow. The current is a component of an electromagnetic force that allows the second camera actuator to be tilted with respect to the Y-axis. That is, the third coil 1252c, along with the third magnet 1251c, may generate an electromagnetic force to perform the Y-axis tilting of the mover 1230. Here, the X-axis tilting refers to tilting with respect to the X-axis, and the Y-axis tilting refers to tilting with respect to the Y-axis.

In addition, the plurality of third coils 1252c may be provided to correspond to the third magnets 1251c. Detailed descriptions thereof will be provided below.

The Hall sensor unit 1253 may include a plurality of Hall sensors. In an embodiment, the Hall sensor unit 1253 may include a first Hall sensor 1253a and a second Hall sensor 1253b. The first Hall sensor 1253a may be positioned inside the first coil 1252a or the second coil 1252b. The first Hall sensor 1253a may detect a change in magnetic flux inside the first coil 1252a or the second coil 1252b. Accordingly, a position between the first and second magnets 1251a and 1251b and the first Hall sensor 1253a may be detected. Thus, the second camera actuator according to the embodiment may control the X-axis tilting.

In addition, the second Hall sensor 1253b may be positioned inside the third coil 1252c. The second Hall sensor 1253b may detect a change in magnetic flux inside the third coil 1252c. Accordingly, a position between the third magnet 1251c and the first Hall sensor 1253a may be detected. Thus, the second camera actuator according to the embodiment may control the Y-axis tilting.

The board unit 1254 may be in contact with the first to third housing side portions. The board unit 1254 may be electrically connected to the driving coil 1252 and the Hall sensor unit 1253. For example, the board unit 1254 may be coupled to the driving coil 1252 and the Hall sensor unit 1253 through a soldering or surface mount technology (SMT) method. However, the present invention is not limited to such a method.

The board unit 1254 may be positioned between the shield can 1210 and the housing 1220 and coupled to the shield can 1210 and the housing 1220. A coupling method may be variously performed as described above. Through the coupling, the driving coil 1252 and the Hall sensor unit 1253 may be positioned inside an outer surface of the housing 1220.

The board unit 1254 may include a circuit board having an electrically connectable line pattern, such as a rigid printed circuit board (rigid PCB), a flexible PCB, or a rigid flexible PCB. However, the present invention is not limited to such a type.

Figure 5A:
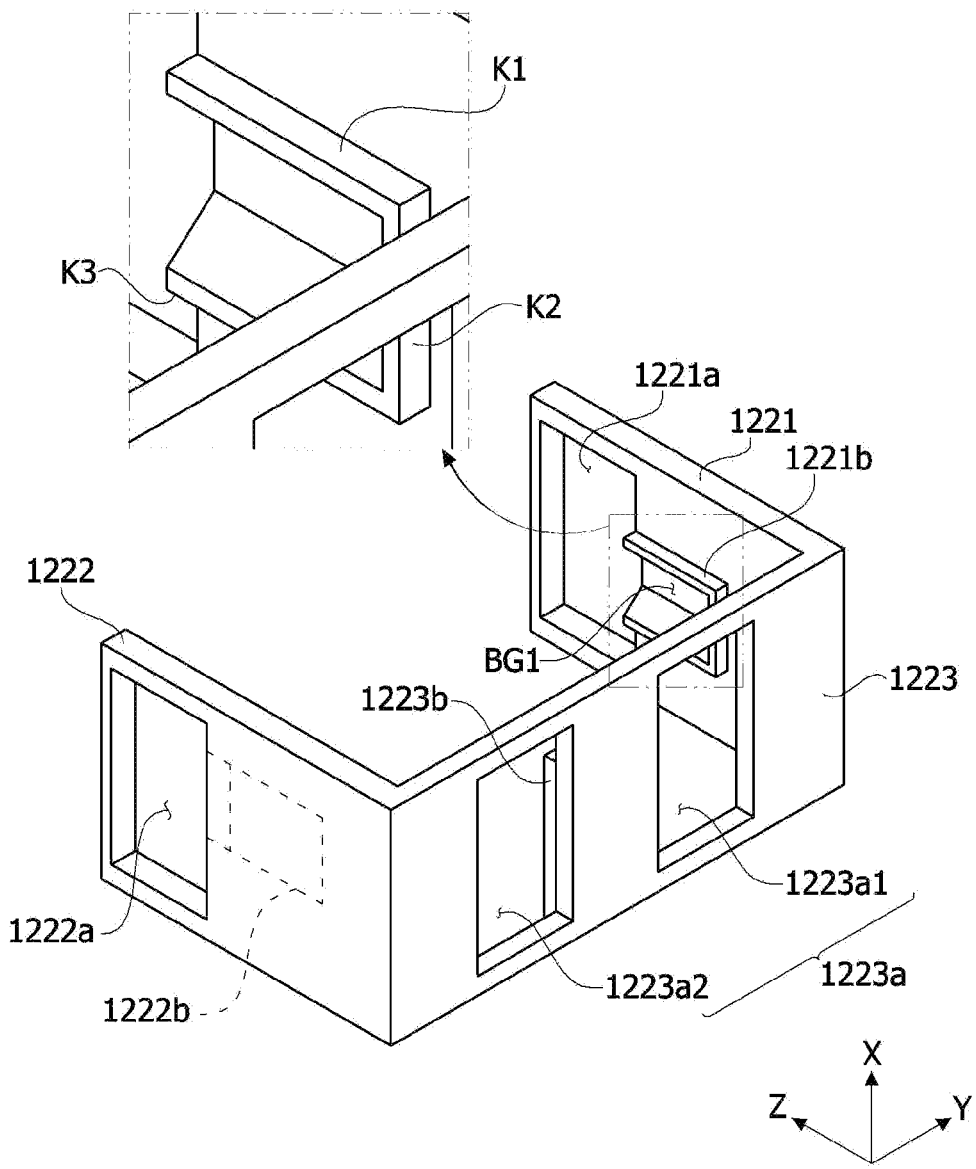
FIG. 5A is a perspective view of a housing according to an embodiment.
Figure 5D:
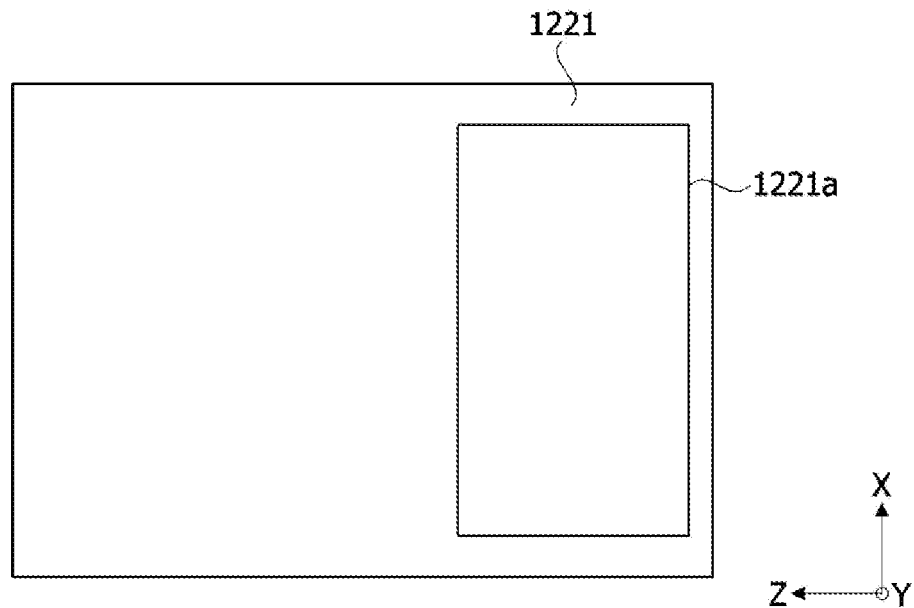
FIG. 5D is a side view of the housing according to the embodiment.
Figure 5E:
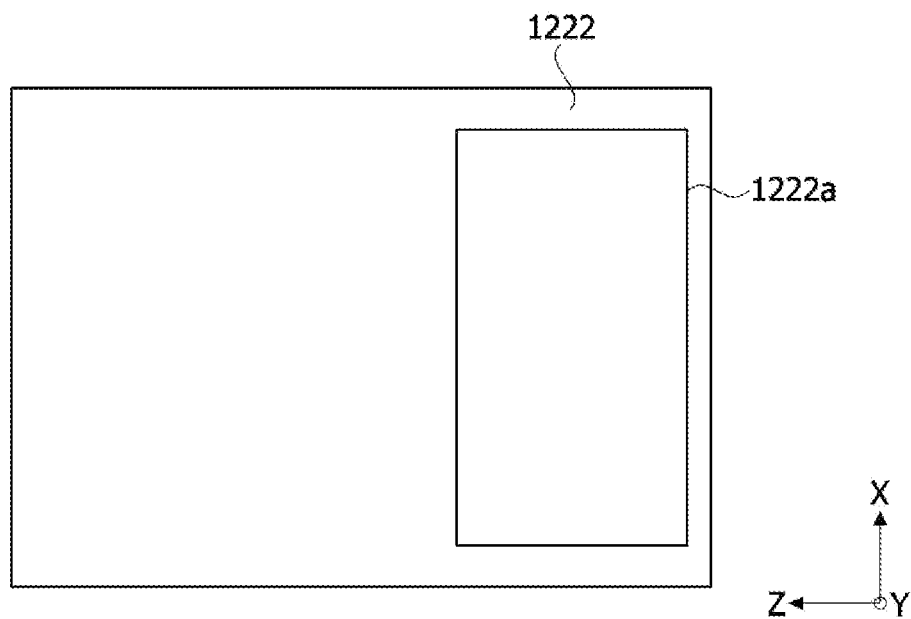
FIG. 5E is another side view of the housing according to the embodiment.
Figure 5F:
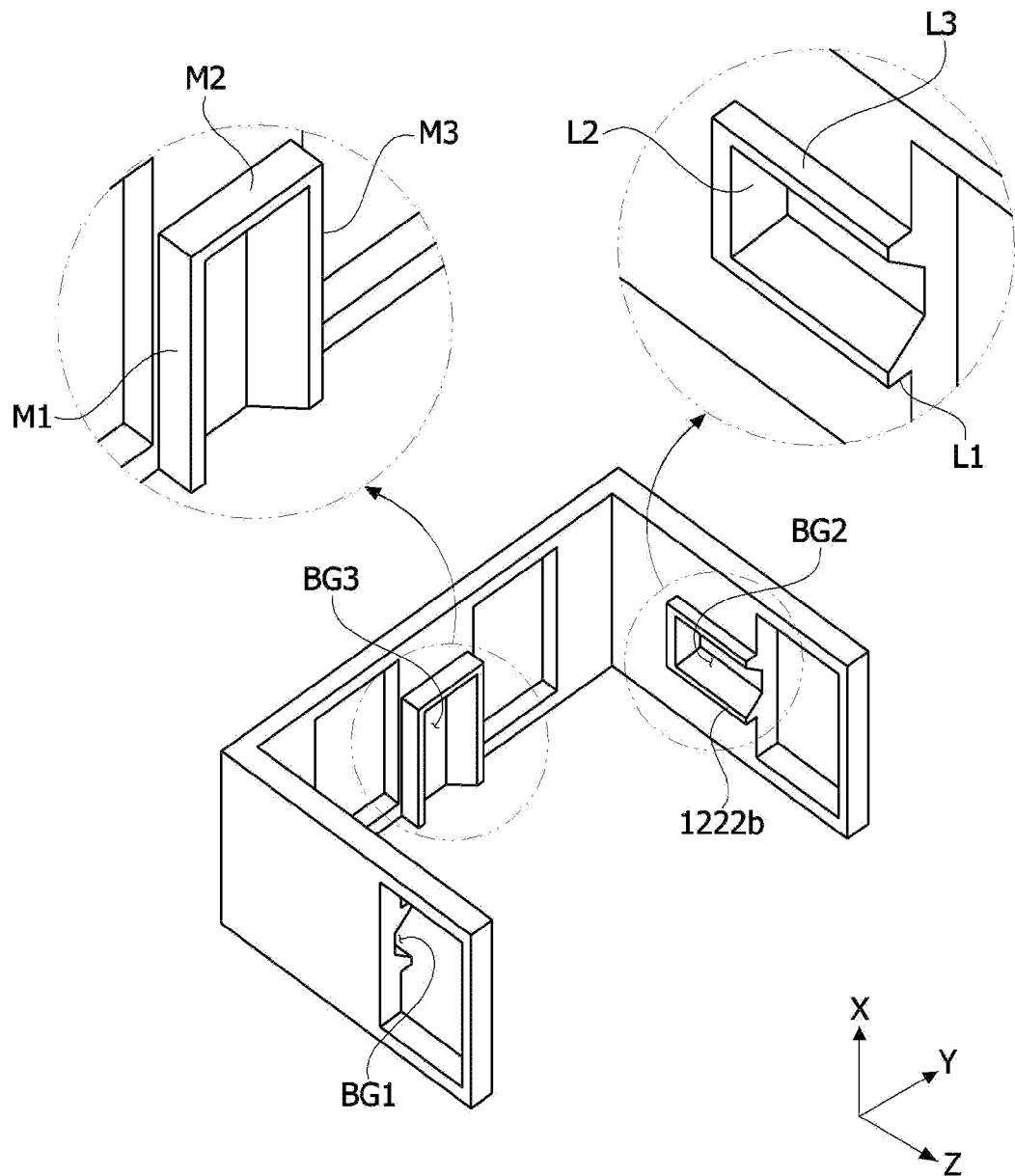
FIG. 5F is a perspective view of the housing in another direction.

FIG. 5A is a perspective view of the housing according to an embodiment. FIG. 5B is a top view of the housing according to the embodiment. FIG. 5C is a bottom view of the housing according to the embodiment. FIG. 5D is a side view of the housing according to the embodiment. FIG. 5E is another side view of the housing according to the embodiment. FIG. 5F is a perspective view of the housing in another direction. FIG. 5G is a perspective view of the housing in still another direction.

Referring to FIGS. 5A to 5G, as described above, the housing 1220 according to the embodiment may include the first housing side portion 1221, the second housing side portion 1222, and the third housing side portion 1223. In the housing 1220, each the housing side portion may include a housing hole and a second protrusion.

In an embodiment, the first housing side portion 1221 may include a first housing hole 1221a. The first coil to be described below may be positioned in the first housing hole 1221a. The board unit may be electrically connected to the first coil through the first housing hole 1221a.

In addition, the first housing side portion 1221 may include a second-first protrusion 1221b protruding from an inner surface thereof toward the mover. The second-first protrusion 1221b may include a first groove BG1, and the first-first ball may be seated in the first groove BG1.

In addition, the second housing side portion 1222 may include a second housing hole 1222a. The second coil to be described below may be positioned in the second housing hole 1222a.

In addition, the second housing side portion 1222 may include a second-second protrusion 1222b protruding from an inner surface thereof toward the mover. The second-second protrusion 1222b may include a second groove BG2, and the first-second ball may be seated in the second groove BG2.

In addition, the third housing side portion 1223 may include third housing holes 1223a. The third coil to be described below may be positioned in the third housing hole 1223a.

In addition, the plurality of third housing holes 1223a may be formed. The third housing holes 1223a may include a third-first housing hole 1223a1 and a third-second housing hole 1223a2. The third-first housing hole 1223a1 and the third-second housing hole 1223a2 may be disposed symmetrically with each other on the basis of the first direction (X-axis direction). A third-first coil and a third-second coil may be disposed in the third-first housing hole 1223a1 and the third-second housing hole 1223a2, respectively. When a current is supplied to the third-first coil and the third-second coil, the Y-axis tilting may be accurately performed without a bias toward one side.

In addition, the third housing side portion 1223 may include a second-third protrusion 1223b protruding from an inner surface thereof toward the mover. The second-third protrusion 1223b may include a third groove BG3, and the second ball may be seated in the third groove BG3.

The second-first protrusion 1221b may overlap the second-second protrusion 1222b in the second direction (Y-axis direction). The first groove BG1 and the second groove BG2 may overlap each other in the second direction (Y-axis direction). Accordingly, the first housing side portion 1221 and the second housing side portion 1222 press the first-first ball and the first-second ball to be coupled to the mover in contact with the first-first ball and the first-second ball. Accordingly, in the second actuator according to the embodiment, when the mover and the housing 1220 are coupled, a force applied to the mover or the housing 1220 does not deviate in the second axis direction, and thus reliability degradation due to a bias of the applied force can be easily inhibited. In addition, the first-first ball and the first-second ball are disposed side by side in the second direction (Y-axis direction) so that the mover may accurately perform the X-axis tilting according to a current applied to the first coil and the second coil.

The second-first protrusion 1221b may be disposed apart from the first housing hole 1221a. The second-first protrusion 1221b may be disposed between the first housing hole 1221a and the third housing hole 1223a. In addition, the second-second protrusion 1222b may be disposed apart from the second housing hole 1222a. The second-second protrusion 1222b may be disposed between the second housing hole 1222a and the third housing hole 1223a. Therefore, the X-axis tilting may be easily performed.

The second-first protrusion 1221b may include a first-first sidewall K1, a first-second sidewall K2, and a first-third sidewall K3. The first-first sidewall K1, the first-second sidewall K2, and the first-third sidewall K3 may be positioned on the inner surface of the first housing side portion 1221.

The first-first sidewall K1 is disposed at an upper side and may extend in the third direction (Z-axis direction). One end of the first-second sidewall K2 may be in contact with the first-first sidewall K1, and the other end thereof may be in contact with the first-third sidewall K3. The first-second sidewall K2 may extend in the first direction (X-axis direction). One end of the first-third sidewall K3 may be in contact with the first-second sidewall K2. The first-third sidewall K3 may extend in the third direction (Z-axis direction).

The first-first sidewall K1 may be positioned above the first-third sidewall K3, and the first-second sidewall K2 may be positioned between the first-first sidewall K1 and the first-third sidewall K3.

In addition, the first groove BG1 may have a shape of which one side is open by the first-first sidewall K1, the first-second sidewall K2, and the first-third sidewall K3. That is, the first groove BG1 may be open toward the first housing hole 1221a (or the first coil). Accordingly, it is possible to secure a sufficient space for arranging the first coil.

In addition, the first-first ball to be described below may be easily seated in the first groove BG1 through an open area of the first groove BG1. Accordingly, the ease of assembly can be improved.

The first-second sidewall K2 may be a stopper for the first-first ball. Accordingly, the first-first ball may be seated at a desired position in the first groove BG1.

The second-second protrusion 1222b may include a second-first sidewall L1, a second-second sidewall L2, and a second-third sidewall L3. The second-first sidewall L1, the second-second sidewall L2, and the second-third sidewall L3 may be positioned on the inner surface of the second housing side portion 1222.

The second-first sidewall L1 may be positioned at an upper side and may extend in the third direction (Z-axis direction). One end of the second-second sidewall L2 may be in contact with the second-first sidewall L1, and the other end thereof may be in contact with the second-third sidewall L3. The second-second sidewall L2 may extend in the first direction (X-axis direction). One end of the second-third sidewall L3 may be in contact with the second-second sidewall L2. The second-third sidewall L3 may extend in the third direction (Z-axis direction).

The second-first sidewall L1 may be positioned above the second-third sidewall L3, and the second-second sidewall L2 may be positioned between the second-first sidewall L1 and the second-third sidewall L3.

In addition, the second groove BG2 may have a shape of which one side is open by the second-first sidewall L1, the second-second sidewall L2, and the second-third sidewall L3. That is, the second groove BG2 may be open toward the second housing hole 1222a (or the second coil). Accordingly, it is possible to secure a sufficient space for arranging the second coil.

In addition, the first-second ball to be described below may be easily seated in the second groove BG2 through an open area of the second groove BG2. Accordingly, the ease of assembly can be improved.

The second-second sidewall L2 may be a stopper for the first-second ball. Accordingly, the first-second ball may be seated at a desired position in the second groove BG2.

The first-first sidewall K1, the first-second sidewall K2, and the first-third sidewall K3 may be disposed symmetrically with the second-first sidewall L1, the second-second sidewall L2, and the second-third sidewall L3 in the third direction, respectively. That is, the first-first sidewall K1, the first-second sidewall K2, and the first-third sidewall K3 may overlap the second-first sidewall L1, the second-second sidewall L2, and the second-third sidewall L3 in the second direction (Y-axis direction), respectively. For example, the first-second sidewall K2 and the second-second sidewall L2 may be disposed at the same position in the second direction (Y-axis direction) so that the first-first ball and the first-second ball may be stopped at the same position in the second direction (Y-axis direction). Accordingly, as described above, the first-first ball and the first-second ball may be disposed to overlap each other in the second direction (Y-axis direction) so that the reliability of an element can be improved and tilting can be easily performed.

The second-third protrusion 1223b may include a third-first sidewall M1, a third-second sidewall M2, and a third-third sidewall M3. The third-first sidewall M1, the third-second sidewall M2, and the third-third sidewall M3 may be positioned on the inner surface of the first housing side portion 1221.

The third-first sidewall M1 may be positioned closer to the third-second housing hole 1223a2 between the third-first housing hole 1223a1 and the third-second housing hole 1223a2. The third-first sidewall M1 may extend in the first direction.

One end of the third-second sidewall M2 may be in contact with the third-first sidewall M1, and the other end thereof may be in contact with the third-third sidewall M3. The third-second sidewall M2 may extend in the second direction (Y-axis direction).

One end of the third-third sidewall M3 may be in contact with the third-second sidewall M2. The third-third sidewall M3 may be positioned closer to the third-first housing hole 1223a1 between the third-first housing hole 1223a1 and the third-second housing hole 1223a2. The third-third sidewall M3 may extend in the first direction (X-axis direction).

The third-second sidewall M2 may be positioned under the third-first sidewall M1 and the third-third sidewall M3. The third-second sidewall M2 may be positioned between the third-first sidewall M1 and the third-third sidewall M3.

In addition, the third groove BG3 may have a shape of which one side is open by the third-first sidewall M1, the third-second sidewall M2, and the third-third sidewall M3. That is, the third groove BG3 may be open upward. In addition, the second ball to be described below may be easily seated in the third groove BG3 through an open area of the third groove BG3. Accordingly, the ease of assembly can be improved.

In addition, the third-second sidewall M2 may be a stopper for the second ball. Alternatively, the third-second sidewall M2 may support the second ball. Accordingly, the second ball can be seated at a desired position in the third groove BG3.

In addition, the housing 1220 may include the accommodating portion (not shown) formed by the first to third housing side portions 1221 to 1223. The mover may be positioned in the accommodating portion (not shown).

Figure 6A:
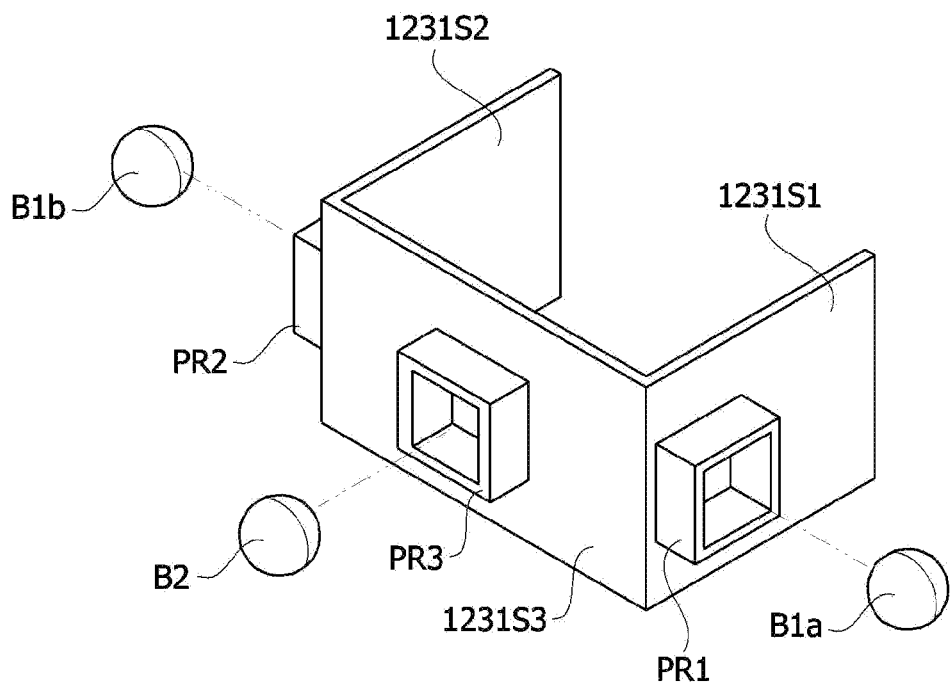
FIG. 6A is a perspective view of a holder and a ball part according to an embodiment.
Figure 6B:
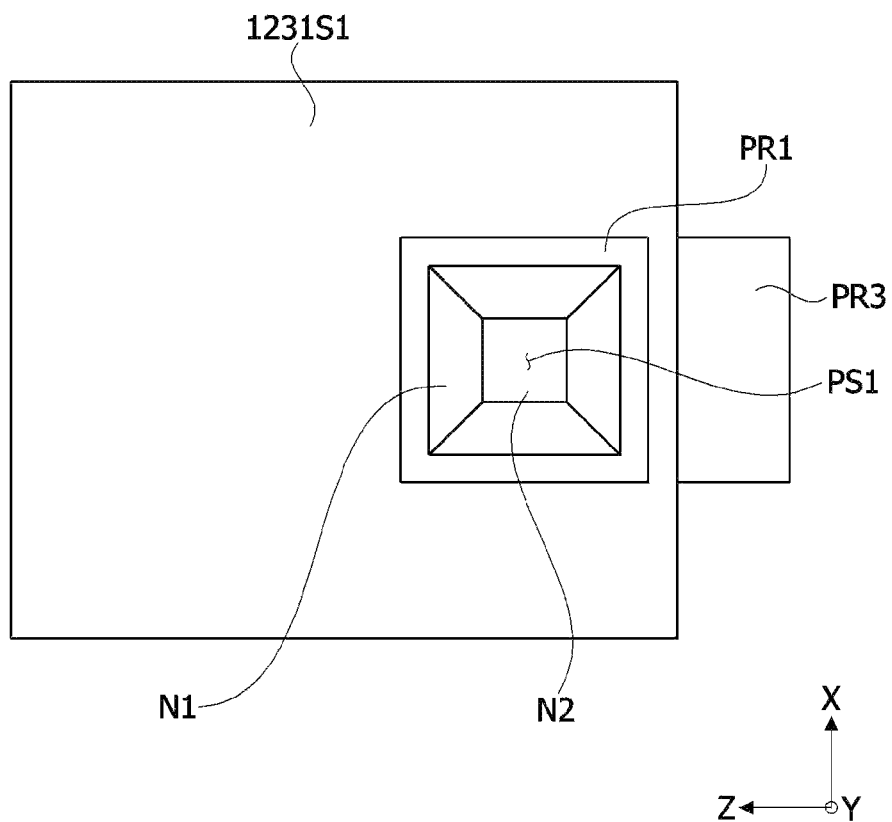
FIG. 6B is a side view of the holder according to the embodiment.
Figure 6C:
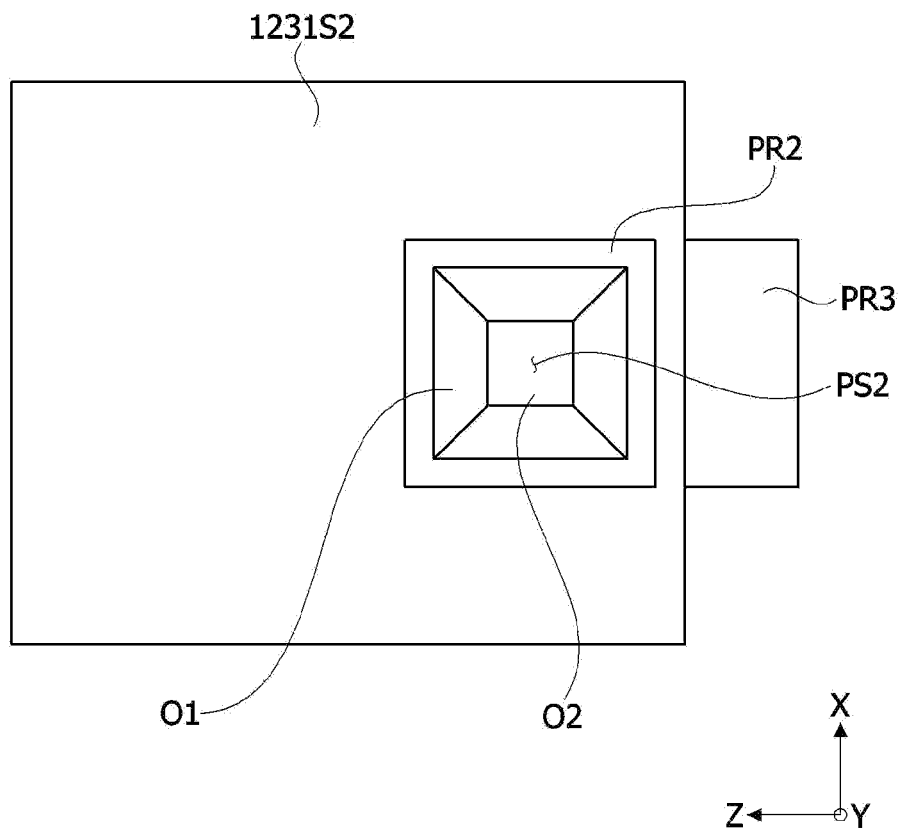
FIG. 6C is another side view of the holder according to the embodiment.
Figure 6D:
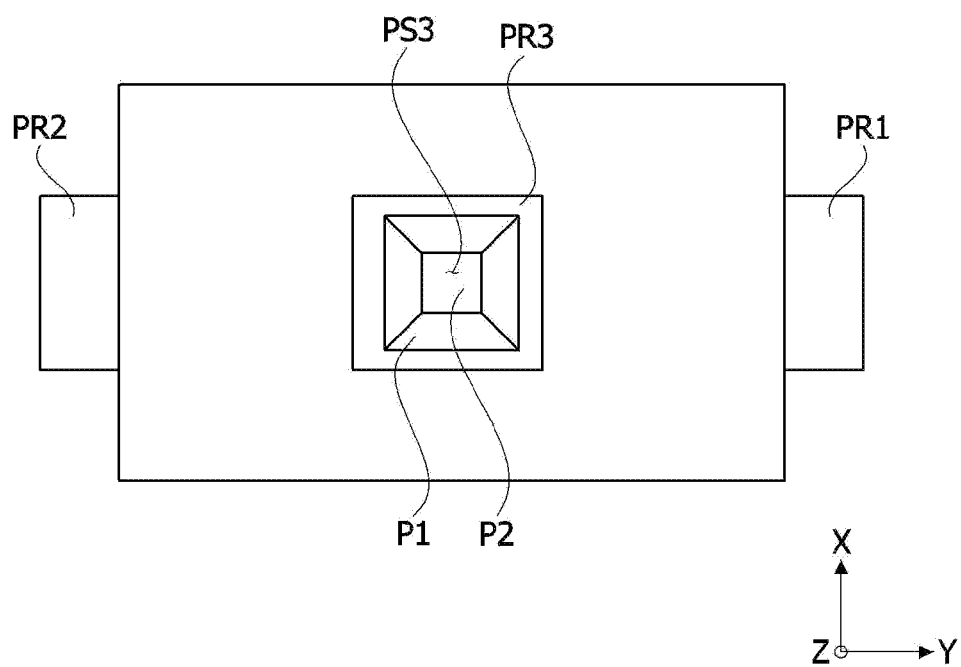
FIG. 6D is still another side view of the holder according to the embodiment.

FIG. 6A is a perspective view of the holder and the ball part according to an embodiment, FIG. 6B is a side view of the holder according to the embodiment, FIG. 6C is another side view of the holder according to the embodiment. FIG. 6D is still another side view of the holder according to the embodiment.

Referring to FIGS. 6A to 6D, the holder 1231 according to the embodiment may include a plurality of outer surfaces. The holder 1231 may include a first holder outer surface 1231S 1, a second holder outer surface 1231S2, and a third holder outer surface 1231S3.

The first holder outer surface 1231S1 may be positioned to correspond to the above-described first housing side portion. For example, the first holder outer surface 1231S1 may be positioned to face the above-described first housing side portion.

In addition, the second holder outer surface 1231S2 may be positioned to correspond to the above-described second housing side portion. For example, the second holder outer surface 1231S2 may be positioned to face the above-described second housing side portion.

In addition, the third holder outer surface 1231S3 may be positioned to correspond to the above-described third housing side portion. For example, the third holder outer surface 1231S3 may be positioned to face the above-described third housing side portion.

The third holder outer surface 1231S3 may be positioned between the first holder outer surface 1231S1 and the second holder outer surface 1231S2.

The holder 1231 may include first protrusions extending from the outer surfaces toward the housing and including recesses RS1, RS2, and RS3 in which the ball part is seated.

The plurality of first protrusions may be provided and positioned on the outer surfaces. The plurality of recesses may be formed to correspond to the first protrusions.

First, the first protrusions may include a first-first protrusion PR1, a first-second protrusion PR2, and a first-third protrusion PR3.

The first-first protrusion PR1 may be positioned on the first holder outer surface 1231S1 and may extend toward the first housing side portion. In addition, the first-first protrusion PR1 may be positioned to correspond to the second-first protrusion of the first housing side portion. The first-first protrusion PR1 may be positioned to face the second-first protrusion, and the first-first ball B1a may be positioned between the first-first protrusion PR1 and the second-first protrusion. The first-first ball may be in contact with the first-first protrusion PR1 and the second-first protrusion and may be pressed by the first-first protrusion PR1 and the second-first protrusion.

The first-second protrusion PR2 may be positioned on the second holder outer surface 1231S2 and may extend toward the second housing side portion. In addition, the first-second protrusion PR2 may be positioned to correspond to the second-second protrusion of the second housing side portion. The first-second protrusion PR2 may be positioned to face the second-second protrusion, and the first-second ball B1b may be positioned between the first-second protrusion PR2 and the second-second protrusion. The first-second ball may be in contact with the first-second protrusion PR2 and the second-second protrusion and may be pressed by the first-second protrusion PR2 and the second-second protrusion. Accordingly, the housing and the holder 1231 may be coupled to each other.

The first-third protrusion PR3 may be positioned on the third holder outer surface 1231S3 and may extend toward the third housing side portion. The first-third protrusion PR3 may be positioned to correspond to the second-third protrusion of the third housing portion. The first-third protrusion PR3 may be positioned to face the second-third protrusion. The second ball B2 may be positioned between the first-third protrusion PR3 and the second-third protrusion. The second ball B2 may be in contact with the first-third protrusion PR3 and the second-third protrusion and may be pressed by the first-third protrusion PR3 and the second-third protrusion.

In addition, the first-first protrusion PR1 may overlap the first-second protrusion PR2 in the second direction (Y-axis direction) and may be disposed symmetrically with the first-second protrusion PR2 on the basis of the third direction (Z-axis direction).

In addition, the first-third protrusion PR3 may be positioned between the first-first protrusion PR1 and the first-second protrusion PR2.

In addition, as described above, the first protrusion may have the recess, and the recess may have a side surface spaced apart from the ball part and a bottom surface in contact with the ball part.

In an embodiment, the first-first protrusion PR1 may include a first recess RS1, and the first recess RS1 may include first side surfaces N1 and a first bottom surface N2. The first side surface N1 and the first bottom surface N2 may be inner surfaces of the first-first protrusion PR1.

In addition, the first side surface N1 may have a structure extending from the first bottom surface N2 toward the first housing side portion. In addition, the first side surfaces N1 may be disposed to surround the first bottom surface N2. The first side surface N1 may be an inclined surface. Accordingly, the first side surface N1 may have a certain angle with respect to the first bottom surface N2.

The first bottom surface N2 may be in contact with the first-first ball. At least a portion of the first side surface N1 may be spaced apart from the first-first ball. Accordingly, it is possible to secure a space in which the first-first ball B1a performs tilting. In addition, the first side surface N1 may be driven as a stopper for limiting a movement radius of the first-first ball during the X-axis tilting or Y-axis tilting.

The first-second protrusion PR2 may include a second recess RS2, and the second recess RS2 may include second side surfaces O1 and a second bottom surface O2. The second side surface O1 and the second bottom surface O2 may be inner surfaces of the first-second protrusion PR2.

In addition, the second side surface O1 may have a structure extending from the second bottom surface O2 toward the second housing side portion. Furthermore, the second side surfaces O1 may be positioned to surround the second bottom surface O2. The second side surface O1 may be an inclined surface. Accordingly, the second side surface O1 may have a certain angle with respect to the second bottom surface O2.

The second bottom surface O2 may be in contact with the first-second ball B1b. At least a portion of the second side surface O1 may be spaced apart from the first-second ball B1b. Accordingly, it is possible to secure a space in which the first-second ball B1b performs tilting. The second side surface O1 may be driven as a stopper for limiting a movement radius of the first-second ball during the X-axis tilting or Y-axis tilting.

The first side surface N1 may be disposed symmetrically with the second side surface O1 on the basis of the third direction (Z-axis direction). The first bottom surface N2 may be disposed symmetrically with the second bottom surface O2 on the basis of the third direction (Z-axis direction). The X-axis tilting or Y-axis tilting of the mover may have the same radius and may be accurately performed without a bias toward one side. Accordingly, hand shake correction can be accurately performed.

The first-third protrusion PR3 may include a third recess RS3, and the third recess RS3 may include third side surfaces P1 and a third bottom surface P2. The third side surface P1 and the third bottom surface P2 may be inner surfaces of the first-third protrusion PR3.

In addition, the third side surface P1 may have a structure extending from the third bottom surface P2 toward the third housing side portion. Furthermore, the third side surfaces P1 may be disposed to surround the third bottom surface P2. The third side surface P1 may be an inclined surface. Accordingly, the third side surface P1 may have a certain angle with respect to the third bottom surface P2.

The third bottom surface P2 may be in contact with the second ball B2. At least a portion of the third side surface P1 may be spaced apart from the second ball. The third side surface P1 may be driven as a stopper for limiting a movement radius of the second ball during the X-axis tilting or Y-axis tilting.

Figure 7:
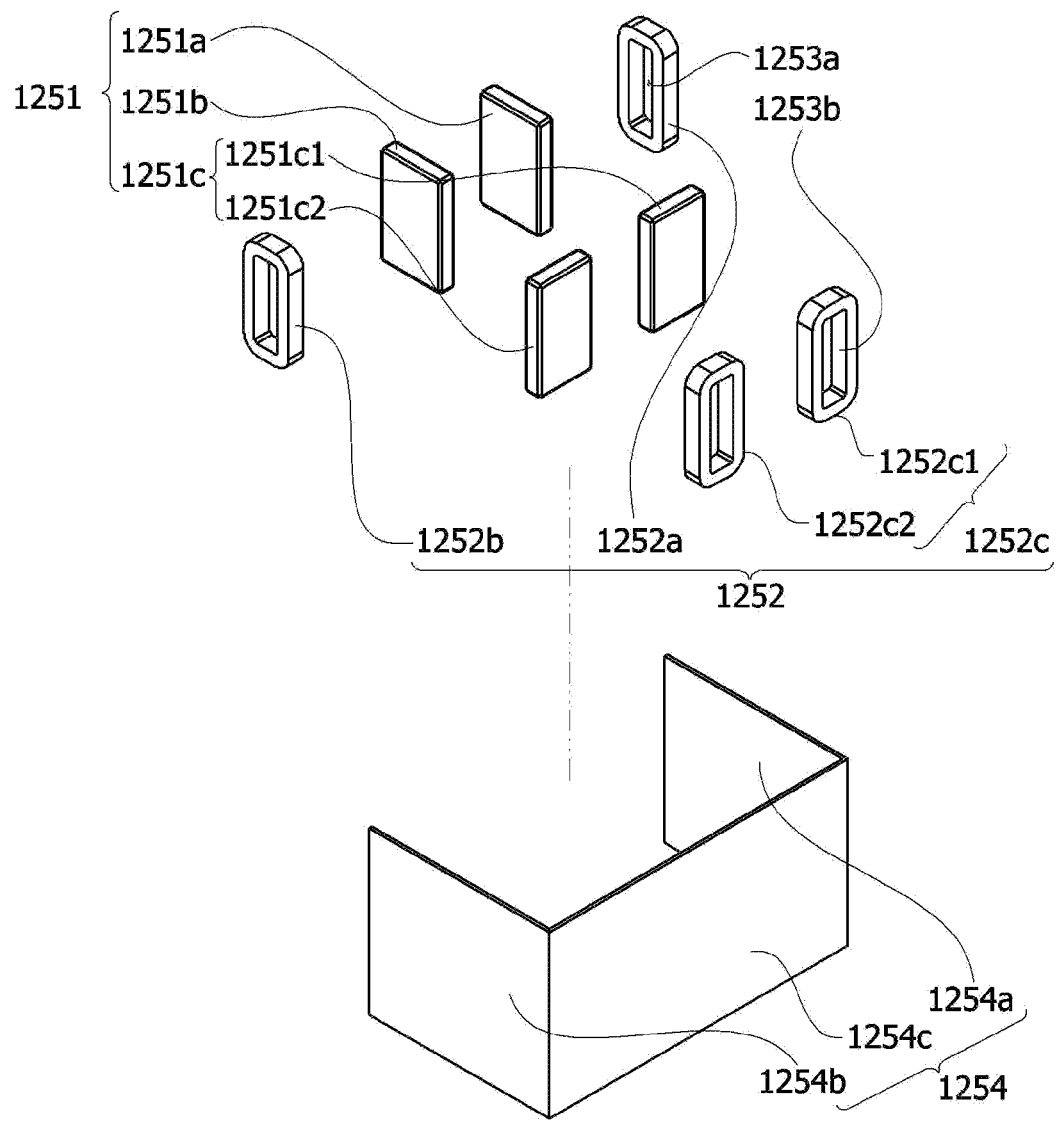
FIG. 7 is an exploded perspective view illustrating a driving unit according to an embodiment.

FIG. 7 is an exploded perspective view illustrating the driving unit according to an embodiment.

Referring to FIG. 7, as described above, the driving unit 1250 includes the driving magnet 1251, the driving coil 1252, the Hall sensor unit 1253, and the board unit 1254.

In addition, as described above, the driving magnet 1251 may include the first magnet 1251a, the second magnet 1251b, and the third magnets 1251c which provide a driving force due to an electromagnetic force. The first magnet 1251a, the second magnet 1251b, and the third magnets 1251c may be positioned on the outer surfaces of the holder 1231.

In addition, the driving coil 1252 may include the plurality of coils. In an embodiment, the driving coil 1252 may include the first coil 1252a, the second coil 1252b, and the third coils 1252c.

The first coil 1252a may be positioned to face the first magnet 1251a. Accordingly, as described above, the first coil 1252a may be positioned in the first housing hole 1221a of the first housing side portion 1221.

In addition, the second coil 1252b may be positioned to face the second magnet 1251 b. Accordingly, as described above, the second coil 1252b may be positioned in the second housing hole 1222a of the second housing side portion 1222.

In the second camera actuator according to the embodiment, the mover 1230 is rotated and controlled along the first axis (Y-axis direction) or the second axis (X-axis direction) by an electromagnetic force between the driving magnet 1251 and the driving coil 1252, thereby minimizing the occurrence of a decentering or tilting phenomenon and providing the superior optical characteristics when an OIS is implemented.

In addition, according to an embodiment, through the ball part 1240 disposed between the housing 1220 and the mover 1230, an OIS is implemented to solve a restriction on a size of an actuator, thereby providing an ultra-slim and ultra-small camera actuator and a camera module including the same.

Furthermore, the board unit 1254 may include a first board side portion 1254a, a second board side portion 1254b, and a third board side portion 1254c.

The first board side portion 1254a and the second board side portion 1254b may be disposed to face each other. The third board side portion 1254c may be positioned between the first board side portion 1254a and the second board side portion 1254b.

In addition, the first board side portion 1254a may be positioned between the first housing side portion and the shield can, and the second board side portion 1254b may be positioned between the second housing side portion and the shield can. Furthermore, the third board side portion 1254c may be positioned between the third housing side portion and the shield can.

The first board side portion 1254a may be coupled and electrically connected to the first coil 1252a. In addition, the first board side portion 1254a may be coupled and electrically connected to the first Hall sensor 1253a.

The second board side portion 1254b may be coupled and electrically connected to the second coil 1252b. In addition, it should be understood that the second board side portion 1254b may be coupled and electrically connected to the first Hall sensor.

The third board side portion 1254c may be coupled and electrically connected to the third coil 1252c. In addition, the third board side portion 1254c may be coupled and electrically connected to the second Hall sensor 1253b.

Figure 8:
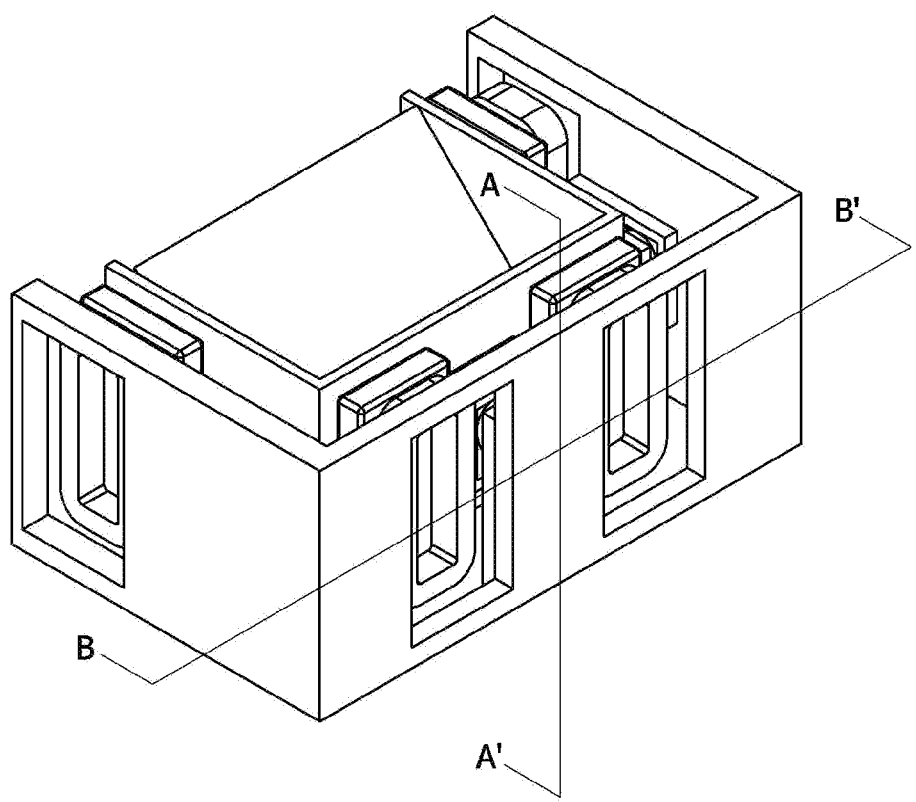
FIG. 8 is a view illustrating the second camera actuator from which the shield can and the board unit are removed according to an embodiment.
Figure 9:
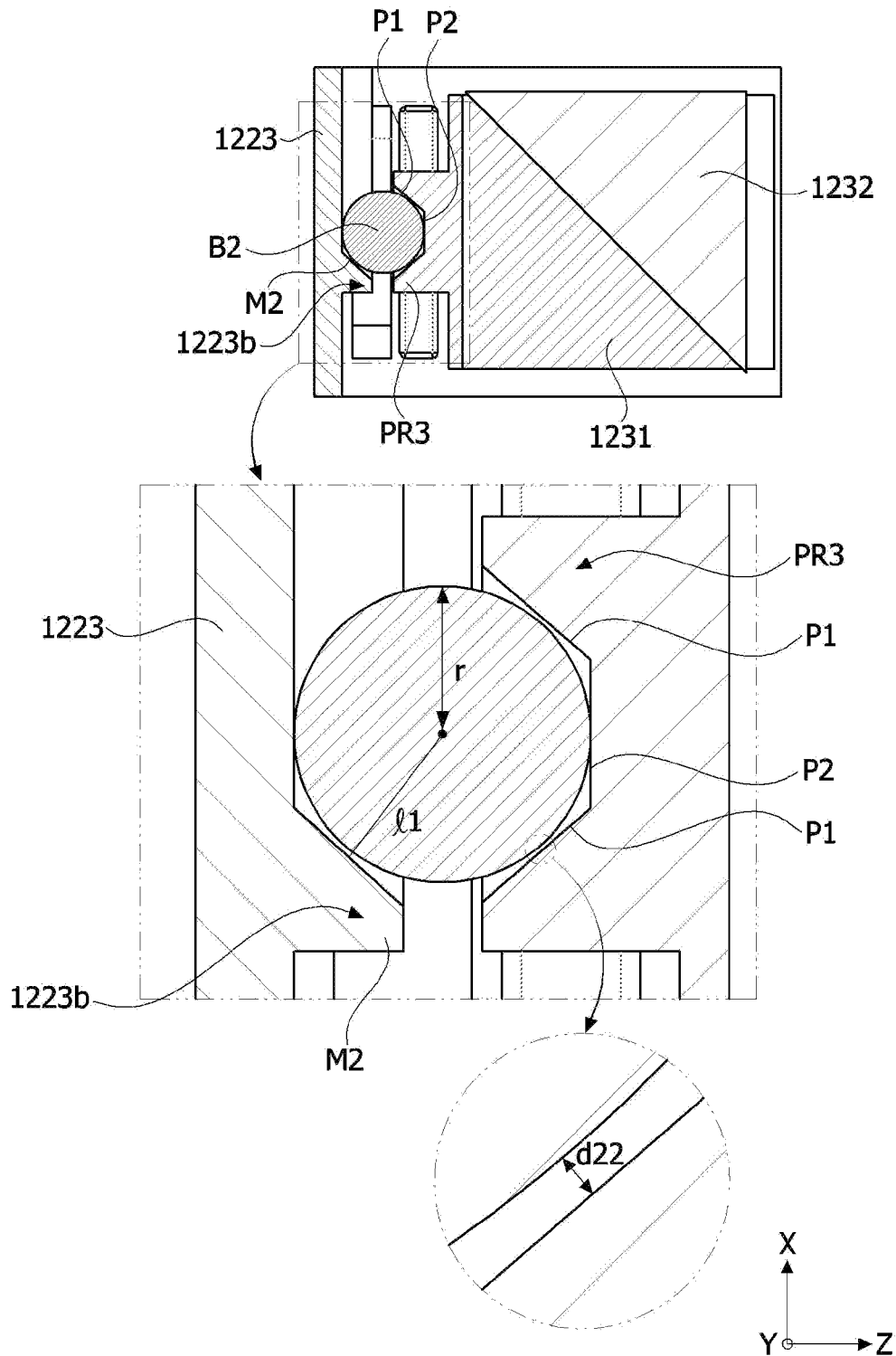
FIG. 9 is a view along line A-A' in FIG. 8.
Figure 10:
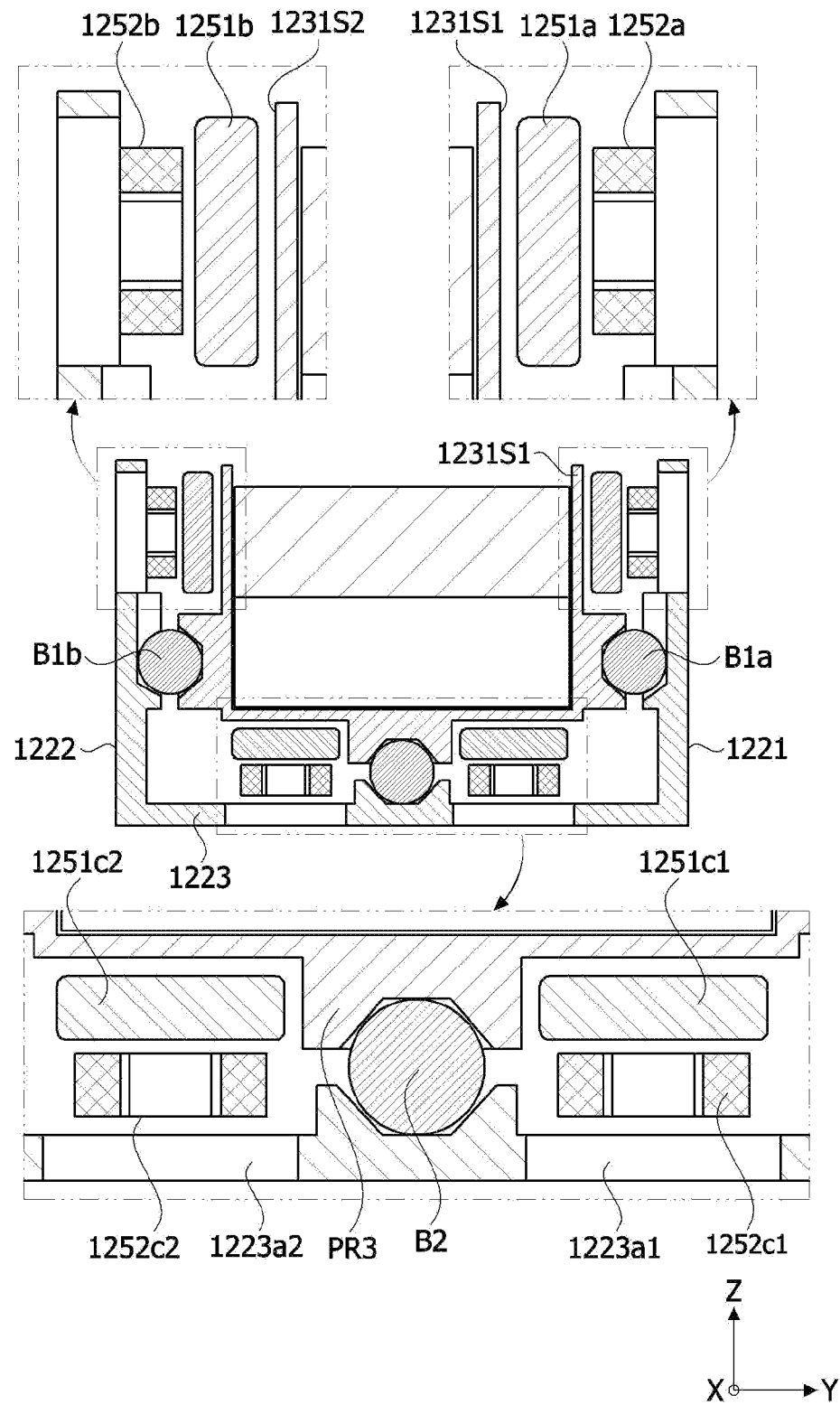
FIG. 10 is a view along line B-B' in FIG. 8.

FIG. 8 is a view illustrating the second camera actuator from which the shield can and the board unit are removed according to an embodiment. FIG. 9 is a view along line A-A' in FIG. 8. FIG. 10 is a view along line B-B' in FIG. 8. FIG. 11 is a view along line B-B' in FIG. 8.

Referring to FIGS. 8 to 11, the first coil 1252a may be positioned on the first housing side portion 1221, and the first magnet 1251a may be positioned on the first holder outer surface 1231S1 of the holder 1231. Accordingly, the first coil 1252a and the first magnet 1251a may face each other. The first magnet 1251a may at least partially overlap the first coil 1252a in the second direction (Y-axis direction).

Each magnet may be coupled to an adjacent outer surface of the holder through an adhesive member. That is, the adhesive member may be positioned between the adjacent outer surface of the holder and the magnet. For example, the first magnet 1251a may be coupled to the first holder outer surface 1231S1 through the adhesive member or the like.

In addition, the second coil 1252b may be positioned on the second housing side portion 1222, and the second magnet 1251 b may be positioned on the second holder outer surface 1231S2. Accordingly, the second coil 1252b and the second magnet 1251 b may face each other. The second magnet 1251 b may at least partially overlap the second coil 1252b in the second direction (Y-axis direction).

In addition, the first coil 1252a and the second coil 1252b may overlap each other in the second direction (Y-axis direction), and the first magnet 1251a and the second magnet 1251 b may overlap each other in the second direction (Y-axis direction). Due to such a configuration, an electromagnetic force applied to the outer surfaces of the holder (the first holder outer surface and the second holder outer surface) may be placed on a parallel axis in the second direction (Y-axis direction) so that the X-axis tilting can be accurately and precisely performed.

In addition, the third coil 1252c may be positioned on the third housing side portion 1223, and the third magnet 1251c may be positioned on the third holder outer surface 1231S3 of the holder 1231. The third coil 1252c and the third magnet 1251c may at least partially overlap each other in the third direction (Z-axis direction). Accordingly, an intensity of an electromagnetic force between the third coil 1252c and the third magnet 1251c can be easily controlled.

The third-first coil 1252c1 may be positioned in the third-first housing hole 1223a1, and the third-second coil 1251c2 may be positioned in the third-second housing hole 1223a2. The second ball B2 may be positioned between the third-first coil 1251c1 and the third-second coil 1251c2.

In addition, the third protrusion PR3 may be disposed between the third-first magnet 1252c1 and the third-second magnet 1252c2. The third-first magnet 1252c1 and the third-second magnet 1252c2 may at least partially overlap the third protrusion PR3 in the second direction (Y-axis direction). Due to such a configuration, the second ball B2 in the third protrusion PR3 may accurately perform the Y-axis tilting by an electromagnetic force generated from the third coil and the third magnet without a bias toward the third-first coil 1251c1 or the third-second coil 1251c2.

As described above, the first coil 1251a, the second coil 1251c, and the third coil 1251c may be disposed in the housing holes and electrically connected to the board unit. The magnet may be coupled to each outer surface of the holder.

The second ball B2 may be seated on the second-third protrusion 1223b. The second ball B2 may be disposed on the third-second sidewall M2. The second ball B2 may be in contact with an inner surface of the third-second sidewall M2. The second ball B2 may have a radius r. This will be described as being equally applied to the first balls B1a and B1b. In addition, in an embodiment, a distance l1 from a center C1 of the second ball B2 to an inner surface M of the third-second sidewall M2 may be greater than or equal to the radius r of the second ball B2.

In addition, the second ball B2 may be seated on the third side surface P1 and the third bottom surface P2 of the third protrusion PR3. At least a portion of the second ball B2 may overlap the third protrusion PR3 in the first direction (X-axis direction).

In addition, the second ball B2 may be in contact with the third bottom surface P2. A contact point between the third bottom surface P2 and the second ball B2 and a contact point between the third housing side portion 1223 and the second ball B2 may be positioned on a line parallel to the third direction (Z-axis direction). Accordingly, a coupling force between the holder 1231 and the housing 1220 may be maintained through the second ball B2.

The second ball B2 may be spaced apart from at least a portion of the third side surface P1. In other words, a distance from a center of the ball part to a side surface of an adjacent protrusion may be greater than a distance from the center of the ball part to a bottom surface of the adjacent protrusion.

In an embodiment, a distance from the center C1 of the second ball B2 to the bottom surface P2 of the third recess may be smaller than a distance to the side surface P1 of the third recess. Accordingly, separation distances d21 and d22 may be formed between the second ball B2 and the first side surface P1. A space in which the third protrusion PR3 performs the X-axis tilting or Y-axis tilting along the second ball B2 may be provided by the separation distance d22.

The first-first ball B1*a* may be in contact with the inner surface of the first housing side portion 1221.

In addition, the first-first ball B1*a* may be seated in the first recess RS1 of the first protrusion PR1. At least a portion of the first-first ball B1*a* may overlap the first recess RS1 in the first direction (X-axis direction) or the third direction (Z-axis direction). In addition, the first-first ball B1*a* may overlap the first recess RS1 in the second direction (Y-axis direction).

In addition, the first-first ball B1*a* may be at least partially spaced apart from the first side surface N1 of the first recess RS1. When a current is not supplied to the first coil 1252*a* and the second coil 1252*b*, the first-first ball B1*a* may be spaced apart from the first side surface N1.

In addition, the first-first ball B1*a* may be in contact with the first bottom surface N2. Thus, due to such a configuration, the first-first ball B1*a* may be pressed by the first bottom surface N2 and the first housing side portion 1221. Accordingly, the first housing side portion 1221 and the holder (the first holder outer surface 1231S1) may be coupled to each other through the first-first ball B1*a*.

In addition, a separation distance from a center CO1 of the first-first ball B1*a* to the first side surface N1 may be greater than a separation distance from the center CO1 of the first-first ball B1*a* to the first bottom surface N2. Accordingly, a separation distance d11 may be present between the first-first ball B1*a* and the first side surface N1. Due to such a configuration, a coupling force between the first housing side portion 1221 and the first holder outer surface 1231S1 is formed by the first-first ball B1*a*, thereby easily performing the X-axis tilting or Y-axis tilting.

In addition, the first-second ball B1*b* may be in contact with the inner surface of the second housing side portion 1222.

Furthermore, the first-second ball B1*b* may be seated in the second recess RS2 of the second protrusion PR2. At least a portion of the first-second ball B1*b* may overlap the second recess RS2 in the first direction (X-axis direction) or the third direction (Z-axis direction). In addition, the first-second ball B1*b* may overlap the second recess RS2 in the second direction (Y-axis direction).

In addition, the first-second ball B1*b* may be at least partially spaced apart from the second side surface O1 of the second recess RS2. When a current is not supplied to the first coil 1252*a* and the second coil 1252*b*, the first-second ball B1*b* may be spaced apart from the second side surface O1.

In addition, the first-second ball B1*b* may be in contact with the second bottom surface O2. Thus, due to such a configuration, the first-second ball B1*b* may be pressed by the second bottom surface 02 and the second housing side portion 1222. Accordingly, the second housing side portion 1222 and the holder (the second holder outer surface 1231S2) may be coupled through the first-second ball B1*b*.

In addition, a separation distance from a center CO2 of the second ball B1*b* to the second side surface O1 may be greater than a separation distance from the center CO2 of the second ball B1*b* to the second bottom surface O2. Accordingly, a separation distance d12 may be present between the first-second ball B1*b* and the second side surface O1. Due to such a configuration, a coupling force between the second housing side portion 1222 and the second holder outer surface 1231S2 is formed by the first-second ball B1*b*, thereby easily performing the X-axis tilting or Y-axis tilting.

FIGS. 12A and 12B are views for describing the first axis tilting of the second camera actuator according to an embodiment.

Referring to FIGS. 12A and 12B, the Y-axis tilting may be performed. That is, an OIS may be implemented by rotating the mover 1230 in the first direction (X-axis direction).

In an embodiment, the third magnet 1251*c* disposed on the third holder outer surface 1231S3, along with the third coil 1252*c*, may form an electromagnetic force to tilt or rotate the mover 1230 in the first direction (X-axis direction).

As described above, the second ball B2 may tilt or move to an upper side surface or a lower side surface among the side surfaces in the third recess of the third protrusion. Even during the tilting, the second ball B2 may maintain a contact point between the inner surface of the third housing side portion and the third holder outer surface without change. Accordingly, a coupling force between the holder and the housing can be maintained, and the reliability of the camera actuator can be maintained.

As described above, based on the contact point between the third bottom surface and the second ball, the mover may be rotated or tilted with respect to the second axis or in the first direction (X-axis direction).

By first electromagnetic forces F1A and F1B between the third magnet 1251*c* and the third coil 1252*c* positioned on the third housing side portion 1223, the holder (or mover) is rotated at a first angle θ1 (X1→X1*a*) in the X-axis direction, thereby implementing an OIS. In addition, by the first electromagnetic forces F1A and F1B between the third magnet 1251*c* and the third coil 1252*c*, the mover 1230 is rotated at the first angle θ1 (X1→X1*b*) in the X-axis direction, thereby implementing an OIS. The first angle θ1 may be in a range of ±1° to ±3°. However, the present invention is not limited thereto.

Figure 13B:
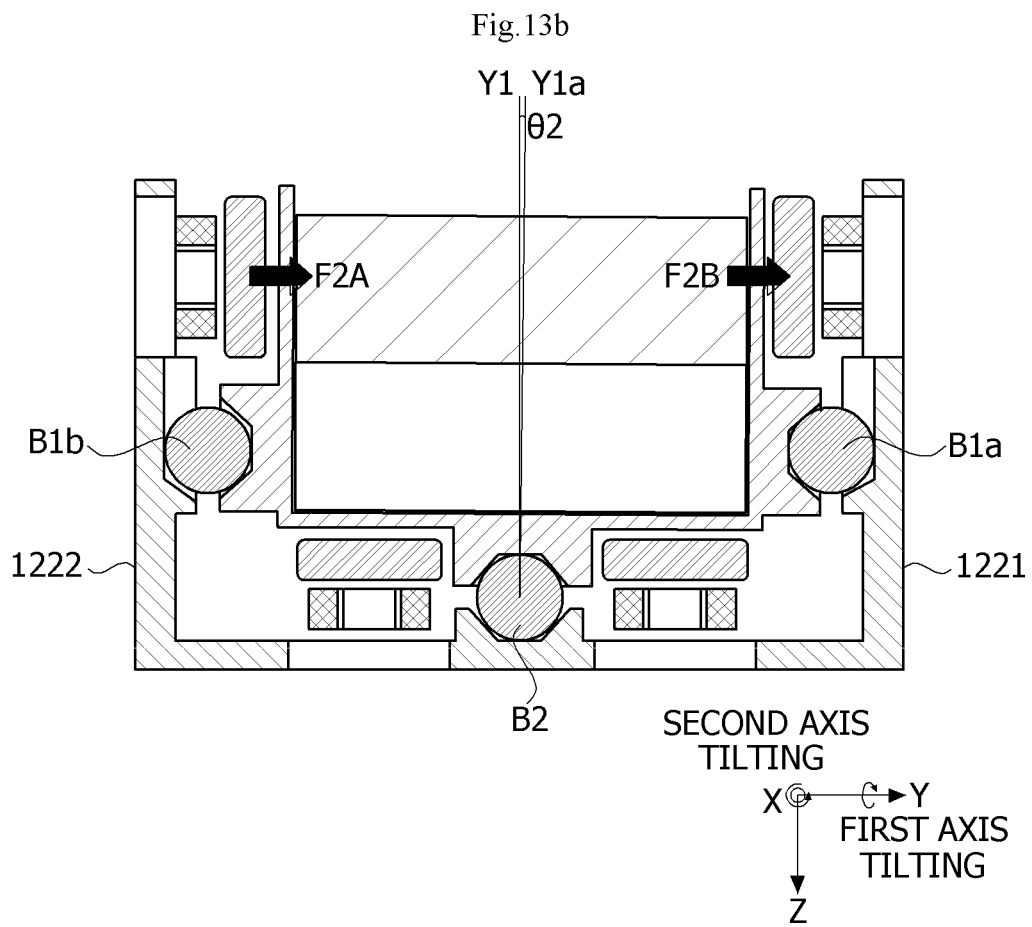

FIGS. 13A and 13B are views for describing the second axis tilting of the second camera actuator according to an embodiment.

Referring to FIGS. 13A and 13B, the mover (or the holder) is tilted or rotated in the Y-axis direction, thereby implementing an OIS.

In an embodiment, the first magnet 1251*a* and the second magnet 1251 *b* in the camera actuator, respectively along with the first coil 1252*a* and the second coil 1252*b*, may form an electromagnetic force to tilt or rotate the holder 1231 in the second direction (Y-axis direction).

The first-first ball B1*a* may move to a left side surface or a right side surface among the side surfaces in the first recess of the first protrusion. Even during the tilting, the first-first ball B1*a* may maintain a contact point between the inner surface of the first housing side portion and the first holder outer surface without change.

In addition, the first-second ball B1*b* may move to a right side surface or a left side surface among the side surfaces in the second recess of the second protrusion. Even during the tilting, the first-second ball B1*b* may maintain a contact point between the inner surface of the second housing side portion and the second holder outer surface without change. Accordingly, a coupling force between the holder and the housing can be maintained, and the reliability of the camera actuator can be maintained. In addition, an OIS can be accurately performed.

Based on a contact point between the first bottom surface and the first-first ball, the mover (or the holder) may rotated or tilted with respect to the second axis or in the second direction (Y-axis direction). Correspondingly, based on a contact point between the second bottom surface and the first-second ball, the mover (or the holder) may be rotated or tilted with respect to the second axis or in the second direction (Y-axis direction).

By second electromagnetic forces F2A and F2B between the first and second magnets 1251*a* and 1251*b* and the first and second coils 1252*a* and 1252*b*, the mover 1230 is rotated at a second angle θ2 (Y1→Y1*a*) in the Y-axis direction, thereby implementing an OIS. In addition, by the second electromagnetic forces F2A and F2B between the first and second magnets 1251*a* and 1251*b* and the first and second coils 1252*a* and 1252*b*, the mover (or the holder) is rotated at the second angle θ2 (Y1→Y1*b*) in the Y-axis direction, thereby implementing an OIS. The second angle θ2 may be in a range of ±1° to 3°. However, the present invention is not limited thereto.

As described above, in the second camera actuator according to the embodiment, by an electromagnetic force between the driving magnet in the holder and the driving coil disposed in the housing, the mover (or the holder) is controlled and rotated in the first direction (X-axis direction) or in the second direction (Y-axis direction), thereby minimizing the occurrence of a decentering or tilting phenomenon and providing the superior optical characteristics when an OIS is implemented. As described above, the "Y-axis tilting" refers to rotating or tilting in the first direction (X-axis direction), and the "X-axis tilting" refers to rotating or tilting in the second direction (Y-axis direction).

Figure 14:
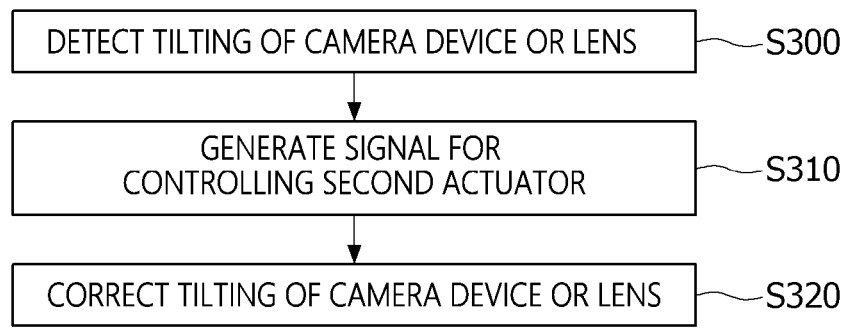
FIG. 14 is a flowchart illustrating a method of correcting a shake of a camera device according to an embodiment of the present invention.

FIG. 14 is a flowchart illustrating a method of correcting a shake of a camera device according to an embodiment of the present invention.

Referring to FIG. 14, a sensor embedded in a camera device detects at least one of a tilting direction and a tilting degree of the camera device or a lens (S300). Here, the tilting of the camera device or the lens may be caused by movement due to a hand shake or external vibration and expressed with an amount by which an optical axis is inclined. The tilting direction of the lens may be a direction parallel to a surface perpendicular to an optical axis, that is, a surface on which the lens is disposed, and the tilting degree of the lens may be expressed by at least one of a tilting amount and a tilting angle. In order to detect at least one of the tilting direction and tilting degree of the lens, the sensor may include a gyro sensor, but the present invention is not limited thereto. Various sensors capable of detecting a shake or movement of the camera device or the lens may be used.

Next, a control unit generates a signal for controlling a second actuator according to at least one of the tilting direction and tilting degree of the lens detected by the sensor (S310). Here, the signal for controlling the second actuator may be expressed with a value of a current that is applied to a coil driving unit of the second actuator to correct the tilting of the camera device or the lens.

Next, the second actuator corrects the tilting of the camera device or the lens according to the signal generated in operation S310 (S320). According to an embodiment of the present invention, a prism unit and a shake correction unit included in the second actuator may be moved according to the signal applied to the coil driving unit of the second actuator, and thus, an optical path of light passing through a lens member included in the shake correction unit may be changed so that the shake of the camera device or the lens may be optically corrected.

Figure 15:
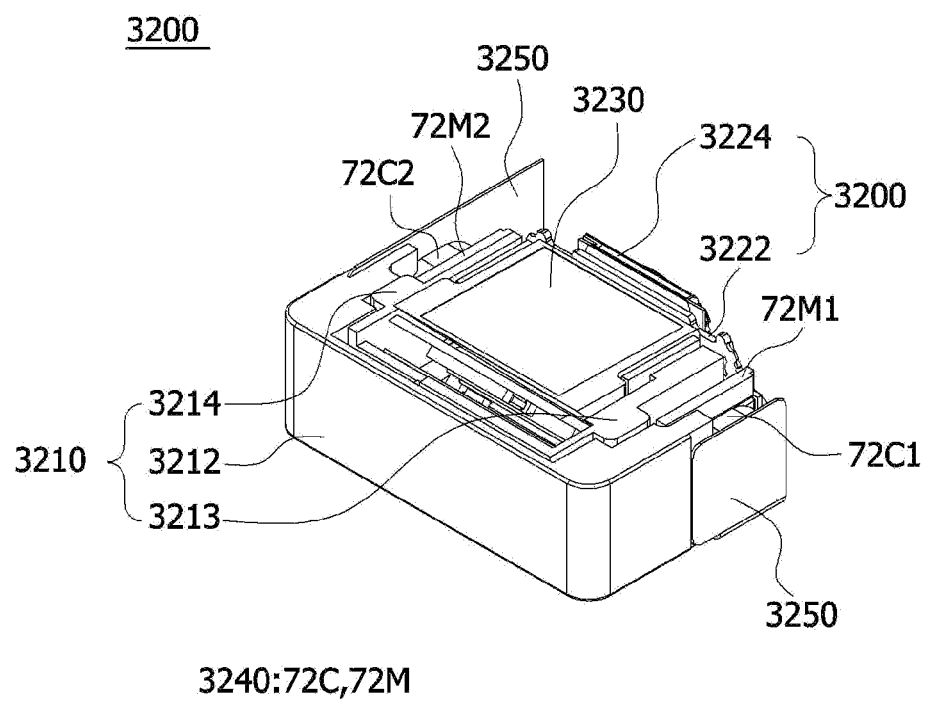
FIG. 15 is a perspective view of a second actuator according to another embodiment of the present invention.
Figure 16:
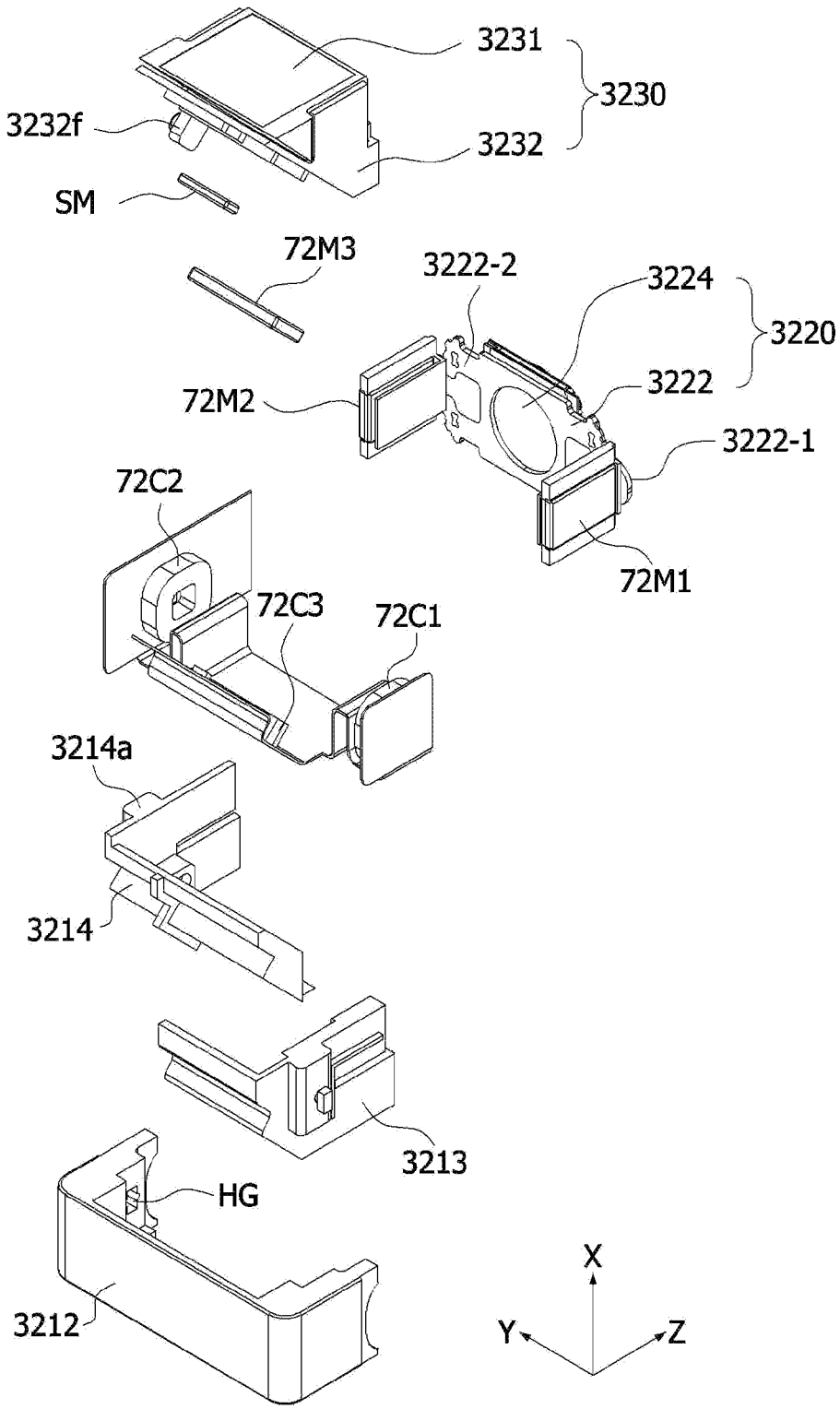
FIG. 16 is an exploded perspective view of the second actuator of FIG. 15.
Figure 17:
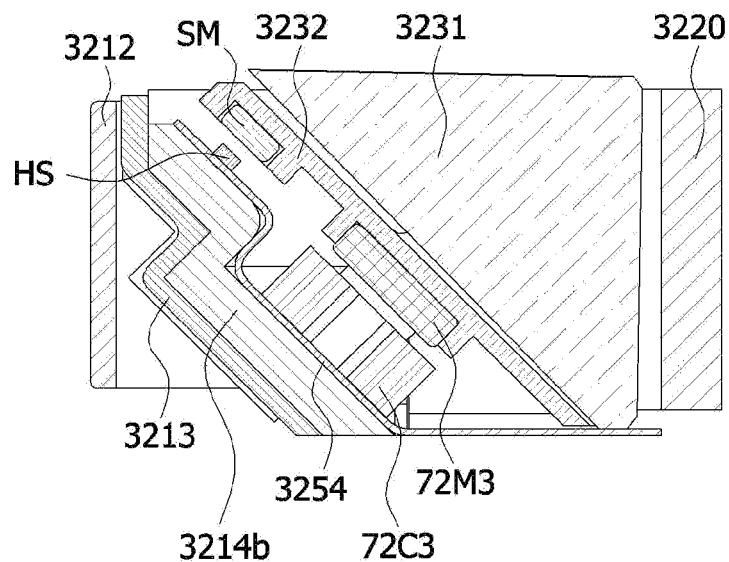
FIG. 17 is a cross-sectional view of the second actuator of FIG. 15 in a first direction.
Figure 18:
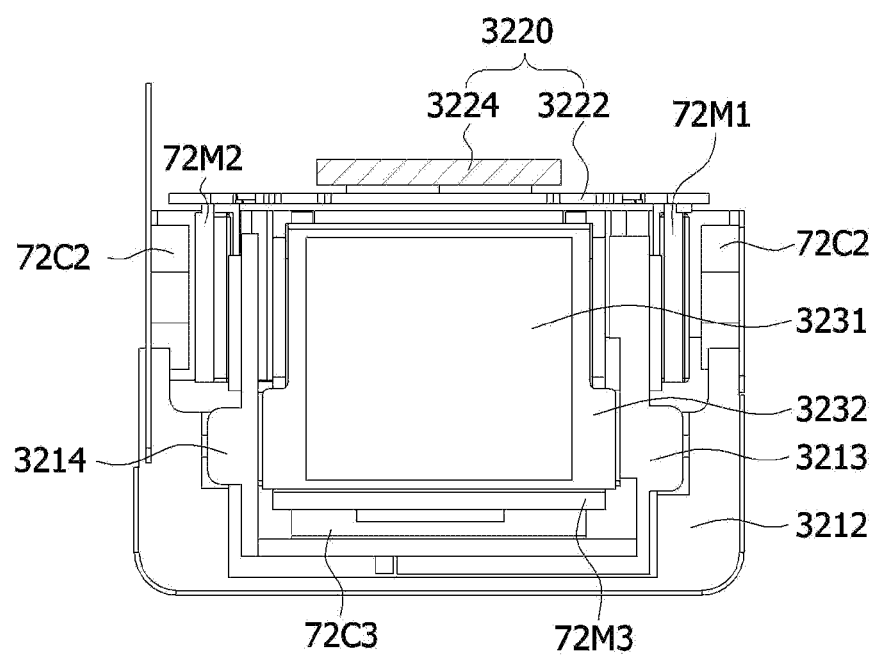
FIG. 18 is a cross-sectional view of the second actuator of FIG. 15 in a second direction.
Figure 19:
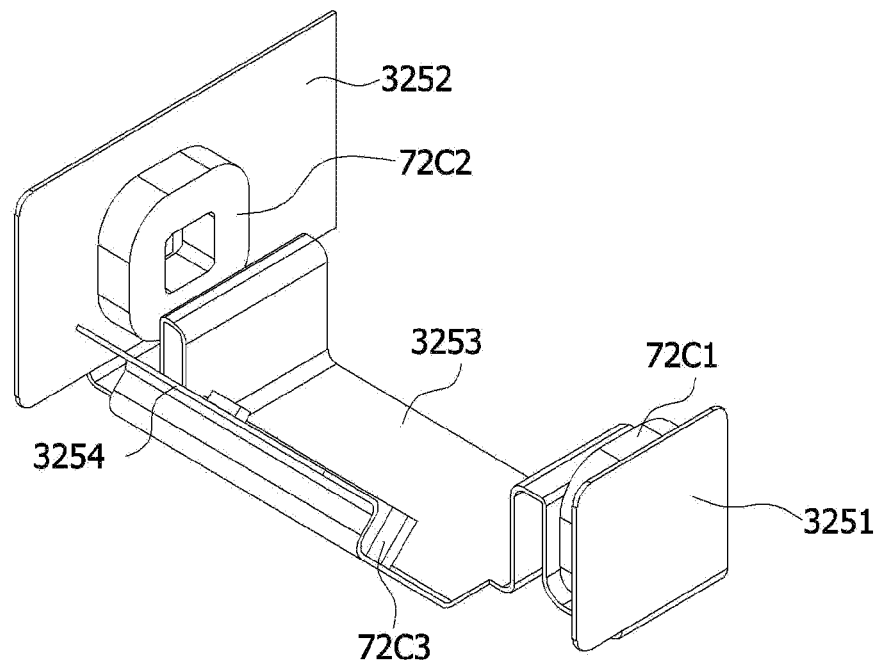
FIG. 19 illustrates a circuit board and a coil driving unit of the second actuator of FIG. 15.
Figure 20A:
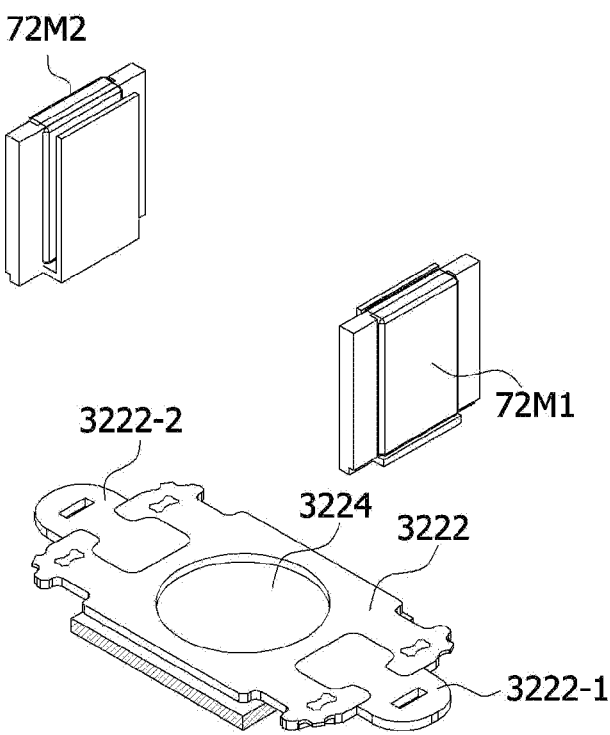
FIG. 20 illustrates a shake correction unit and some parts of a magnet driving unit of the second actuator of FIG. 15.
Figure 20B:
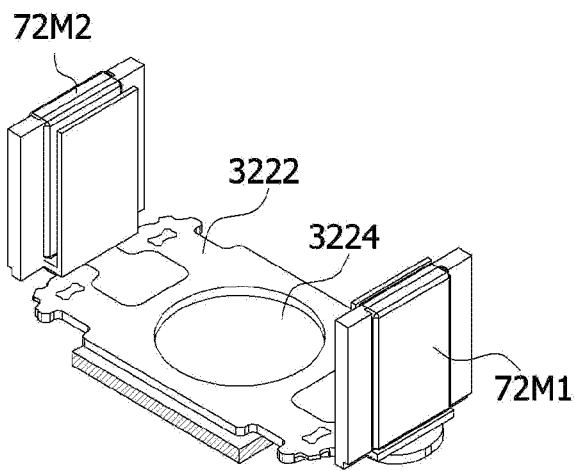

FIG. 15 is a perspective view of a second actuator according to another embodiment of the present invention. FIG. 16 is an exploded perspective view of the second actuator of FIG. 15. FIG. 17 is a cross-sectional view of the second actuator of FIG. 15 in a first direction. FIG. 18 is a cross-sectional view of the second actuator of FIG. 15 in a second direction. FIG. 19 illustrates a circuit board and a coil driving unit of the second actuator of FIG. 15. FIG. 20 illustrates a shake correction unit and some parts of a magnet driving unit of the second actuator of FIG. 15. FIG. 21 illustrates a prism unit and the remaining parts of the magnet driving unit of the second actuator of FIG. 15. FIG. 22 illustrates a housing of the second actuator of FIG. 15.

Referring to FIGS. 15 to 18, a second actuator 3200 includes a housing 3210, a shake correction unit 3220, a prism unit 3230, a driving unit 3240, and a second circuit board 3250. The shake correction unit 3220 may include a shaper member 3222 and a lens member 3224, and the driving unit 3240 may include a magnet driving unit 72M and a coil driving unit 72C. A prism unit 3230 may be disposed on the shake correction unit 3220, and the coil driving unit 72C may be electrically connected to the second circuit board 3250. Here, the housing 3210 may correspond to the above-described holder, the prism unit 3230 may correspond to the above-described optical member, the driving unit 3240 may correspond to the above-described driving coil and driving magnet, and the second circuit board 3250 may correspond to the above-described board unit. Terms may be used interchangeably, but components to be described below may be different for each embodiment.

As described above, the shake correction unit 3220 is disposed under the prism unit 3230 to solve a restriction on a size of a lens of a lens assembly in an optical system when an OIS is implemented, thereby securing a sufficient amount of light.

According to an embodiment of the present invention, the magnet driving unit 72M may include a first magnet driving unit 72M1, a second magnet driving unit 72M2, and a third magnet driving unit 72M3, and the coil driving unit 72C may include a first coil driving unit 72C1, a second coil driving unit 72C2, and a third coil driving unit 72C3. According to an embodiment of the present invention, an interaction between the first magnet driving unit 72M1 and the first coil driving unit 72C1 and an interaction between the second magnet driving unit 72M2 and the second coil driving unit 72C2 may be used to tilt the shake correction unit 3220 along a second axis (hereinafter, referred to as, an X-axis), and an interaction between the third magnet driving unit 72M3 and the third coil driving unit 72C3 may be used to tilt the prism unit 3230 along a first axis (hereinafter, referred to as, a Y-axis). Accordingly, X-axis tilting and Y-axis tilting may be performed using three pairs of driving units, and the driving unit for the Y-axis tilting may be disposed in an empty space between the housing 3210 and the prism unit 3230, thereby reducing an overall size of the second actuator.

To this end, the second circuit board 3250 may be connected to a certain power supply (not shown) to apply power to the coil driving unit 72C. The second circuit board 3250 may include a circuit board having an electrically connectable line pattern, such as a rigid PCB, a flexible PCB, or a rigid flexible PCB.

As shown in FIG. 19, the first coil driving unit 72C1, the second coil driving unit 72C2, and the third coil driving unit 72C3 may be disposed on the second circuit board 3250.

As shown in FIG. 20, the shake correction unit 3220 may include the shaper member 3222 and the lens member 3224, the shaper member 3222 may be disposed on the lens member 3224, and a shape of the lens member 3224 may be deformed according to movement of the shaper member 3222. In this case, the first magnet driving unit 72M1 and the second magnet driving unit 72M2 may be disposed at both sides of the shaper member 3222, and the first coil driving unit 72C1 and the second coil driving unit 72C2 may be disposed on the second circuit board 3250 to respectively face the first magnet driving unit 72M1 and the second magnet driving unit 72M2. By an electromagnetic force between the first coil driving unit 72C1 and the first magnet driving unit 72M1 and an electromagnetic force between the second coil driving unit 72C2 and the second magnet driving unit 72M2 according to a voltage applied to the first coil driving unit 72C1 and the second coil driving unit 72C2, the shaper member 3222 may be moved. Accordingly, a shape of the lens member 3224 is reversibly deformed, and an optical path of light passing through the lens member 3224 is changed, thereby implementing an OIS.

More specifically, the shaper member 3222 may include a shaper body having a hole, through which light may pass, formed therein, and protrusions extending laterally from the shaper body. The lens member 3224 may be disposed under the shaper body, the first magnet driving unit 72M1 may be disposed on a first protrusion 3222-1 of the shaper member 3222, and the second magnet driving unit 72M2 may be disposed on a second protrusion 3222-2 of the shaper member 3222. In this case, each of the magnet driving units 72M1 and 72M2 may be disposed to be coupled to the shaper member 3222. For example, grooves may be formed in the protrusions 3222-1 and 3222-2 of the shaper member 3222, and the magnet driving units 72M1 and 72M2 may be fitted into the grooves. Here, the first protrusion 3222-1 and the second protrusion 3222-2 may be disposed at both sides of the shaper member 3222 to be symmetrical based on the X-axis. Accordingly, the shake correction unit 3220 may be tilted along the X-axis.

In addition, the coil driving unit 72C may further include Hall sensors to detect a position of the magnet driving unit 72M to be described below. For example, the first coil driving unit 72C1 may include a first Hall sensor, the second coil driving unit 72C2 may include a second Hall sensor, and the third coil driving unit 72C3 may include a third Hall sensor.

Meanwhile, the prism 3230 may be a right-angled prism and may be disposed inside the first magnet driving unit 72M1 and the second magnet driving unit 72M2 of the shake correction unit 3220. Since the prism 3230 corresponds to the above-described optical member, the prism 3230 may be a mirror or the like.

Figure 21A:
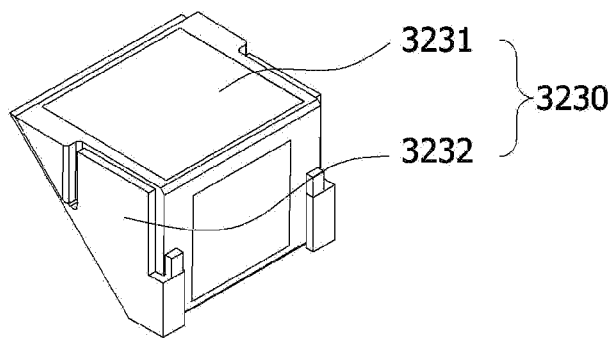
FIG. 21 illustrates a prism unit and the remaining parts of the magnet driving unit of the second actuator of FIG. 15.
Figure 21B:
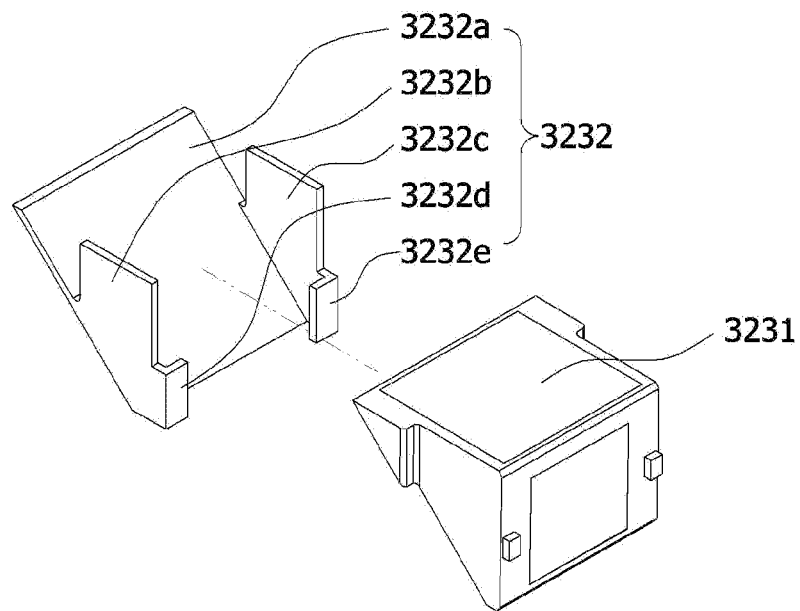
Figure 21C:
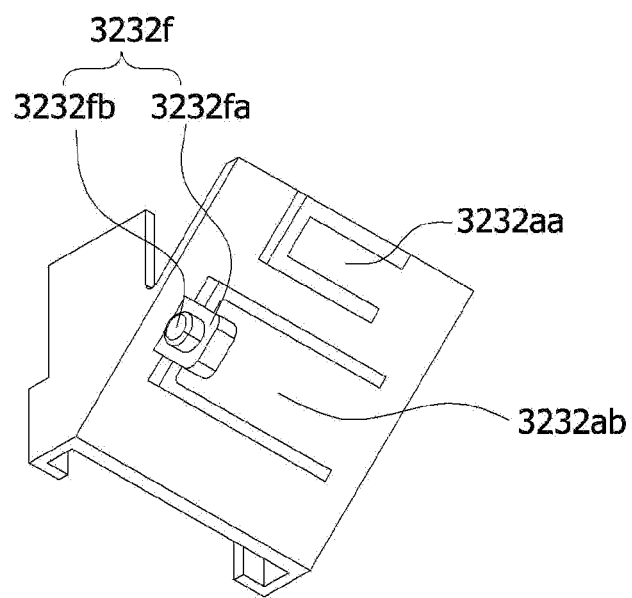

FIG. 21A is a perspective view of the prism unit of the second actuator according to another embodiment of the present invention, FIG. 21B is an exploded perspective view of the prism unit of FIG. 21A, and FIG. 21C is a perspective view of a prism cover of the prism unit of FIG. 21A.

Referring to FIGS. 21A to 21C, the prism unit 3230 includes a prism 3231 and a prism cover 3232. The prism cover 3232 may include a support wall 3232a and a first sidewall 3232b and a second sidewall 3232c which extend from both edges of the support wall 3232a. The prism 3231 may be disposed in an area formed by the support wall 3232a, the first sidewall 3232b, and the second sidewall 3232c. The prism 3231 may be a right-angled prism as a reflective part but is not limited thereto. The prism cover 3232 may further include a first fixing wall 3232d extending from the first sidewall 3232b and a second fixing wall 3232e extending from the second sidewall 3232c. Accordingly, the prism 3231 may be stably seated in the prism cover 3232.

A first groove 3232ab in which the third magnet driving unit 72M3 is disposed and a second groove 3232aa in which a sensing magnet SM is disposed may be formed in a surface opposite to a surface on which the prism 3231 is disposed among both surfaces of the support wall 3232a of the prism cover 3232, that is, in an outer surface.

Meanwhile, the prism cover 3232 may further include a rotation guide 3232f. Although an example is described in which the rotation guide 3232f is formed to protrude from the surface opposite to the surface on which the prism 3231 is disposed among both surfaces of the support wall 3232a, that is, from the outer surface, but the present invention is not limited thereto, and the rotation guide 3232f may be formed to protrude from an outer surface of at least one of the first sidewall 3232b and the second sidewall 3232c. For example, the rotation guide 3232f may include a first guide part 3232fa which extends vertically from an outer surface of the support wall 3232a and a second guide part 3232fb which protrudes vertically from the first guide part 3232fa. Accordingly, the second guide part 3232fb may function as a rotating shaft. For example, the second guide part 3232fb may be coupled to a hole formed in the housing 3210 to be described below to allow the prism unit 3230 to be tilted along the Y-axis.

On the other hand, the rotation guide may be formed to protrude from the housing 3210 in a Y-axis direction and may be rotatably coupled to a hole formed in the prism cover 3232 to allow the prism unit 3230 to be tilted along the Y-axis.

To this end, as described above, the third magnet driving unit 72M3 may be disposed on the outer surface of the support wall 3232a of the prism cover 3232, and the third coil driving unit 72C3 may be disposed to face the third magnet driving unit 72M3. To this end, as shown in FIG. 19, the second circuit board 3250 may include a first surface 3251 on which the first coil driving unit 72C1 is disposed, a second surface 3252 which faces the first surface 3251 and on which the second coil driving unit 72C2 is disposed, a third surface 3253 which connects the first surface 3251 and the second surface 3252, and a fourth surface 3254 which extends from the third surface 3253 to be inclined and on which the third coil driving unit 72C3 is disposed. Here, the fourth surface 3254 and the third coil driving unit 72C3 may be disposed to face the support wall 3232a of the prism cover 3232.

Figure 22A:
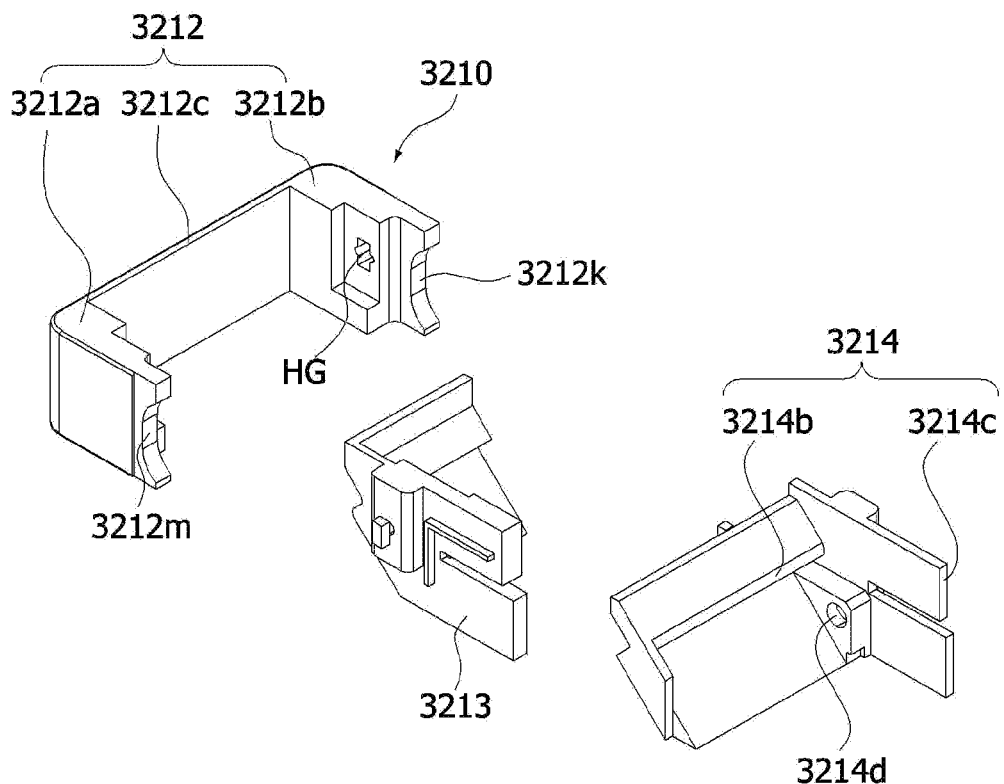
FIG. 22 illustrates a housing of the second actuator of FIG. 15.
Figure 22B:
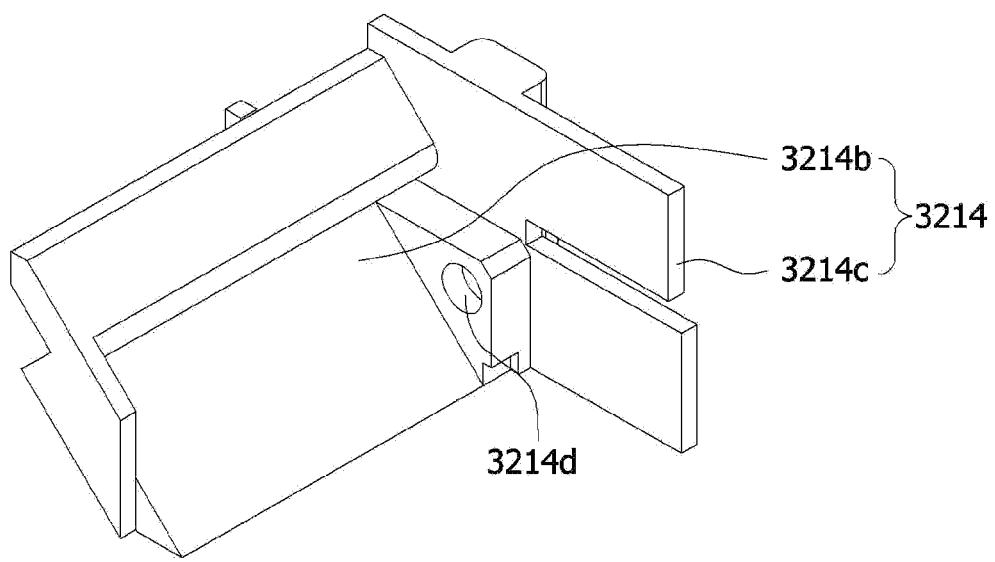

Next, FIG. 22A is an exploded perspective view of the housing included in the second actuator according to another embodiment of the present invention, and FIG. 22B is a perspective view of a base of the housing included in the second actuator according to another embodiment of the present invention.

Referring to FIG. 22A, the housing 3210 includes a cover 3212, a case 3213, and a base 3214. The cover 3212, the case 3213, and the base 3214 may be fitted into or coupled to each other to thus accommodate and support the prism unit 3230.

The cover 3212 may include a first cover side portion 3212a, a second cover side portion 3212b, and a third cover side portion 3212c, and the third cover side portion 3212c may be disposed between the first cover side portion 3212a and the second cover side portion 3212b. Here, a first side recess 3212m may be formed in the first cover side portion 212a, and a second side recess 3212k may be formed in the second cover side portion 3212b. The first coil driving unit 72C1 and the second coil driving unit 72C2 may be disposed in the first side recess 3212m and the second side recess 3212k.

Meanwhile, a first groove (not shown) may be formed in the first cover side portion 3212a, and a second groove HG may be formed in the second cover side portion 3212b. A protrusion of the case 3213 may be fixedly fitted into the first groove, and a protrusion 3214a of the base 3214 may be fixedly fitted into the second groove HG.

According to an embodiment of the present invention, the prism unit 3230 may be tilted in the Y-axis direction by an electromagnetic force between the third magnet driving unit 72M3 disposed on the prism cover 3232 and the third coil driving unit 72C3. In this case, the third coil driving unit 72C3 may be disposed on the fourth surface 3254 of the second circuit board 3250, and the fourth surface 3254 may be disposed between the base 3214 and the prism cover 3232. The fourth surface 3254 may be supported by the base 3214.

Referring to FIG. 22B, the base 3214 may include a seating surface 3214b on which the fourth surface 3254 of the second circuit board 3250 is seated and a side surface 3214c which extends vertically from one end of the seating surface 3214b. In this case, the protrusion 3214a, which is fitted into the second groove HG formed in the second cover side portion 3212b of the cover 3212, may be formed on an outer surface of the side surface 3214c, and a groove 3214d, into which the rotation guide 3232f of the prism cover 3232 is fitted, may be formed in an inner surface of the side surface 3214c.

As described above, the second guide part 3232fb of the rotation guide 3232f may function as a rotating shaft, and the second guide part 3232fb may be rotatably coupled to the groove 3214d to allow the prism unit 3230 to be rotated or tilted. For example, by an electromagnetic force between the third magnet driving unit 72M3 seated on the outer surface of the support wall 3232a of the prism cover 3232 and the third coil driving unit 72C3 disposed on the inclined surface 3253 of the second circuit board 3250, the prism unit 3230 may be tilted in the Y-axis direction.

As described above, the rotation guide may protrude from the side surface 3214c of the base 3214, may be fitted into the groove of the prism cover 3232, and may function as a rotating shaft.

Figure 23A:
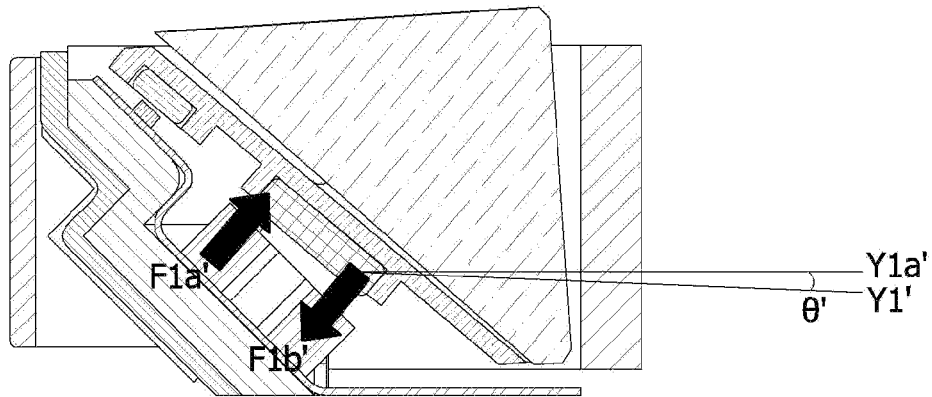
FIG. 23 illustrates tilting of the prism unit included in the second actuator of FIG. 15.
Figure 23B:
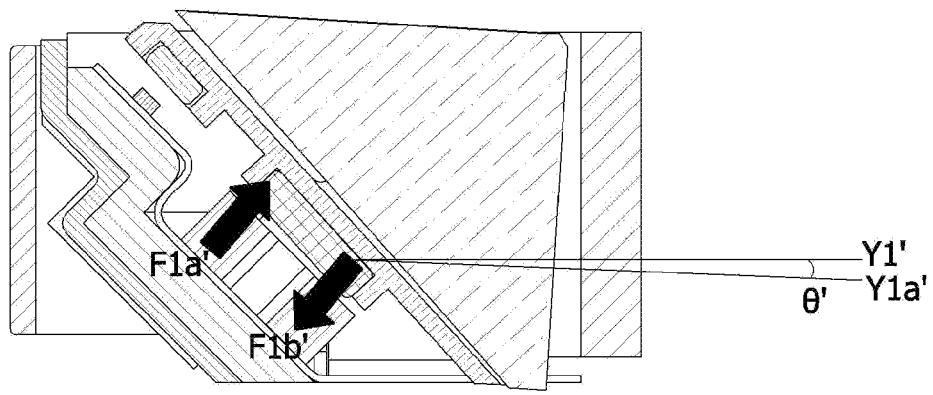

FIGS. 23A and 23B are views for describing Y-axis direction tilting of the second actuator according to another embodiment of the present invention.

As described above, the sensing magnet SM may be further disposed on the prism cover 3232 of the prism unit 3230, and a Hall sensor HS may be further disposed on the fourth surface 3254 of the second circuit board 3250 at a position facing the sensing magnet SM.

Referring to FIGS. 23A and 23B, the prism unit 3230 may be rotated about the Y-axis to implement an OIS. For example, the third magnet driving unit 72M3 disposed on the prism cover 3232, along with the third coil driving unit 72C3, may form an electromagnetic force to tilt or rotate the prism unit 3230 in the Y-axis direction.

Specifically, by first electromagnetic forces F1a' and F1b' between the third magnet driving unit 72M3 and the third coil driving unit 72C3, the prism unit 3230 is rotated at a certain θ' (Y1'→Y1a') in the Y-axis direction, thereby implementing an OIS. Here, the certain angle θ' may be ±3°.

As described above, according to an embodiment of the present invention, the tilting correction unit may be tilted along the second axis, and the prism unit may be tilted along the first axis perpendicular to the second axis, thereby correcting an optical axis. Accordingly, it is possible to minimize a volume and area occupied by the driving unit included in the actuator and also simultaneously implement first axis tilting and second axis tilting. In addition, the numbers of coil driving units and magnet driving units constituting the driving unit can be reduced, thereby reducing power consumption.

Meanwhile, although a camera module including an actuator for an OIS and an actuator for AF or zooming has been mainly described, and in particular, in FIGS. 13A and 13B, an example of a pin type has been described in which a lens assembly of a first actuator 1100 performing a zooming function or an AF function is guided by a guide pin, the present invention is not limited thereto. An actuator performing a zooming function or an AF function may be a ball type guided by a ball.

Figure 24:
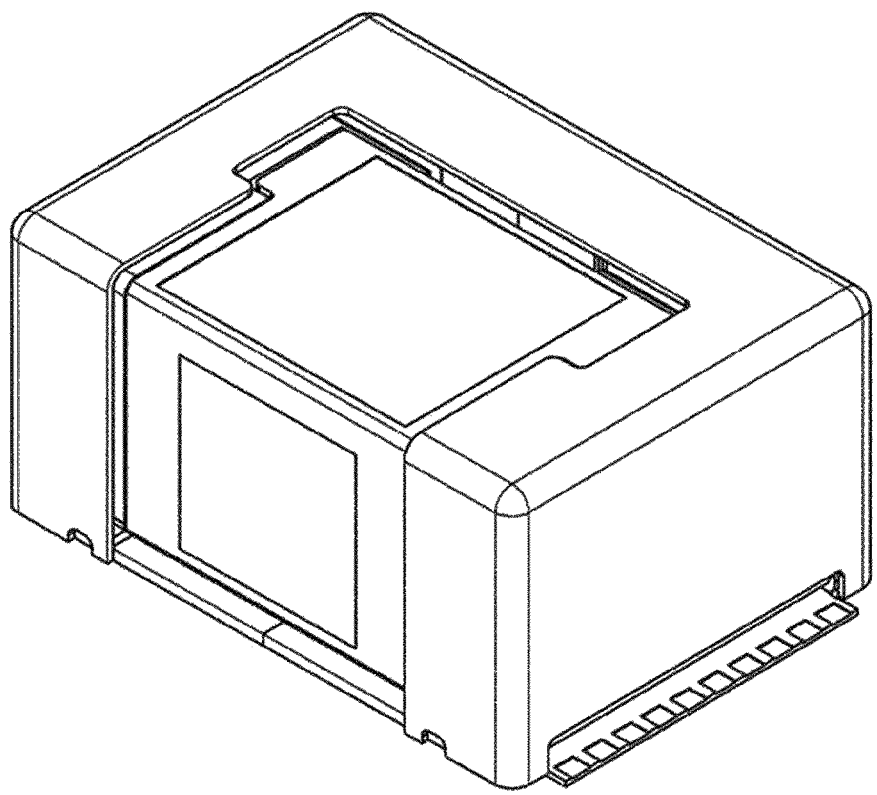
FIG. 24 is a perspective view of a second camera actuator according to still another embodiment of the present invention.
Figure 25:
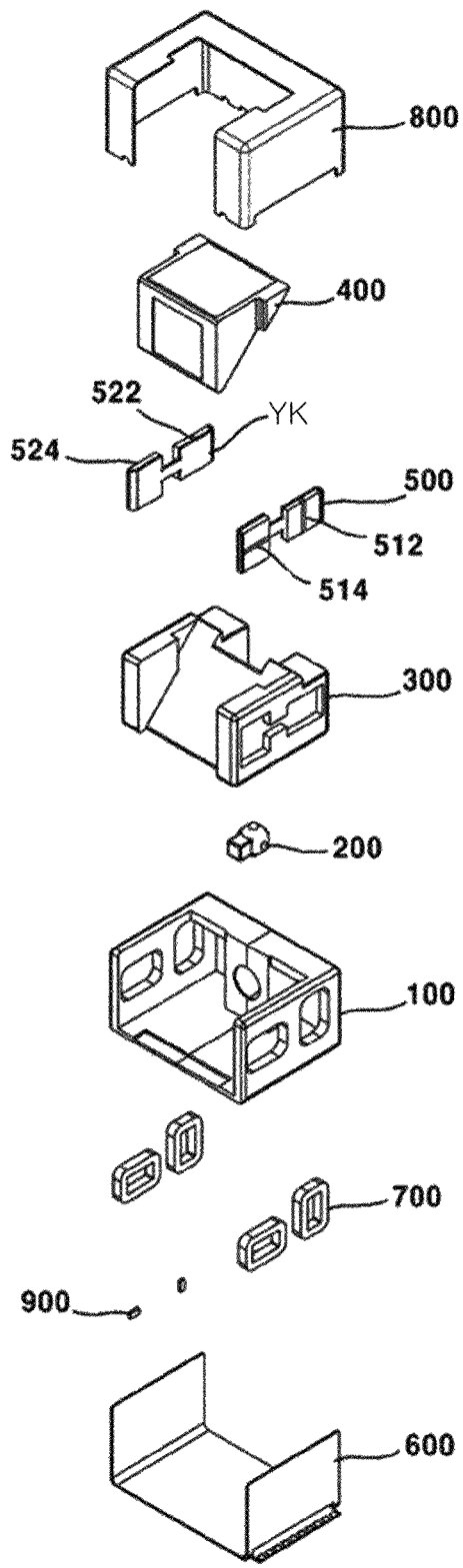
FIG. 25 is an exploded perspective view of the second camera actuator according to still another embodiment of the present invention.
Figure 26:
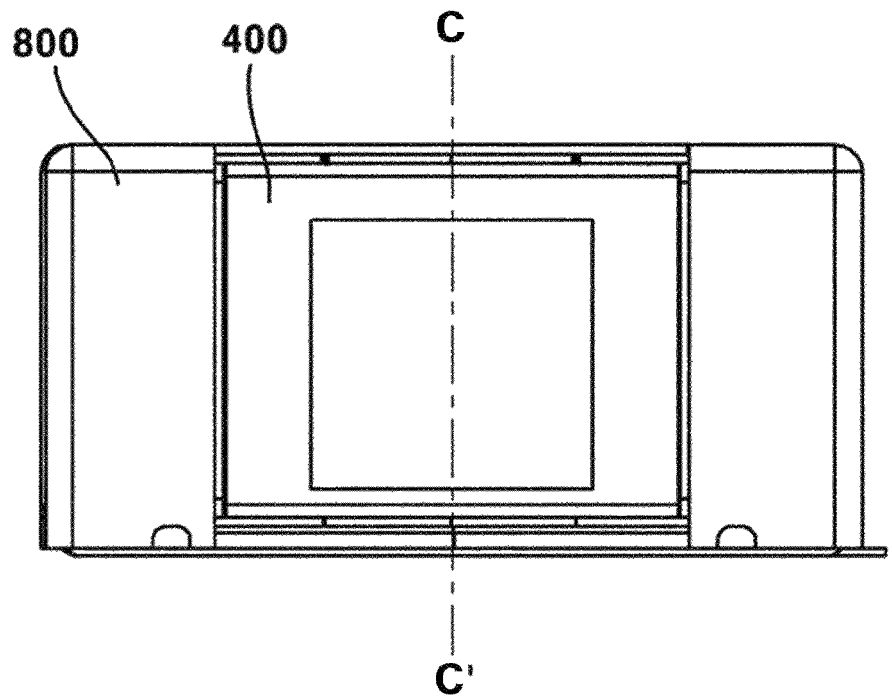
FIG. 26 is a plan view of the second camera actuator according to still another embodiment of the present invention.
Figure 27:
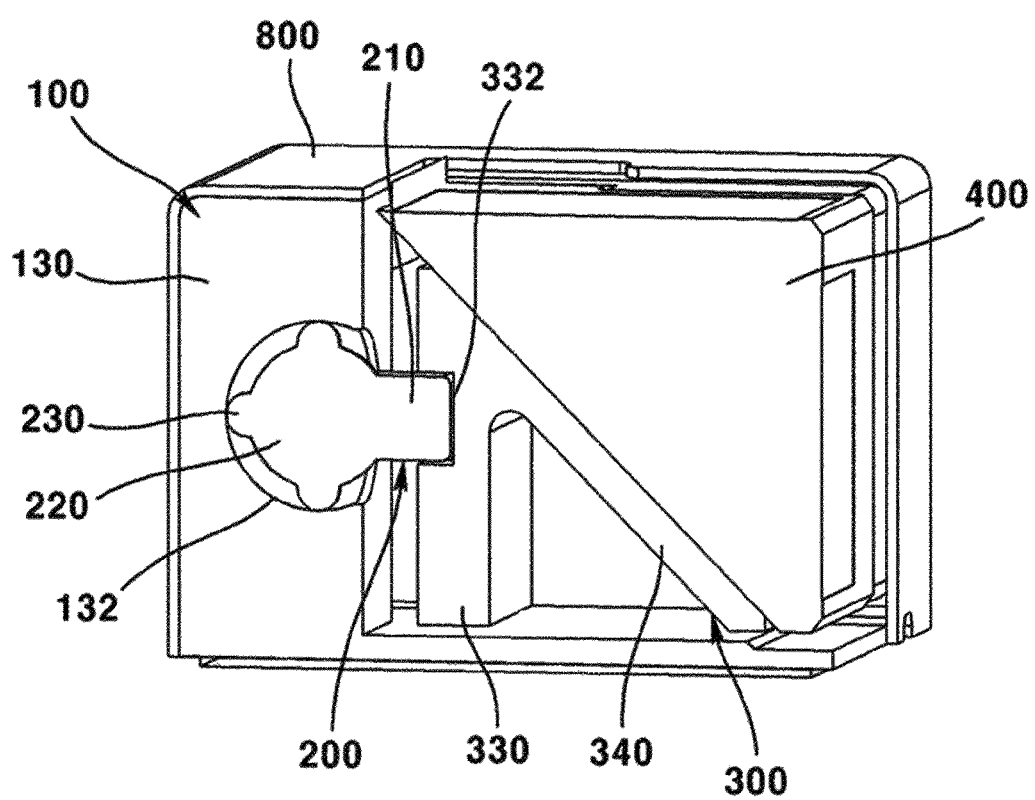
FIG. 27 is a cross-sectional view along line C-C' of FIG. 26.
Figure 28:
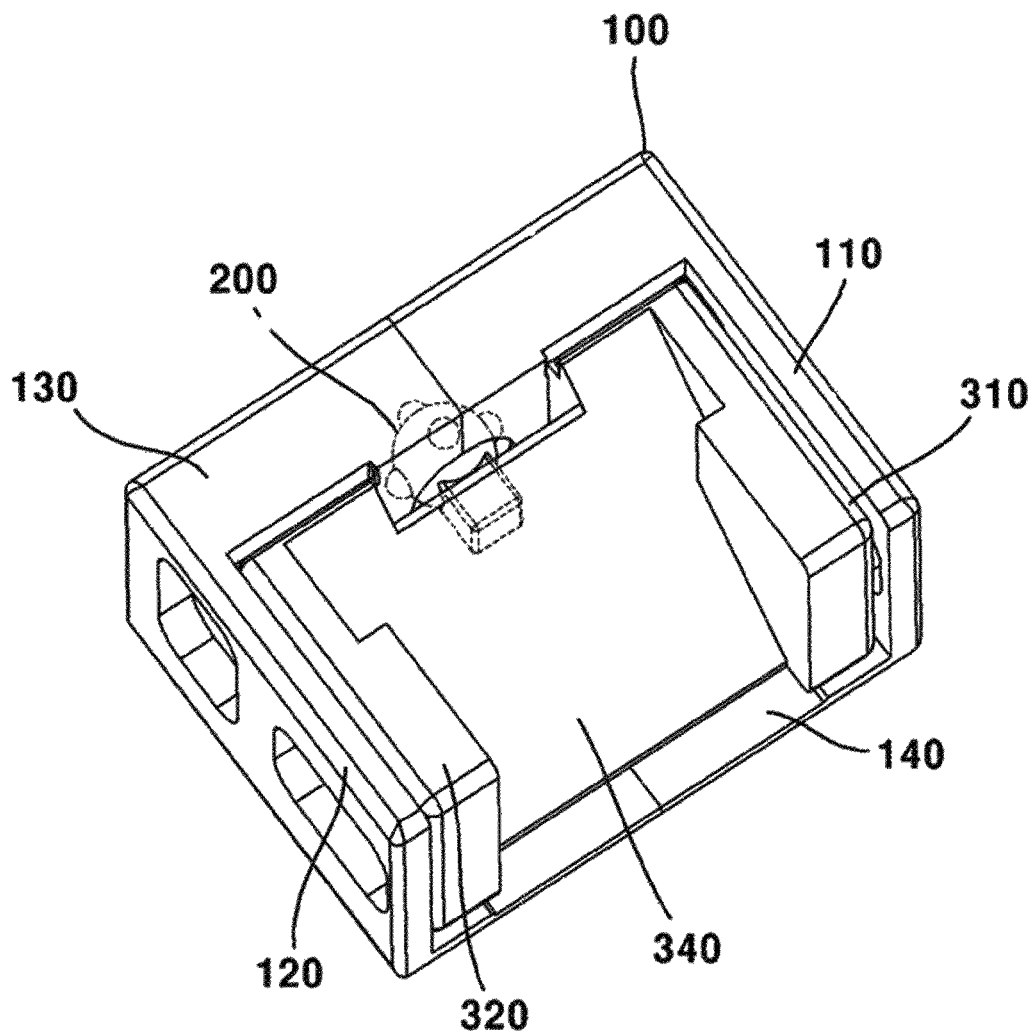
FIG. 28 is a perspective view of some components of FIG. 24.
Figure 29:
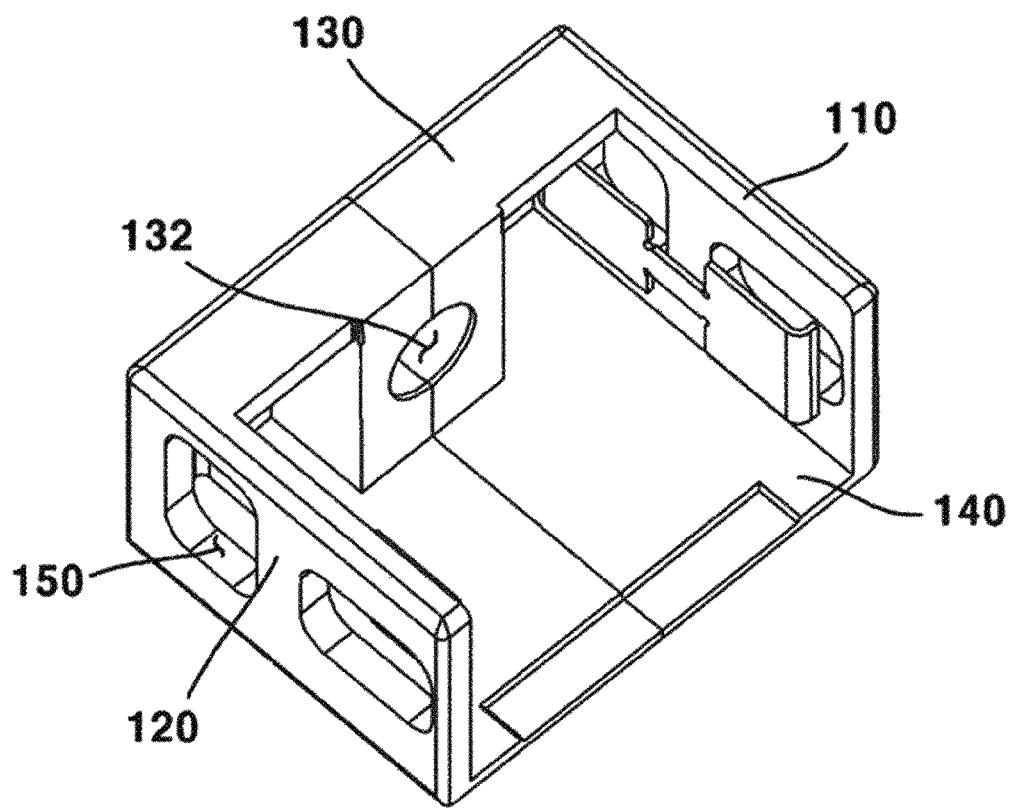
FIGS. 29 and 30 are perspective views of some components of FIG. 28.
Figure 30:
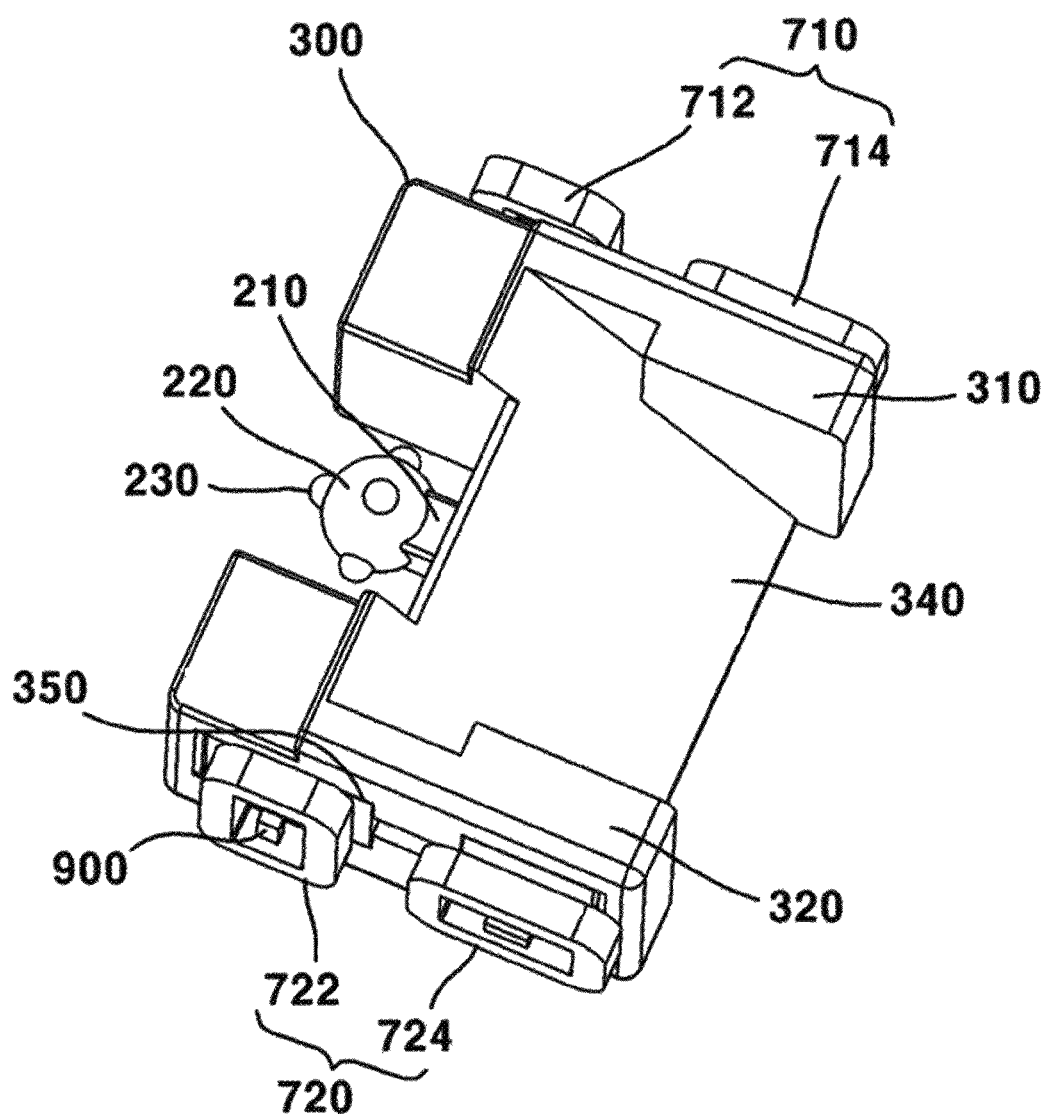
Figure 31:
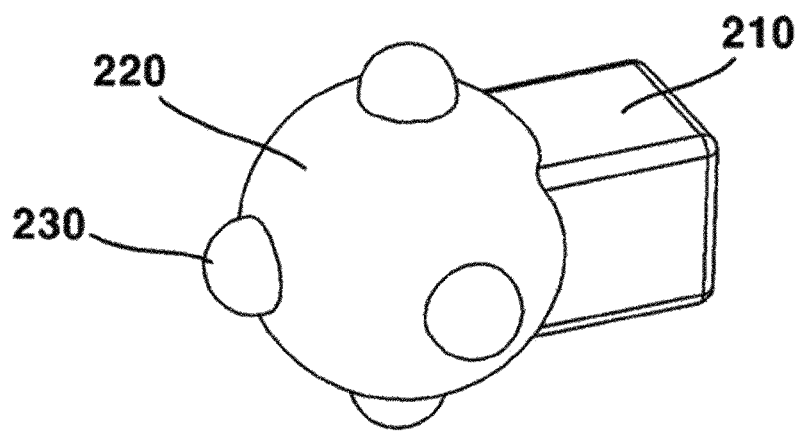
FIG. 31 is a perspective view of a guide part of the second camera actuator according to still another embodiment of the present invention.

FIG. 24 is a perspective view of a second camera actuator according to still another embodiment of the present invention. FIG. 25 is an exploded perspective view of the second camera actuator according to still another embodiment of the present invention. FIG. 26 is a plan view of the second camera actuator according to still another embodiment of the present invention. FIG. 27 is a cross-sectional view along line C-C' of FIG. 26. FIG. 28 is a perspective view of some components of FIG. 24. FIGS. 29 and 30 are perspective views of some components of FIG. 28. FIG. 31 is a perspective view of a guide part of the second camera actuator according to still another embodiment of the present invention.

Referring to FIGS. 24 to 31, a second camera actuator 5000 according to still another embodiment of the present invention may include a housing 100, a guide part 200, a prism mover 300, a prism 400, a first driving unit 500, a board 600, a second driving unit 700, a cover can 800, and a sensor 900. However, some components among the above-described components may be excluded, and additional components may not be excluded. The cover can 800 may correspond to the above-described shield can, the housing 100 may correspond to the above-described housing, the guide part 200 may correspond to the above-described ball part, the prism mover 300 corresponds to the above-described holder, the prism 400 may correspond to the above-described optical member, the first driving unit 500 may corresponds to the above-described driving magnet, the second driving unit 700 may corresponds to the above-described driving coil, the board 600 may correspond to the above-described board unit 700, and the sensor 900 may correspond to the above-described Hall sensor. Accordingly, the above-described contents may be applied to corresponding components excluding contents to be described below.

The second camera actuator 5000 may include the housing 100. The housing 100 may form an exterior of the second camera actuator 5000. The housing 100 may be formed in a hexahedral shape with an open upper and side surface. The guide part 200, the prism mover 300, the prism 400, the first driving unit 500, the board 600, the second driving unit 700, and the sensor 900 may be disposed in the housing 100.

The housing 100 may include a lower surface 140, a first sidewall 110, a second sidewall 120 facing the first sidewall 110, and a third sidewall 130 connecting the first sidewall 110 and the second sidewall 120. The board 600 may be disposed on the lower surface 140, the first sidewall 110, and the second sidewall 120 of the housing 100. The second driving unit 700 may be disposed on each of the first sidewall 110 and the second sidewall 120 of the housing 100. Grooves 150 in which the second driving unit 700 is disposed may be formed in the lower surface 140, the first sidewall 110, and the second sidewall 120 of the housing 100.

The guide part 200 may be disposed between the third sidewall 130 of the housing 100 and the prism mover 300. The guide part 200 may be coupled to the third sidewall 130 of the housing 100. A sidewall groove 132 to which a spherical portion 220 of the guide part 200 is coupled may be formed in the third sidewall 130 of the housing 100. The sidewall groove 132 may include a curved surface. The sidewall groove 132 may include a first area having a first diameter, a second area having a diameter that becomes smaller than the first diameter as the first area is closer to the prism mover 300, and a third area having a diameter that becomes smaller than the first diameter as the first area is further away from the prism mover 300. The guide part 200 may be snap-fit-coupled to the sidewall groove 132 through the second area. When the spherical portion 220 of the guide part 200 is pressed and fitted into the sidewall groove 132, the guide part 200 may not be separated from the sidewall groove 132 due to the second area.

Referring to FIG. 29, the housing 100 may be provided as two parts. Specifically, the housing 100 may include a first housing part and a second housing part. The first housing part and the second housing part may be formed symmetrically with each other. The first housing part and the second housing part may be coupled to each other through an adhesive. The sidewall groove 132 may be formed in a portion at which the first housing part and the second housing part are coupled.

The second camera actuator 5000 may include the guide part 200. The guide part 200 may be disposed between the housing 100 and the prism mover 300. The guide part 200 may be disposed between facing surfaces of the prism mover 300 and the housing 100. The guide part 200 may include a coupling portion 210 coupled to the prism mover 300, the spherical portion 220 extending from the coupling portion 210, and protrusions 230 formed on the spherical portion 220.

A cross section of the coupling portion 210 of the guide part 200 may be formed to be smaller than a cross section of the spherical portion 220. The cross section of the coupling portion 210 may be formed in a quadrangular shape. The coupling portion 210 may be coupled to a mover groove 332 of the prism mover 300. After the coupling portion 210 is fitted into the mover groove 332 of the prism mover 300, an adhesive may be applied in a space between the coupling portion 210 and the mover groove 332. Alternatively, the coupling portion 210 may be formed integrally with the prism mover 300.

The spherical portion 220 of the guide part 200 may be formed to extend from the coupling portion 210. The spherical portion 220 may be formed in a spherical shape or a partially spherical shape. The cross section of the spherical portion 220 may be formed to be greater than the cross section of the coupling portion 210. The spherical portion 220 may be disposed in the sidewall groove 132 of the housing 100. A size of the cross section of the spherical portion 220 may be formed to be smaller than a size of a multi-sided surface of the sidewall groove 132 of the housing 100. The spherical portion 220 may be fitted into and coupled to the sidewall groove 132 of the housing 100.

The protrusion 230 of the guide part 200 may protrude outward from the spherical portion 220. The protrusion 230 may be formed in a partially spherical shape. The protrusions 230 may include a plurality of protrusions spaced apart from each other. The protrusion 230 may be in contact with an inner surface of the sidewall groove 132 of the housing 100. Thus, when the prism mover 300 is tilted, friction between the sidewall groove 132 and the guide part 200 is reduced, thereby inhibiting damage to a product.

Therefore, the guide part 200 may guide second axis tilting of the prism mover 300. The guide part 200 may be made of a non-magnetic material. For example, the guide part 200 may be made of a stainless steel (SUS) material. Thus, it is possible to inhibit electromagnetic interference in the first driving unit 500 and the second driving unit 700.

The second camera actuator 5000 may include the prism mover 300. The prism mover 300 may be disposed in the housing 100. The prism mover 300 may be disposed inside the housing 100. The prism mover 300 may be tiltably supported by the guide part 200 in the housing 100. The prism mover 300 may include an accommodating portion in which the prism 400 is disposed.

The prism mover 300 may include a first side surface 310, a second side surface 320 facing the first side surface 310, an inclined portion 340 connecting the first side surface 310 and the second side surface 320 and having a certain inclination, and a support portion 330 extending downward from the inclined portion 340. The first side surface 310 of the prism mover 300 may face the first sidewall 110 of the housing 100, the second side surface 320 of the prism mover 300 may face the second sidewall 120 of the housing 100, and the support portion 330 of the prism mover 300 may face the third sidewall 130 of the housing 100.

The first driving unit 500 may be disposed on each of the first and second side surfaces 310 and 320 of the prism mover 300. First and second magnet units 512 and 514 may be disposed on the first side surface 310 of the prism mover 300. Third and fourth magnet units 522 and 524 may be disposed on the second side surface 320 of the prism mover 300.

The prism may be disposed on the inclined portion 340 of the prism mover 300.

The mover groove 332 may be formed in the support portion 330 of the prism mover 300. The mover groove 332 may be formed at a position corresponding to the sidewall groove 132 of the housing 100. A size of the mover groove 332 may be formed to be smaller than a size of the sidewall groove 132. The mover groove 332 may face the sidewall groove 132. The mover groove 332 may be formed in a shape and size corresponding to the coupling portion 210 of the guide part 200.

The second camera actuator 5000 may include the prism 400. The prism 400 may be disposed inside the housing 100. The prism 400 may be disposed on the prism mover 300. The prism 400 may be disposed on the inclined portion 340 of the prism mover 300. The prism 400 may have an upper surface and a side surface which are exposed to the outside. The prism 400 may reflect light traveling from above to vertically change a movement path of the light. The prism 400 may be coupled to the prism mover 300, may be tilted with respect to a first axis according to movement of the prism mover 300, and may be tilted with respect to a second axis perpendicular to the first axis.

The second camera actuator 5000 may include the first driving unit 500. The first driving unit 500 may be disposed in the prism mover 300. The first driving unit 500 may be disposed in a groove 350 of the prism mover 300. The first driving unit 500 may include a magnet. The first driving unit 500 may face the second driving unit 700. The first driving unit 500 may tilt the prism mover 300 through an electromagnetic interaction with the second driving unit 700.

The first driving unit 500 may include the first and second magnet units 512 and 514 disposed on the first side surface 310 of the prism mover 300 and the third and fourth magnet units 522 and 524 disposed on the second side surface 320. A length of each of the first and third magnet units 512 and 522 in a first direction may be formed to be greater than a length of each of the second and fourth magnet units 514 and 524 in the first direction. A length of each of the first and third magnet units 512 and 522 in a second direction perpendicular to the first direction may be formed to be smaller than a length of each of the second and fourth magnet units 514 and 524 in the second direction. Here, the first direction may be a direction in which light is reflected from the prism 400, and the second direction may be a direction in which light is incident on the prism 400.

The first and third magnet units 512 and 522 may face first and third coil units 712 and 722. Through an electromagnetic interaction with the first and third coil units 712 and 722, the first and third magnet units 512 and 522 may tilt the prism 400 and the prism mover 300 with respect to the second axis.

The second and fourth magnet units 514 and 524 may face second and fourth coil units 714 and 724. Through an electromagnetic interaction with the second and fourth coil units 714 and 724, the second and fourth magnet units 514 and 524 may tilt the prism 400 and the prism mover 300 with respect to the first axis perpendicular to the second axis.

The second camera actuator 5000 may include a yoke YK. The yoke may be disposed between the first driving unit 500 and the prism mover 300. Excluding a surface of the first driving unit 500 facing the second driving unit 700, the yoke may surround at least portions of surfaces of the first driving unit 500 to inhibit leakage of a magnetic field.

The second camera actuator 5000 may include the board 600. The board 600 may be disposed in the housing 100. A lower surface of the board 600 may be disposed on the lower surface 140 of the housing 100. The board 600 may be disposed on the first sidewall 110 and the second sidewall 120 of the housing 100. The second driving unit 700 may be disposed on the board 600. The board 600 may be electrically connected to the second driving unit 700. The board 600 may receive power from an external power supply and may supply a current to the second driving unit 700. The board 600 may be electrically connected to the sensor 900. The board 600 may supply a current to the sensor 900.

At least a portion of the board may be bent. The board 600 may include first to third surfaces. The first to third surfaces of the board 600 may be respectively disposed on the lower surface 140 and the first and second sidewalls 110 and 120 of the housing 100.

The board 600 may include a PCB. The board 600 may include a flexible PCB (FPCB).

The second camera actuator 5000 may include the second driving unit 700. The second driving unit 700 may be disposed in the housing 100. The second driving unit 700 may be disposed inside the housing 100. The second driving unit 700 may be disposed on the board 600. The second driving unit 700 may be electrically connected to the board 600. The second driving unit 700 may include coils. The second driving unit 700 may face the first driving unit 500. The second driving unit 700 may tilt the prism 400 and the prism mover 300 through an electromagnetic interaction with the first driving unit 500.

The second driving unit 700 may include a first coil 710 disposed on the first surface of the board 600 or the first sidewall 110 of the housing 100 and a second coil 720 disposed on the second surface of the board 600 or the second sidewall 120 of the housing 100. The first coil 710 may include the first coil unit 712 and the second coil unit 714 which are spaced apart from each other. The second coil 720 may include the third coil unit 722 and the fourth coil unit 724 which are spaced apart from each other.

A length of each of the first and third coil units 711 and 712 in the first direction may be formed to be smaller than a length of each of the second and fourth coil units 714 and 724 in the first direction. A length of each of the first and third coil units 712 and 722 in the second direction may be formed to be greater than a length of each of the second and fourth coil units 714 and 724 in the second direction. The first coil unit 712 may face the first magnet unit 512, the second coil unit 714 may face the second magnet unit 514, the third coil unit 722 may face the third magnet unit 522, and the fourth coil unit 724 may face the fourth magnet unit 524. Through an electromagnetic interaction with the first and third magnet unit 512 and 522, the first and third coil units 712 and 722 may tilt the prism 400 and the prism mover 300 with respect to the second axis. Through an electromagnetic interaction with the second and fourth magnet units 514 and 524, the second and fourth coil units 714 and 724 may tilt the prism 400 and the prism mover 300 with respect to the second axis.

The second camera actuator 5000 may include the cover can 800. The shield can 800 may surround the housing 100. The shield can 800 may be made of a metal material. The shield can 800 may inhibit an electromagnetic field generated inside the second camera actuator 5000 from being emitted to the outside. The shield can 800 may inhibit electromagnetic interference, which may be generated from the outside, in the second camera actuator 5000.

The second camera actuator 5000 may include the sensor 900. The sensor 900 may be disposed in the second driving unit 700. The sensor 900 may face the first driving unit 500. The sensor 900 may be electrically connected to the board 600. The sensor may include a Hall sensor. The sensor 900 may detect movement of the first driving unit 500. Thus, feedback control is possible. The sensor 900 may include a plurality of sensor units disposed in one or more of the first to fourth coil units 712, 714, 722, and 724.

According to still another embodiment of the present invention, the prism 300 may be tilted with respect to the first axis, and the prism 300 may be tilted with respect to the second axis through the simple structure of the guide part 200, thereby reducing a size of a product. Here, a tilting angle of the prism 300 with respect to the first axis may be within a range of ±3°, and a tilting angle of the prism 300 with respect to the second axis may be within a range of ±3°.

Figure 32:
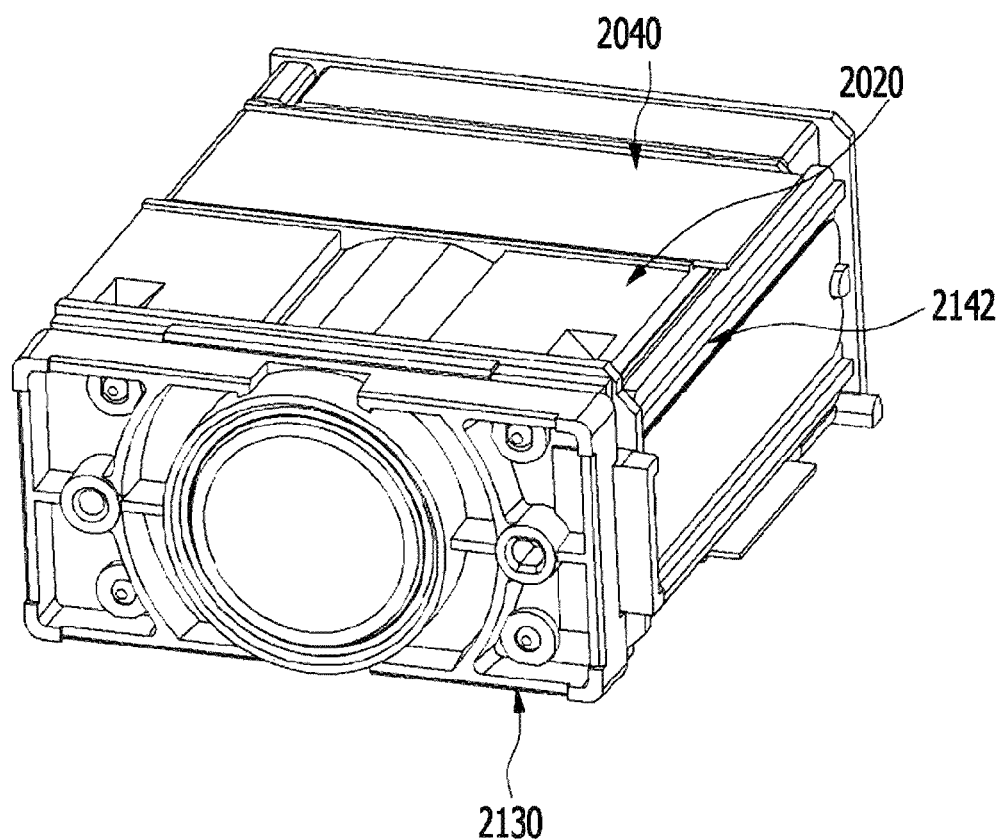
FIG. 32 is a perspective view of an actuator for auto focusing (AF) or zooming according to yet another embodiment of the present invention.
Figure 33:
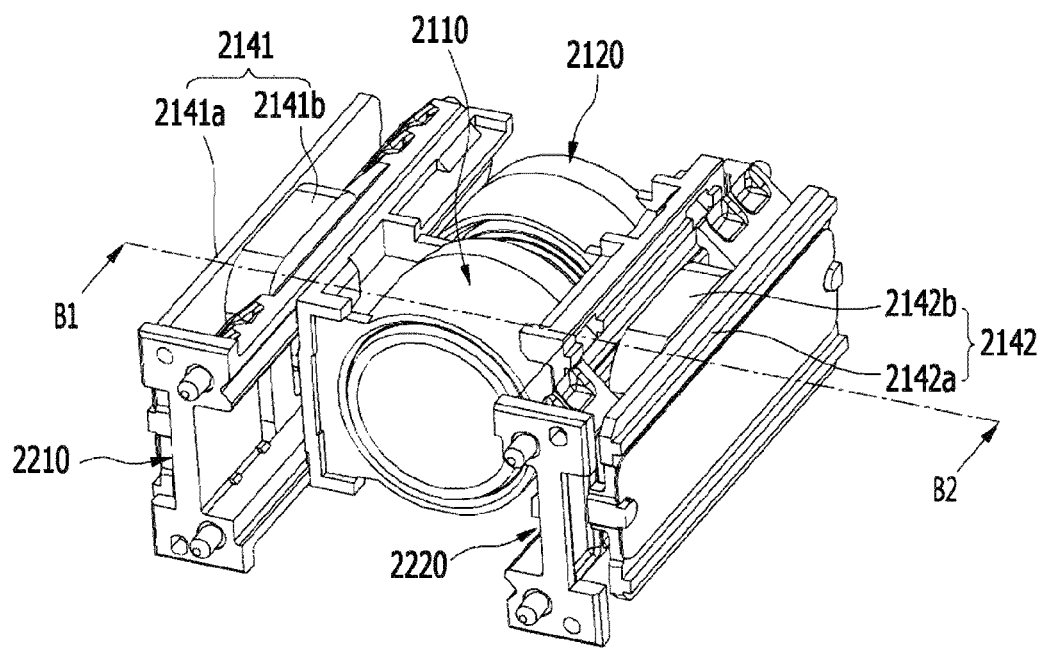
FIG. 33 is a perspective view of the actuator according to the embodiment shown in FIG. 32 from which some components are omitted.
Figure 34:
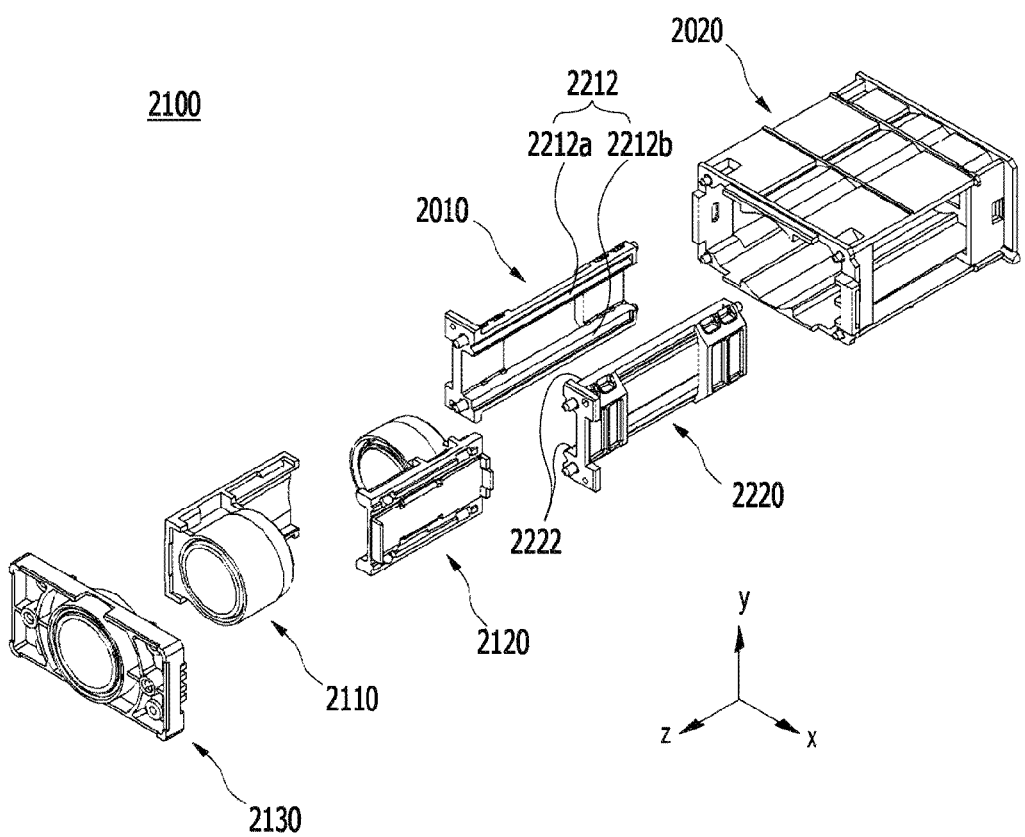
FIG. 34 is an exploded perspective view of the actuator according to the embodiment shown in FIG. 32 from which some components are omitted.
Figure 35A:
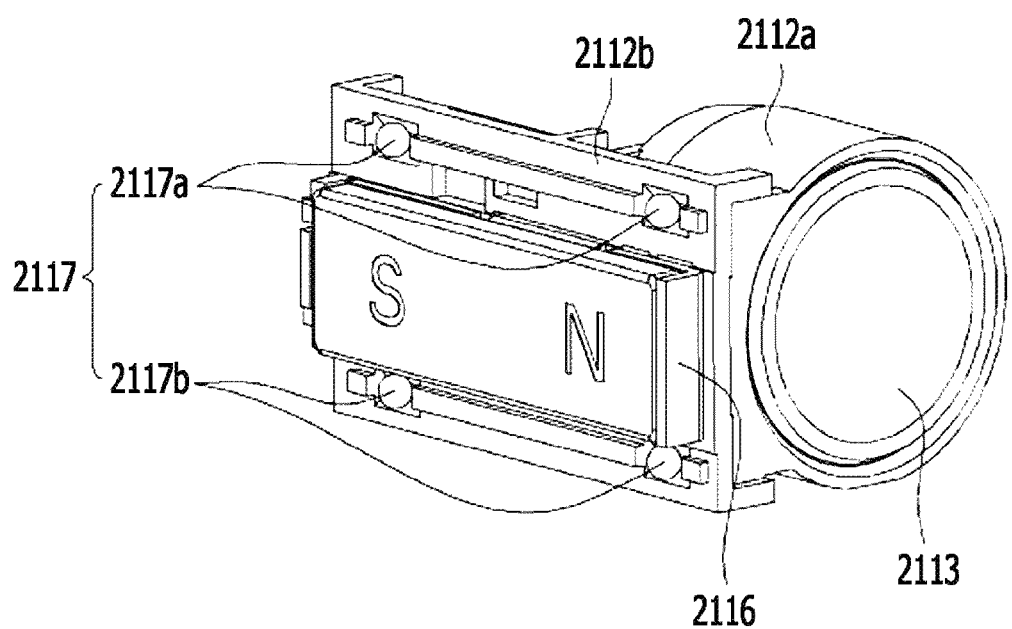
FIG. 35A is a perspective view of a first lens assembly in the actuator according to the embodiment shown in FIG. 34.
Figure 35B:
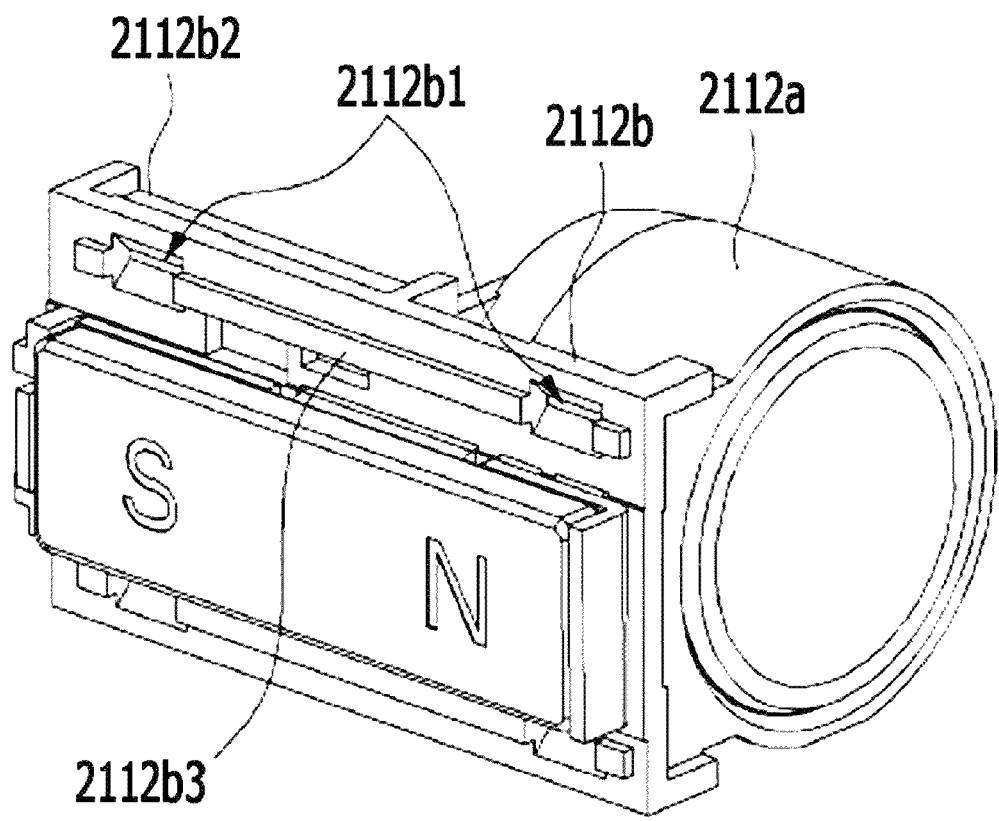
FIG. 35B is a perspective view of the first lens assembly shown in FIG. 35A from which some components are removed.

FIG. 32 is a perspective view of an actuator for AF or zooming according to yet another embodiment of the present invention. FIG. 33 is a perspective view of the actuator according to the embodiment shown in FIG. 32 from which some components are omitted. FIG. 34 is an exploded perspective view of the actuator according to the embodiment shown in FIG. 32 from which some components are omitted. FIG. 35A is a perspective view of a first lens assembly in the actuator according to the embodiment shown in FIG. 34. FIG. 35B is a perspective view of the first lens assembly shown in FIG. 35A from which some components are removed.

FIG. 32 is a perspective view of the actuator for AF or zooming according to yet another embodiment of the present invention. FIG. 33 is a perspective view of the actuator according to the embodiment shown in FIG. 32 from which some components are omitted. FIG. 34 is an exploded perspective view of the actuator according to the embodiment shown in FIG. 32 from which some components are omitted.

Referring to FIG. 32, an actuator 2100 according to the embodiment may include a housing 2020, a circuit board 2040 and a driving unit 2142 disposed outside the housing 2020, and a third lens assembly 2130.

FIG. 33 is a perspective view illustrating the housing 2020 and the circuit board 2040 being omitted in FIG. 32. Referring to FIG. 33, the actuator 2100 according to the embodiment may include a first guide part 2210, a second guide part 2220, a first lens assembly 2110, a second lens assembly 2120, a driving unit 2141, and the driving unit 2142.

The driving unit 2141 and the driving unit 2142 may include a coil or a magnet.

For example, when the driving unit 2141 and the driving unit 2142 include the coil, the driving unit 2141 may include a first coil unit 2141b and a first yoke 2141a, and the driving unit 2142 may include a second coil unit 2142b and a second yoke 2142a.

Alternatively, on the other hand, the driving unit 2141 and the driving unit 2142 may include the magnet.

Referring to FIG. 34, the actuator 2100 according to the embodiment may include the housing 2020, the first guide part 2210, the second guide part 2220, the first lens assembly 2110, the second lens assembly 2120, and the third lens assembly 2130.

For example, the actuator 2100 according to the embodiment may include the housing 2020, the first guide part 2210 disposed at one side of the housing 2020, the second guide part 2220 disposed at the other side of the housing 2020, the first lens assembly 2110 corresponding to the first guide part 2210, the second lens assembly 2120 corresponding to the second guide part 2220, first balls 2117 (see FIG. 35A) disposed between the first guide part 2210 and the first lens assembly 2110, and second balls (not shown) disposed between the second guide part 2220 and the second lens assembly 2120.

In addition, the actuator 2100 according to the embodiment may include the third lens assembly 2130 disposed in front of the first lens assembly 2110 in an optical axis direction.

Referring to FIGS. 33 and 34, the actuator 2100 according to the embodiment may include the first guide part 2210 disposed adjacent to a first sidewall of the housing 2020 and the second guide part 2220 disposed adjacent to a second sidewall of the housing 2020.

The first guide part 2210 may be disposed between the first lens assembly 2110 and the first sidewall of the housing 2020.

The second guide part 2220 may be disposed between the second lens assembly 2120 and the second sidewall of the housing 2020. The first sidewall and the second sidewall of the housing 2020 may be disposed to face each other.

According to an embodiment, since the lens assemblies are driven in a state in which the first guide part 2210 and the second guide part 2220 precisely and numerically controlled are coupled in the housing 2020, frictional torque is reduced and thus frictional resistance is reduced, thereby obtaining technical effects of improving a driving force during zooming, reducing power consumption, and improving control characteristics.

Accordingly, according to an embodiment, during zooming, it is possible to minimize frictional torque and also inhibit a phenomenon in which a lens is decentered or tilted or central axes of a lens group and an image sensor are not aligned, thereby providing a combined technical effect of considerably improving image quality or resolution.

In particular, according to the present embodiment, since the first guide part 2210 and the second guide part 2220, which are formed separately from and assembled with the housing 2020, are separately adopted without arranging a guide rail in the housing itself, there is a special technical effect capable of inhibiting a gradient from occurring in an injection molding direction.

In an embodiment, the first guide part 2210 and the second guide part 2220 may be injection-molded along an X-axis and may have an injection length that is smaller than that of the housing 2020. In this case, when rails are disposed in the first guide part 2210 and the second guide part 2220, there are technical effects of minimizing the occurrence of a gradient during injection molding and lowering a possibility that a straight line of the rail is inclined.

More specifically, FIG. 35A is a perspective view of the first lens assembly 2110 in the actuator according to the embodiment shown in FIG. 34, and FIG. 35B is a perspective view illustrating the first lens assembly 2110 shown in FIG. 35 from which some components are removed.

Briefly referring to FIG. 34, the actuator 2100 according to the embodiment may include the first lens assembly 2110 moving along the first guide part 2210 and the second lens assembly 2120 moving along the second guide part 2220.

Referring again to FIG. 35A, the first lens assembly 2110 may include a first lens barrel 2112a in which a first lens 2113 is disposed and a first driving unit housing 2112b in which a driving unit 2116 is disposed. The first lens barrel 2112a and the first driving unit housing 2112b may be a first housing, and the first housing may have a barrel or body tube shape. The driving unit 2116 may be a driving magnet but is not limited thereto, and a coil may be disposed in some cases.

In addition, the second lens assembly 2120 may include a second lens barrel (not shown) in which a second lens (not shown) is disposed and a second driving unit housing (not shown) in which a driving unit (not shown) is disposed. The second lens barrel (not shown) and the second driving unit housing (not shown) may be a second housing, and the second housing may have a barrel or body tube shape. The driving unit may be a driving magnet but is not limited thereto, and a coil may be disposed in some cases.

The driving unit 2116 may correspond to two first rails 2212.

In an embodiment, driving may be performed using one or more balls. For example, the actuator 2100 according to the embodiment may include the first balls 2117 disposed between the first guide part 2210 and the first lens assembly 2110 and the second balls (not shown) disposed between the second guide part 2220 and the second lens assembly 2120.

For example, according to an embodiment, the first balls 2117 may include one or more first-first balls 2117a disposed at an upper side of the first driving unit housing 2112b and one or more first-second balls 2117b disposed at a lower side of the first driving unit housing 2112b.

In an embodiment, the first-first ball 2117a of the first balls 2117 may move along a first-first rail 2212a which is one of the first rails 2212, and the first-second ball 2117b of the first balls 2117 may move along a first-second rail 2212b which is the other one of the first rails 2212.

According to an embodiment, since the first guide part includes the first-first rail and the first-second rail, the first-first rail and the first-second rail guide the first lens assembly 2110, thereby providing a technical effect of increasing the accuracy of optical axis alignment with the second lens assembly 2210 when the first lens assembly 2110 moves.

Referring to FIG. 35B, in an embodiment, the first lens assembly 2110 may include first assembly grooves 2112b1 in which the first balls 2117 are disposed. The second lens assembly 2120 may include second assembly grooves (not shown) in which the second balls are disposed.

The plurality of first assembly grooves 2112b1 of the first lens assembly 2110 may be formed. In this case, a distance between two first assembly grooves 2112b1 among the plurality of first assembly grooves 2112b1 may be greater than a thickness of the first lens barrel 2112a in an optical axis direction.

In an embodiment, the first assembly groove 2112b1 of the first lens assembly 2110 may have a V shape. In addition, the second assembly groove (not shown) of the second lens assembly 2120 may have a V shape. In addition to the V shape, the first assembly groove 2112b1 of the first lens assembly 2110 may have a U shape or a shape which is in contact with the first ball 2117 at two or three points. In addition to the V shape, the second assembly groove (not shown) of the first lens assembly 2110 may have a U shape or a shape which is in contact with the second ball at two or three points.

Referring to FIGS. 34 and 35A, in an embodiment, the first guide part 2210, the first ball 2117, and the first assembly groove 2112b1 may be disposed on a virtual straight line in a direction from the first sidewall toward the second sidewall. The first guide part 2210, the first ball 2117, and the first assembly groove 2112b1 may be disposed between the first sidewall and the second sidewall.

Figure 36:
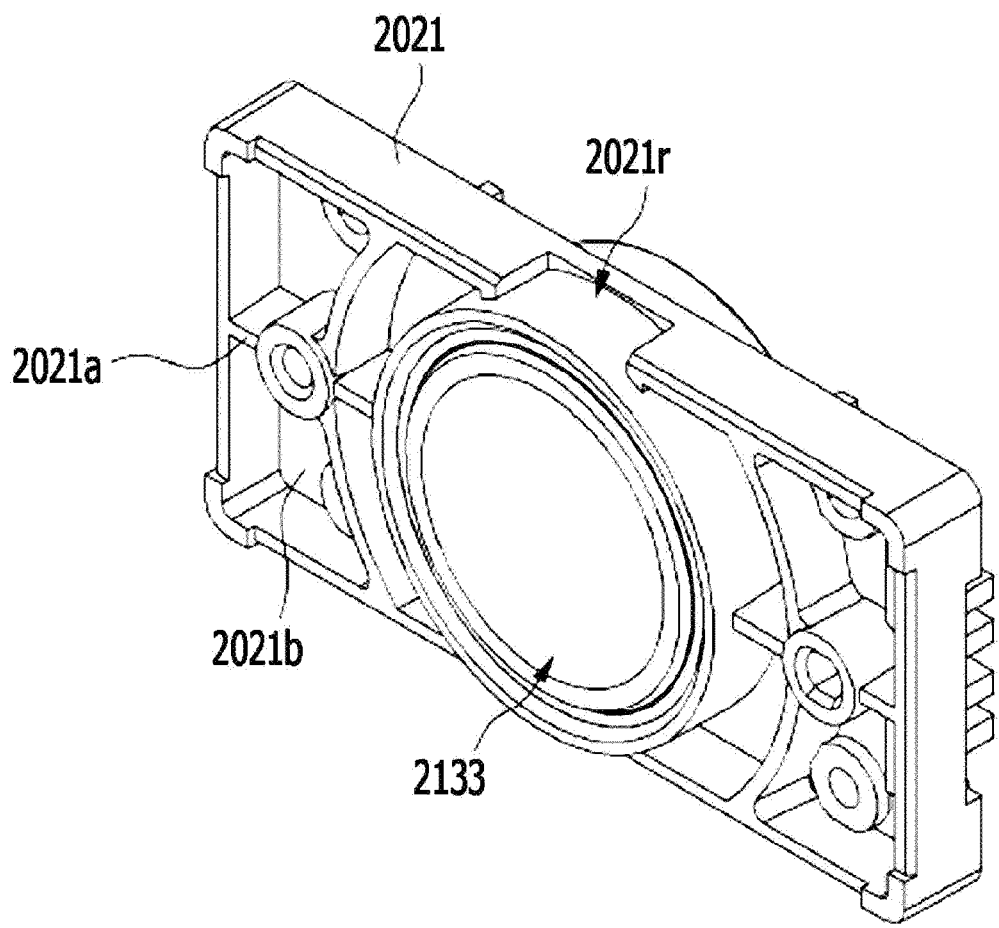
FIG. 36 is a perspective view of a third lens assembly in the actuator according to the embodiment shown in FIG. 34.

Next, FIG. 36 is a perspective view of the third lens assembly 2130 in the actuator according to the embodiment shown in FIG. 34.

Referring to FIG. 36, in an embodiment, the third lens assembly 2130 may include a third housing 2021, a third barrel, and a third lens 2133.

In an embodiment, since the third lens assembly 2130 has a barrel recess 2021r formed in an upper end portion of the third barrel, a thickness of the third barrel of the third lens assembly 2130 can be uniformly set, and there can be a combined technical effect of reducing an amount of injection mold to increase the accuracy of numerical management.

In addition, according to an embodiment, the third lens assembly 2130 may include a housing rib 2021a and a housing recess 2021b in the third housing 2021.

In an embodiment, since the third lens assembly 2130 includes the housing recess 2021b in the third housing 2021, there is a combined technical effect of reducing an amount of injection mold to increase the accuracy of numerical management, and concurrently, since the third lens assembly 2130 includes the housing rib 2021a in the third housing 2021, there is a combined technical effect capable of securing strength.

Figure 37:
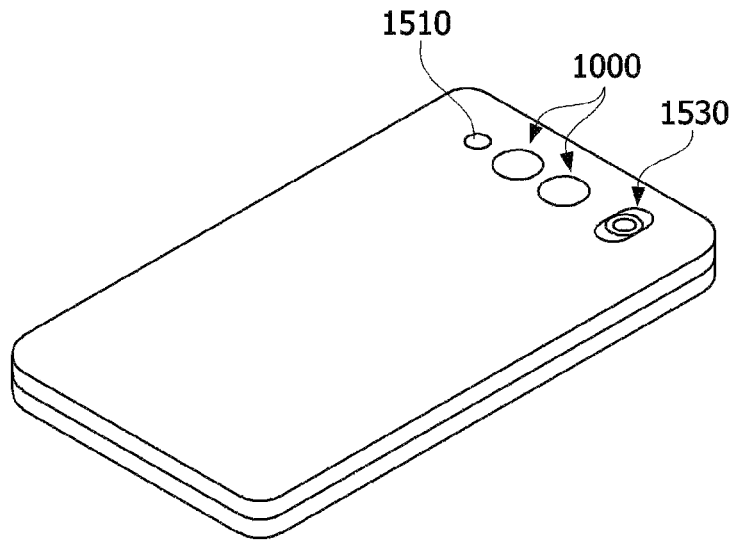
FIG. 37 is a perspective view of a mobile terminal to which a camera module is applied according to an embodiment.

FIG. 37 is a perspective view of a mobile terminal to which a camera module is applied according to an embodiment.

As shown in FIG. 37, a mobile terminal 1500 according to the embodiment may include a camera module 1000, a flash module 1530, and an AF device 1510 which are provided on a rear surface thereof.

The camera module 1000 may have an image capturing function and an AF function. For example, the camera module 1000 may have an AF function using an image.

The camera module 1000 processes an image frame of an image or a video image captured by an image sensor in a photographing mode or a video call mode.

The processed image frame may be displayed on a certain display unit and stored in a memory. A camera (not shown) may also be disposed on a front surface of a body of the mobile terminal.

For example, the camera module 1000 may include a first camera module 1000A and a second camera module 1000B, and an OIS may be implemented together with an AF or zooming function by the first camera module 1000A.

The flash module 1530 may include a light-emitting element, which emits light, therein. The flash module 1530 may be operated through an operation of the camera of the mobile terminal or under the control of a user.

The AF device 1510 may include one of packages of a surface light-emitting laser element as a light-emitting unit.

The AF device 1510 may include an AF function using a laser. The AF device 1510 may be mainly used under a condition in which an AF function of the camera module 1000 using an image is degraded, for example, at a proximity distance of 10 m or less or in a dark environment.

The AF device 1510 may include a light-emitting unit including a vertical cavity surface emitting laser (VCSEL) semiconductor element and a light-receiving unit such as a photodiode which converts light energy into electrical energy.

Figure 38:
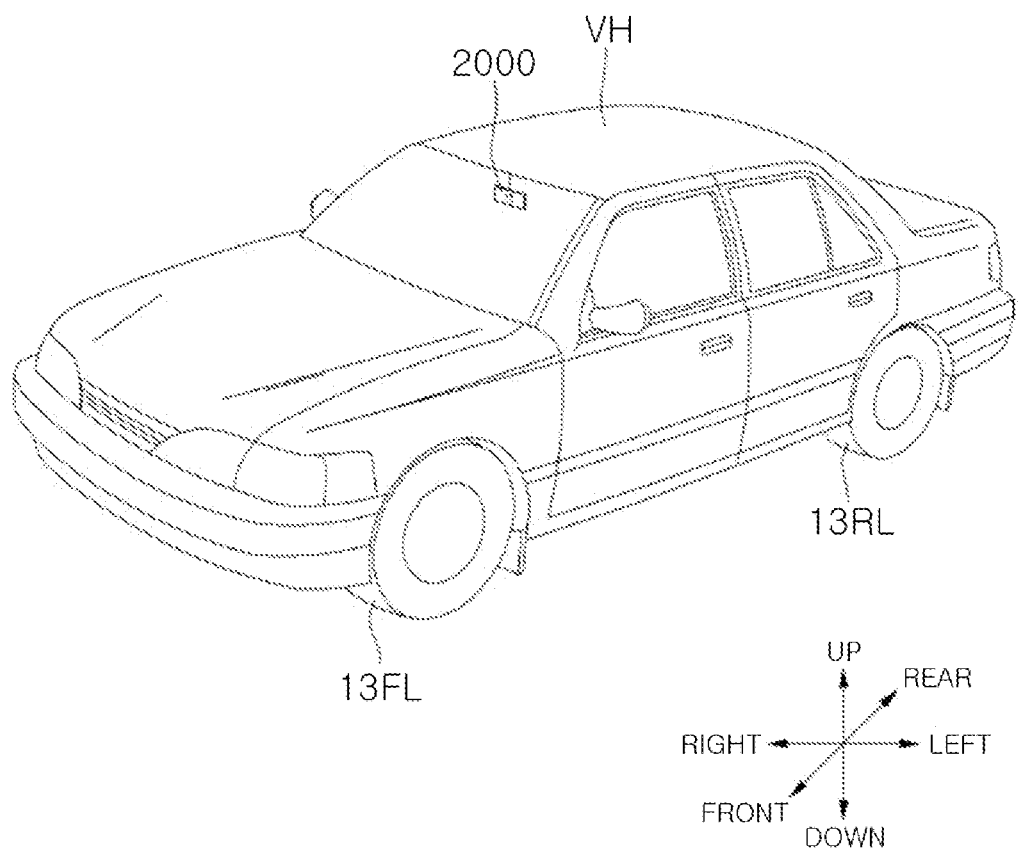
FIG. 38 is a perspective view of a vehicle to which a camera module is applied according to an embodiment.

FIG. 38 is a perspective view of a vehicle to which a camera module is applied according to an embodiment.

For example, FIG. 38 is a view illustrating an exterior of a vehicle including a vehicle driving assistance device to which a camera module 1000 according to an embodiment is applied.

Referring to FIG. 38, a vehicle VH according to the embodiment may include wheels 13FL and 13FR rotated by a power source and a certain sensor. The sensor may be a camera sensor 2000 but is not limited thereto.

The camera 2000 may be a camera sensor to which the camera module 1000 according to the embodiment is applied. The vehicle VH of the embodiment may acquire image information through the camera sensor 2000 which captures a front image or a surrounding image and may use the image information to determine a situation in which a lane is not identified and generate a virtual lane when the lane is not identified.

For example, the camera sensor 2000 may photograph a front side of the vehicle VH to capture a front image, and a processor (not shown) may analyze an object included in the front image to acquire image information.

For example, when objects such as lanes, adjacent vehicles, driving obstructions, and median strips, curbs, or street trees corresponding to indirect road markings are photographed in the image captured by the camera sensor 2000, the processor may detect the objects and add the objects to the image information. In this case, the processor may acquire information about a distance to the object detected through the camera sensor 2000 to further supplement the image information.

The image information may be information about the object captured from the image. The camera sensor 2000 may include an image sensor and an image processing module.

The camera sensor 2000 may process an image or a video obtained by the image sensor (for example, a complementary metal-oxide semiconductor (CMOS) or a charged coupled device (CCD)).

The image processing module may process the image or video obtained by the image sensor to extract necessary information and may transmit the extracted information to the processor.

In this case, the camera sensor 2000 may include a stereo camera to improve the measurement accuracy of the object and further secure information such as a distance between the vehicle VH and the object, but the present invention is not limited thereto.

The present invention has been described based on embodiments, but the embodiments are for illustrative and do not limit the present invention, and those skilled in the art will appreciate that various modifications and applications, which are not exemplified in the above description, may be made without departing from the scope of the essential characteristic of the present embodiments. For example, each component described in detail in the embodiment can be modified. Further, the differences related to the modification and the application should be construed as being included in the scope of the present invention defined in the appended claims.

The invention claimed is:

1. A camera actuator comprising:
   a housing;
   a mover on which an optical member is seated and that is disposed in the housing;
   a first ball and a second ball disposed between the housing and the mover; and
   a driving unit disposed in the housing and configured to drive the mover,
   wherein:
   wherein the mover includes a first mover outer surface, a second mover outer surface facing the first mover outer surface, and a third mover outer surface disposed between the first mover outer surface and the second mover outer surface,
   wherein the mover includes a first-first protrusion extending toward the housing, a first-second protrusion extending toward the housing, and a first-third protrusion extending toward the housing,
   wherein the first-first protrusion is disposed on the first mover outer surface,
   wherein the first-second protrusion is disposed on the second mover outer surface,
   wherein the first-third protrusion is disposed on the third mover outer surface,
   wherein the first-first protrusion includes a first recess,
   wherein the first-second protrusion includes a second recess,
   wherein the first-third protrusion includes a third recess,
   wherein the first recess includes a first side surface and a first bottom surface in contact with the first side surface,
   wherein the first ball is disposed in the first recess, and at least a portion of the first recess is spaced apart from the first ball,
   wherein the second recess includes a second side surface and a second bottom surface in contact with the second side surface,
   wherein the third recess includes a third side surface and a third bottom surface in contact with the third side surface, and
   wherein the second ball is disposed in the third recess, and at least a portion of the third recess is spaced apart from the second ball.

2. The camera actuator of claim 1, wherein the driving unit is configured to rotate the mover in a first direction or a second direction perpendicular to the first direction.

3. The camera actuator of claim 1,
   comprising a third ball disposed in the second recess.

4. The camera actuator of claim 3, wherein: the first ball is in contact with a bottom surface of the first recess at a first point, and
   wherein the third ball is in contact with a bottom surface of the second recess at a second point.

5. The camera actuator of claim 4, wherein the first point and the second point overlap each other in the second direction.

6. The camera actuator of claim 3, wherein the housing comprises a second-first protrusion facing the first-first protrusion, a second-second protrusion facing the first-second protrusion, and a second-third projection facing the first-third projection,
   wherein the second-first protrusion includes a first groove having an open shape at one side,
   wherein the second-second protrusion includes a second groove having an open shape at one side,
   wherein the second-third protrusion includes a third groove having an open shape at one side,
   wherein the first ball is seated in the first groove,
   wherein the second ball is seated in the third groove, and
   wherein the third ball is seated in the second groove.

7. The camera actuator of claim 1, wherein the first-first protrusion and the first-second protrusion overlap each other in the second direction.

8. The camera actuator of claim 1, wherein the first-third protrusion is disposed between the first-first protrusion and the first-second protrusion.

9. The camera actuator of claim 1,
   wherein the driving unit includes a first magnet, a second magnet, a third magnet, a first coil, a second coil, and a third coil,
   wherein the first magnet and the second magnet are disposed symmetrically with each other on the basis of a first direction on the mover,
   wherein the first coil and the second coil are disposed symmetrically with each other on the basis of the first direction between the housing and the mover,
   wherein the third magnet is disposed between the first magnet and the second magnet, and
   wherein the third coil is disposed between the first coil and the second coil.

10. The camera actuator of claim 9, comprising a fourth magnet spaced apart from the third magnet and disposed between the first magnet and the second magnet.

11. The camera actuator of claim 10, wherein the first-third protrusion is disposed between the third magnet and the fourth magnet.

12. The camera actuator of claim 10, wherein the third magnet and the fourth magnet are arranged symmetrically with respect to the first-third protrusion.

13. The camera actuator of claim 9, wherein the first magnet is at least partially overlapped with the first-first protrusion in an optical axis direction.

14. The camera actuator of claim 9, wherein the second magnet is at least partially overlapped with the first-second protrusion in an optical axis direction.

15. The camera actuator of claim 1, wherein the first-first protrusion and the first-second protrusion are opposite to each other.

16. The camera actuator of claim 1,
wherein the housing comprises a second-first protrusion facing the first-first protrusion, a second-second protrusion facing the first-second protrusion, and a second-third projection facing the first-third projection.

17. The camera actuator of claim 16, wherein the second-first protrusion includes a first groove having an open shape at one side,
wherein the second-second protrusion includes a second groove having an open shape at one side, and
wherein the second-third protrusion includes a third groove having an open shape at one side.

18. The camera actuator of claim 17, wherein the ball part-first ball is seated in the first groove, and
wherein the second ball is seated in the third groove.

* * * * *